United States Patent
Kirka et al.

[11] Patent Number: 5,966,897
[45] Date of Patent: *Oct. 19, 1999

[54] CONTROL SYSTEM FOR A PACKAGING MACHINE

[75] Inventors: Arde Kirka, Algonquin; Anders Ek, Chicago; Johan Hegardt, Buffalo Grove, all of Ill.; Robert Massey, Paddock Lake, Wis.; Olof Stark, Ystad; Gunnar Drevfors, Akarp, both of Sweden; Ashok Singh, Chicago, Ill.

[73] Assignee: Tetra Laval Holdings & Finance, SA, Pully, Switzerland

[*] Notice: This patent is subject to a terminal disclaimer.

[21] Appl. No.: 08/730,027

[22] Filed: Oct. 15, 1996

Related U.S. Application Data

[63] Continuation of application No. 08/315,414, Sep. 28, 1994, Pat. No. 5,706,627, which is a continuation-in-part of application No. 08/190,546, Feb. 2, 1994, Pat. No. 5,488,812.

[51] Int. Cl.$^6$ .............................. B65B 1/00; B65B 3/00; B65B 57/00
[52] U.S. Cl. ..................... 53/55; 53/64; 53/75; 53/266.1; 53/565
[58] Field of Search .................................. 53/55, 64, 75, 53/52, 565, 266.1, 467, 458, 491, 381.1, 201, 202, 566, 251, 252; 493/1, 2, 3, 17, 18, 30

[56] References Cited

U.S. PATENT DOCUMENTS

| | | | |
|---|---|---|---|
| 2,631,767 | 3/1953 | Banks | 53/252 X |
| 2,701,674 | 2/1955 | Christiansen | 53/252 X |
| 3,307,325 | 3/1967 | Garrett et al. | 53/565 |
| 3,619,979 | 11/1971 | Martensson et al. | 53/565 |
| 4,159,610 | 7/1979 | Langen | 53/252 X |
| 4,419,761 | 12/1983 | Kuze . | |
| 4,588,391 | 5/1986 | Evans | 53/565 X |
| 4,901,218 | 2/1990 | Cornwell . | |
| 4,912,623 | 3/1990 | Rantala et al. . | |
| 4,921,092 | 5/1990 | Crawford et al. . | |
| 4,924,657 | 5/1990 | Berti et al. | 53/75 X |
| 4,955,176 | 9/1990 | Seko et al. | 53/55 X |
| 4,964,258 | 10/1990 | Seko et al. | 53/75 |
| 5,082,103 | 1/1992 | Ross et al. . | |
| 5,177,930 | 1/1993 | Harston et al. | 53/55 |
| 5,301,488 | 4/1994 | Ruhl et al. . | |
| 5,337,411 | 8/1994 | Harrison, Jr. . | |
| 5,485,712 | 1/1996 | Cherney et al. | 53/55 X |
| 5,488,812 | 2/1996 | Stark et al. | 53/266.1 |
| 5,517,801 | 5/1996 | Persells et al. | 53/565 X |
| 5,599,268 | 2/1997 | Andersson et al. | 53/565 X |
| 5,706,627 | 1/1998 | Kirka et al. | 53/52 |

*Primary Examiner*—John Sipos

[57] ABSTRACT

A packaging machine under control of an electronic control system is set forth. The packaging machine includes a plurality of servo driven packaging stations that execute the processes required to fill and seal a carton. Each of the packaging stations is driven by one or more servomotors associated therewith. A plurality of servo amplifiers are connected to the servomotors to control the rotational movement of the servomotors thereby to effect control of the motion of the various components associated with each if the packaging stations. The packaging machine further includes at least two programmable devices connected for communication over a common bus. A programmable axis manager (PAM) is connected to control the plurality of servo amplifiers and, thus, the motion profiles of the servomotors and components of the respective processing station. A programmable logic controller (PLC) is connected to receive and transmit input/output signals associated with the plurality of packaging stations. The PAM and the PLC communicate data variable values over the common bus using predetermined fingerprints assigned to each variable value. Use of the fingerprint/variable value protocol allows high speed communication between the PLC and PAM thereby allowing the PLC and PAM to be viewed as a single control unit.

12 Claims, 39 Drawing Sheets

INFEED CONVEYOR POSITION PROFILE

INFEED CONVEYOR POSITION PROFILE

BOTTOM LIFT POSITION PROFILE

BOTTOM LIFT VELOCITY PROFILE

TOP PREFOLDER VELOCITY PROFILE

TOP PREFOLDER ACCELERATION PROFILE

BOTTOM SEALER CAM POSITION PROFILE

BOTTOM SEALER CAM VELOCITY PROFILE

TOP SEAL CAM POSITION PROFILE

TOP SEAL CAM VELOCITY PROFILE

TOP SEAL CAM ACCELERATION PROFILE

BOTTOM FORMER LIFT POSITION PROFILE

BOTTOM FORMER LIFT VELOCITY PROFILE

BOTTOM FORMER LIFT ACCELERATION PROFILE

FIG. 51

CONTROL SYSTEM FOR A PACKAGING MACHINE

CROSS-REFERENCE TO RELATED APPLICATIONS

This is a continuation of application Ser. No. 08/315,414, filed Sep. 28, 1994 now U.S. Pat. No. 5,706,627 which is a continuation-in-part of U.S. Ser. No. 08/190,546, filed Feb. 2, 1994 now U.S. Pat. No. 5,488,812.

TECHNICAL FIELD

The present invention relates to a control system for a packaging machine. More specifically, the present invention relates to a control system that utilizes a programmable logic controller and a programmable axis manager that communicate through a high speed communication interface.

BACKGROUND

Packaging machines are known that integrate the various components necessary to fill and seal a container into a single machine unit. This packaging process, generally stated, includes feeding carton blanks into the machine, sealing the bottom of the cartons, filling the cartons with the desired contents, sealing the tops of the cartons, and then off loading the filled cartons for shipping. The motion and I/O control of the packaging machine may be undertaken by an electronic control system.

Traditionally, control systems for packaging machines have utilized programmable logic controllers (PLC) to effect both motion and I/O control. PLC system architecture, however, is principally directed to I/O control and has only limited value as an axis controller. Such a system is described in U.S. Pat. No. 5,177,930, issued Jan. 12, 1993. As illustrated in the '930 Patent, a single PLC is utilized to control both the motion and the I/O.

Trends within the field of packaging machines point toward increasingly high capacity machines intended for rapid, continuous filling and sealing of a very large number of identical or similar packaging containers, e.g., containers of the type intended for liquid contents such as milk, juice, and the like. One such machine is disclosed in U.S. Ser. No. 08/190,546, filed Feb. 2, 1994, which is hereby incorporated by reference. The machine disclosed in the '546 application includes a plurality of processing stations, each station implementing one or more processes to form, fill, and seal the containers. Each of the processing stations is driven by one or more servomotors that drive the various components of each of the processing stations.

The increased throughput and decreased size requirements have increased the demands that are placed on the control systems that are employed. As the number of axes increases, the demands on the speed of the control system response also increases. The traditional single PLC control system is often inadequate to meet these speed requirements. Accordingly, a more sophisticated control system for a packaging machine of the foregoing type is desirable.

SUMMARY OF THE INVENTION

A packaging machine under control of an electronic control system is set forth. The packaging machine includes a plurality of servo driven packaging stations that execute the processes required to fill and seal a carton. Each of the packaging stations is driven by one or more servomotors associated therewith. A plurality of servo amplifiers are connected to the servomotors to control the rotational movement of the servomotors thereby to effect control of the motion of the various components associated with each of the packaging stations. The packaging machine further includes at least two programmable devices connected for communication over a common bus. A programmable axis manager (PAM) is connected to control the plurality of servo amplifiers and, thus, the motion profiles of the servomotors and components of the respective processing station. A programmable logic controller (PLC) is connected to receive and transmit input/output signals associated with the plurality of packaging stations. The PAM and the PLC communicate data variable values over the common bus using predetermined fingerprints assigned to each variable value. Use of the fingerprint/variable value protocol facilitates high speed communication between the PLC and PAM thereby allowing the PLC and PAM to be viewed as a single control unit.

In accordance with one embodiment of the packaging machine, the PLC and PAM may communicate with one another by accessing a common set of memory locations that are, for example, disposed in dual port memory located in the PAM and which are accessible by the PLC over the communication bus. Selected memory locations within the common set of memory locations have predetermined functions, such as flagging a message from the PLC or PAM, identifying where fingerprint and variable data are stored for communication, and acknowledging receipt of the fingerprint and variable data.

In accordance with further aspects of the packaging machine, the PAM and the PLC may effect initialization through an initialization sequence that facilitates an efficient software development platform. Such initialization may be effected, for example, by exchanging selected CRC values between the PAM and PLC, the selected CRC values identifying which variables are to be used in communications between the PAM and PLC at runtime. The PLC and PAM may then assign the predetermined fingerprints corresponding to the selected CRC values and communicate the fingerprint values to one another. The predetermined fingerprints are subsequently used to identify each variable in subsequent communications between the PLC and PAM at runtime. Such variables may include variables that allow the PLC to instruct the PAM to execute a production cycle, to instruct certain mechanisms to go to a predetermined position, etc. Such variables may further include variables that allow the PAM to inform the PLC of the presence of power at the various processing stations and, further, inform the PLC of excessive torque requirements from the servomotors indicative of system errors.

BRIEF DESCRIPTION OF THE DRAWINGS

FIG. 51 is an end elevational view of a part of the machine.

DETAILED DESCRIPTION OF THE PREFERRED EMBODIMENT

Figure 1:
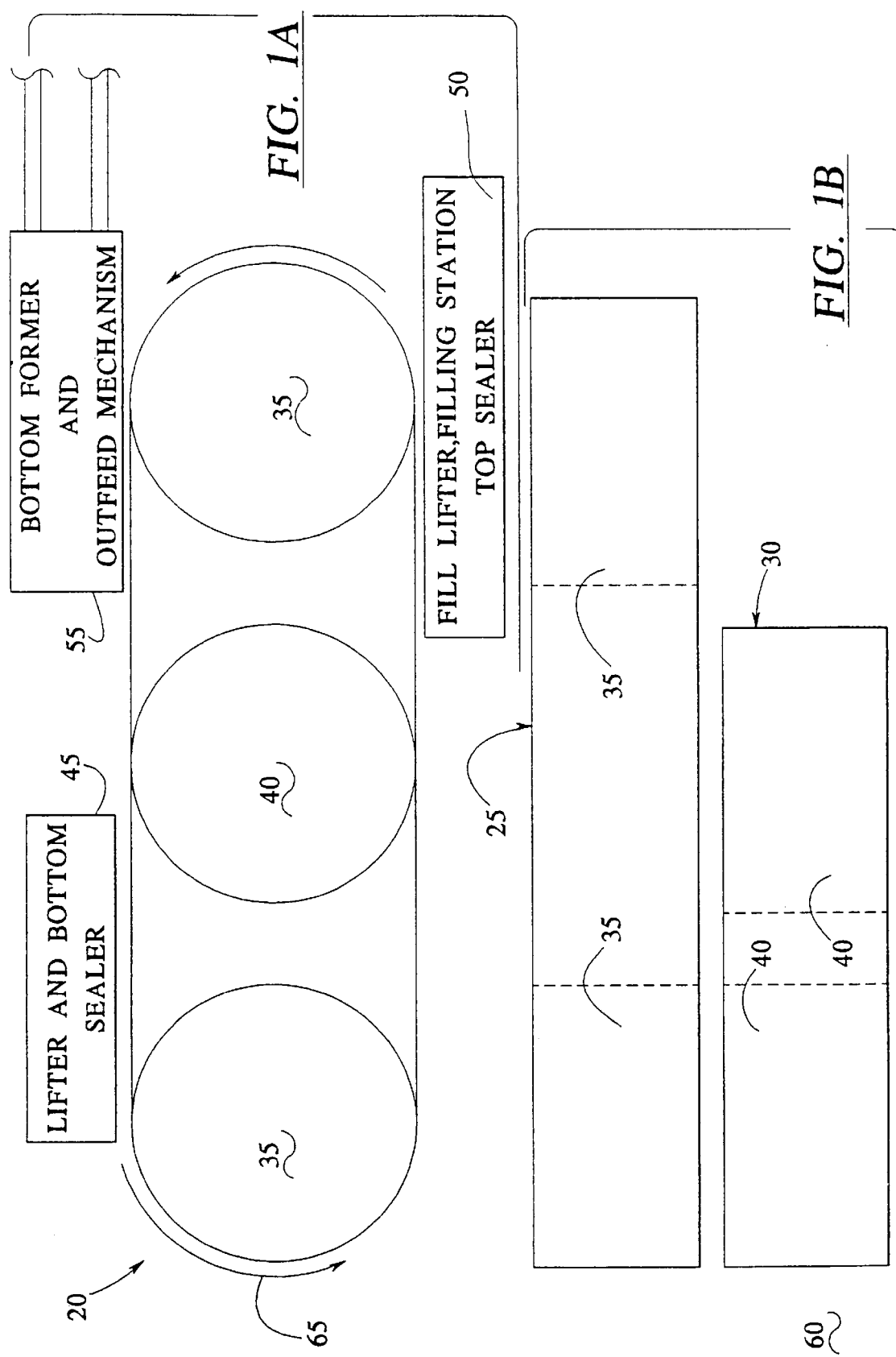
FIGS. 1A and 1B are schematic illustrations of a packaging machine including a plurality of processing stations that each include one or more servo driven mechanisms.

FIGS. 1A and 1B are schematic illustrations of a packaging machine system such as the one disclosed in the aforementioned '546 application. The packaging system, shown generally at 20, includes an upper endless belt conveyor 25 and a lower endless belt conveyor 30. The upper endless belt conveyor 25 is driven by a pair of pulley wheels 35 that for example, are driven by one or more servomotors. The lower endless belt conveyor 30 is also driven by a pair of pulleys 40 that, for example, may be servomotor driven. The conveyors may be constructed in accordance with the teachings of U.S. Ser. No. 08/282,981, filed Jul. 29, 199, incorporated herein by reference.

A plurality of processing stations 45, 50, and 55 are disposed about the periphery of the endless belt conveyors 25 and 30. The processing stations 45, 50, and 55 each have their respective mechanical components driven by one or more servomotors that control the motion profile of the station components.

The lower conveyor 30 may receive erected carton blanks at end 60 and transport the carton blanks to processing station 45. Processing station 45 may include a lifter mechanism and a bottom sealer mechanism. The lifter mechanism may be constructed in accordance with the teachings of U.S. Ser. No. 08/315,410 (Attorney Docket No. 10325US01; Corporate Docket No. TRX-0043) entitled "Belt Driven Linear Transport Apparatus for a Packaging Machine", and (Attorney Docket No. 10602US01; Corporate Docket No. TRX-0044) entitled "Lifter Mechanism Employing a Carton Gripper and Carton Bottom Seal Configuration for Same", both of which are filed on even date herewith. The bottom sealer mechanism may be constructed in accordance with the teachings of (Attorney Docket No. 10454US01; Corporate Docket No. TRX-0082), entitled "Ultrasonic Carton Sealer", which is likewise filed on even date herewith. Both the lifter mechanism and the bottom sealer mechanism are driven by respective servomotors.

In operation, the lifter mechanism transports the erected cartons in groups from the lower conveyor 30 to the upper conveyor 25. At the upper conveyor 25, the bottoms of the cartons are sealed, for example, with previously noted sealing apparatus using ultrasonic energy.

The upper conveyor 25 transports the cartons in the direction indicated by arrow 65 to processing station 50. Processing station 50 may include a fill lifter mechanism, a plurality of filling nozzles respectively associated with each of the cartons, and a top sealer. The fill lifter may be constructed in accordance with the teachings of the aforementioned application (Attorney Docket No. 10325US01; Corporate Docket No. TRX-0043) and application (Attorney Docket No. 10602US01; Corporate Docket No. TRX-004), while the top sealer may be constructed in accordance with the teachings of the aforementioned application (Attorney Docket No. 10454US01; Corporate Docket No. TRX-0082). At processing station 50, the fill lifter lifts the cartons to a position proximate the fill nozzles and gradually lowers the cartons as product is dispensed into them. Once the cartons have been filled, the top sealer seals the carton into the familiar gabled top configuration.

Figure 2:
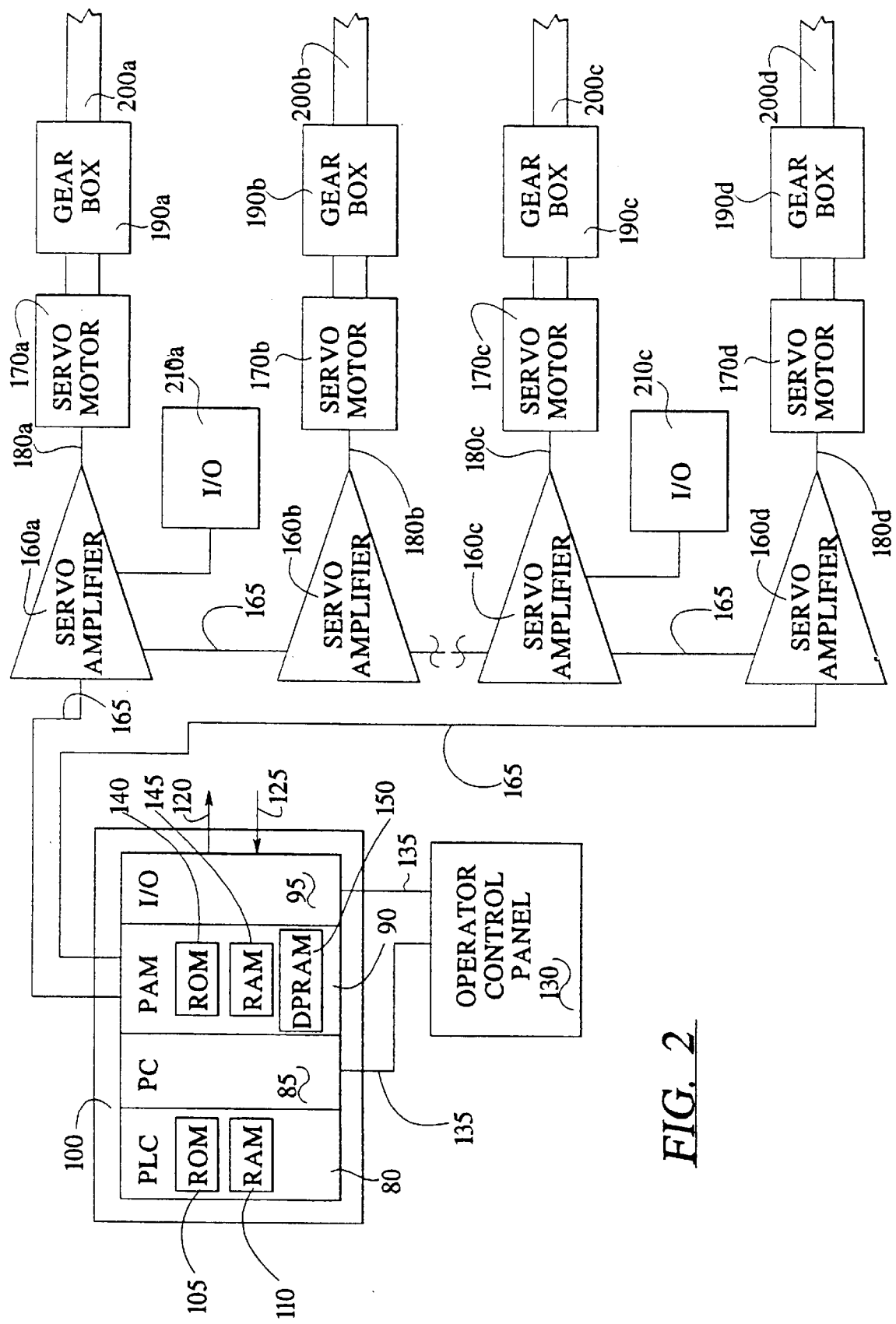
FIG. 2 is a schematic block diagram illustrating one embodiment of the control system for controlling the operation of the packaging machine illustrated in FIGS. 1A and 1B.

After the tops of the cartons have been sealed, the upper conveyor 25 transports the cartons in the direction of arrow 70 to processing station 55. Processing station 55 may include a bottom forming mechanism and an outfeed mechanism. The bottom forming mechanism, for example, may be constructed in accordance with the teachings of (Attorney Docket No. 10599US01, Corporate Docket No. TRX-0064). entitled "Vacuum Operated Bottom Former", filed on even date herewith, and the outfeed mechanism may be constructed in accordance with the teachings of either (Attorney Docket No. 10594US01; Corporate Docket No. TRX-0113), entitled "Apparatus for Transferring Containers to a Moving Conveyor") or (Attorney Docket No. 10610US01; Corporate Docket No. TRX-0118), likewise entitled "Apparatus for Transferring Containers to a Moving Conveyor", both of which are filed on even date herewith. At processing station 55, the bottom forming mechanism forms the bottom of the cartons to allow them to sit properly in an erect state. After the bottoms have been formed, the outfeed mechanism transfers the cartons to a distribution system, shown here as a dual line conveyor 75. FIG. 2 is a schematic block diagram illustrating one embodiment of a control system for controlling the operation of the packaging machine illustrated in FIG. 1. The control system includes a PLC 80, an industrial PC 85, a PAM 90, and an I/O interface unit 95, all of which are disposed in a bus rack 100 for communication with one another. The bus rack 100, may be a VME bus, a SIMATIC S5 bus, or any other bus that is capable of supporting multiple processors.

As illustrated, the PLC 80 includes a ROM 105 and a RAM 110. The ROM 105 includes the software that is required to program and run the PLC 80 and, for example, may include $E^2$ PROM for storing the ladder logic programming and, as will be described in detail below, the PLC communication program. The PLC 80 is in communication with the I/O interface unit 95 which receives and sends I/O sensor and control signals along lines 120 and 125. Additionally, the I/O interface unit 95 receives signals, such as keypresses, from an operator control panel 130 along one or more lines 135. The industrial PC 85 is also connected for communication with the operator control panel 130 which, for example, can send detailed graphic information to a display on the operator control panel 130 that advises the machine operator of the status of the machine.

The PAM 90 includes a ROM 140 and a RAM 145. The ROM 140 includes the programs necessary to operate and program the PAM 90 and, for example, may include $E^2$ PROM for storing the user program. The PAM 90 further includes a dual port memory, shown here as DPRAM 150. The PLC 80 and PAM 90 may both access the memory locations in the DPRAM 150, the PLC 80 accessing the DPRAM 15 along the VME bus.

The PAM 90 is connected for communication with a plurality of servo amplifiers 160 along one or more lines 165 which may constitute an optical ring network. The servo amplifiers 160, in turn, are each connected for control of a respective servomotor 170 along lines 180. The servomotors 170, in turn, are connected to drive, for example, gear shafts 190 either directly or through a respective gear box. The drive shafts 200, for example, each constitute one or more components of one of the processing stations 45, 50, and 55.

By way of example, the servo amplifiers 160 may each be a Model ST-1 servomotor and the PAM 90 may be a programmable axes manager, both of which are manufactured and available from Socapel. Similarly, by way of example, the PLC 80 may be a Model 9070 programmable logic controller that is available from GE Fanuc.

In the case where one or more Model ST-1s are used to implement the system, the servomotors 170 may be used to sense and propagate I/O signals through, for example, I/O interface circuits 210. The status of sensor inputs as well as the control of actuating outputs to and from the I/O circuit 210 are communicated along the optical ring network.

Figure 3:
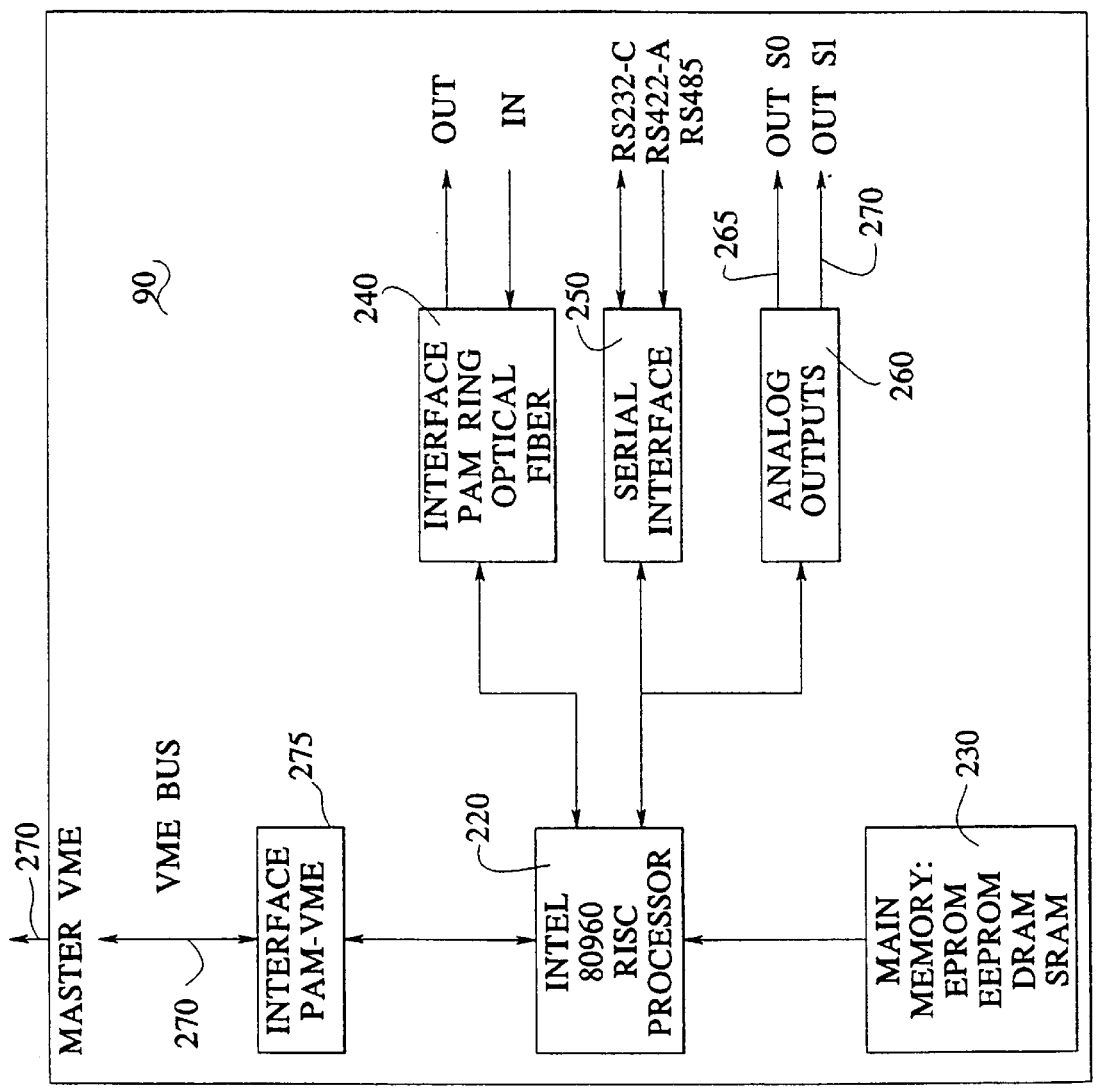
FIGS. 3 and 4 are schematic block diagrams of a programmable axis manager including a VME bus interface.

A schematic block diagram of one embodiment of a PAM 90 is set forth in FIG. 3. Central to the operation of the PAM 90, is a central processor 220 that, for example, may be an INTEL 80960 RISC processor. Programs and data for use by the central processor 220 are stored in a main memory 230. The main memory 230, as illustrated, may include EPROM, $E^2$ PROM, DRAM, and/or SRAM memory.

The central processor 230 is in communication with several different interface circuits. An optical ring interface circuit 240 is used to allow the central processor 220 to communicate with the servo amplifiers 160 over the optical ring network lines 165. A serial interface circuit 250 may be provided to allow connection between the PAM 90 and a terminal or a computer for application diagnosis and debugging. A D/A convertor circuit 260 provides analog signals at lines 265 and 270 that may be used for monitoring or debugging purposes.

Figure 4:
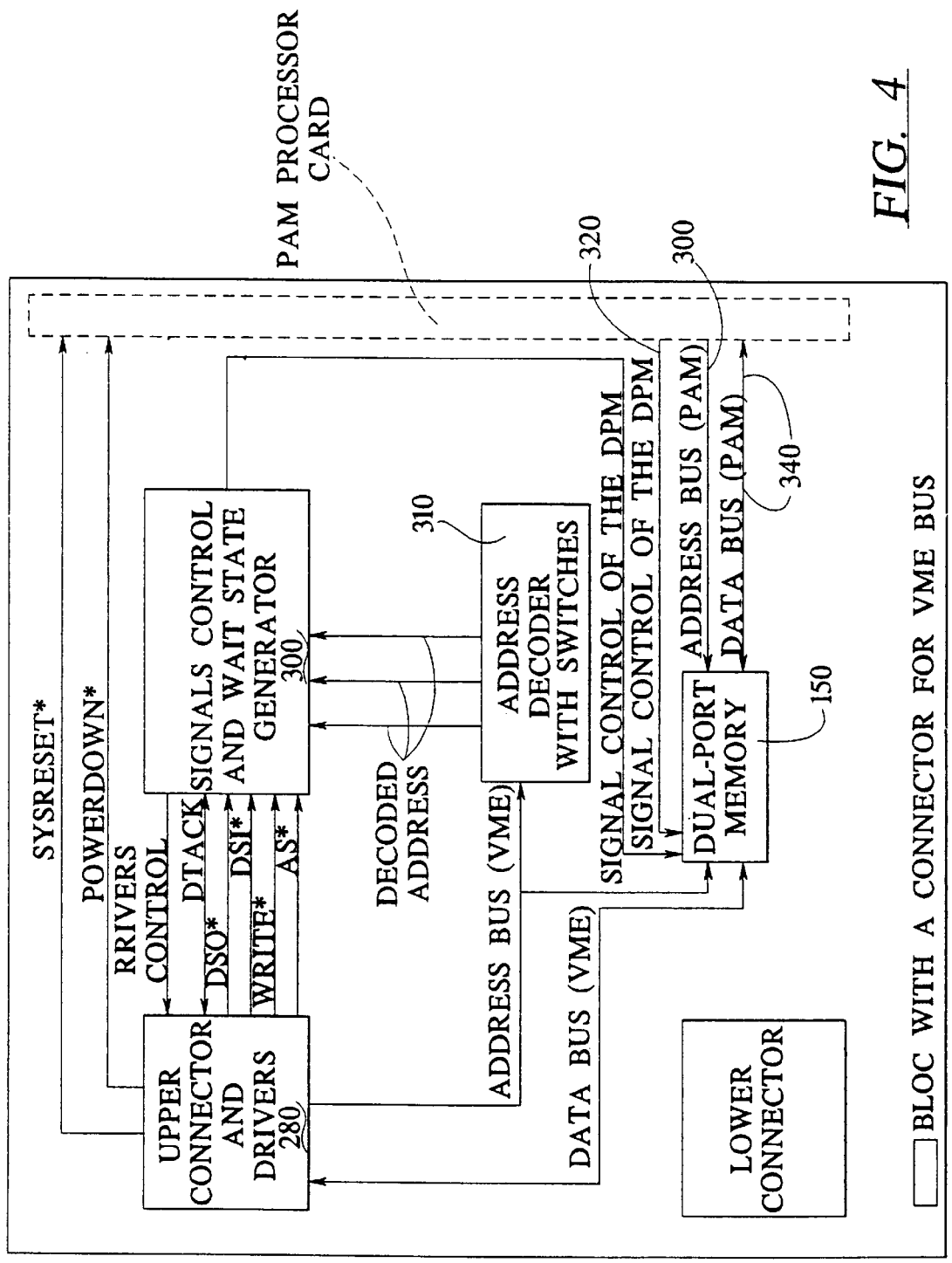

The central processor 220 connects to VME bus 270 using a PAM/VME interface circuit 275, the details of which are shown in schematic form in FIG. 4. A connector block 280 includes the connectors and drivers that are directly connected to VME bus rack 100. The interface further includes a signal control and wait state generator 300, an address decoder 310, and the dual-port memory 150.

The PAM 90 functions as a slave device on the VME bus 270. As such, the PAM 90 does not have direct access to the bus 270. Rather, all communication between the PAM 90 and the PLC 80 takes place through the dual-port memory 150 which is accessible by both the PAM 90 and the PLC 80. Access to the dual-port memory 150 over the VME bus 270 is controlled with the assistance of the signal control and wait state generator 300 and address decoder 310. Access by the central processor 220 to the dual-port memory 150 is controlled by the signals on the signal control lines 320, the address lines 330, and the data lines 340.

Figure 5:
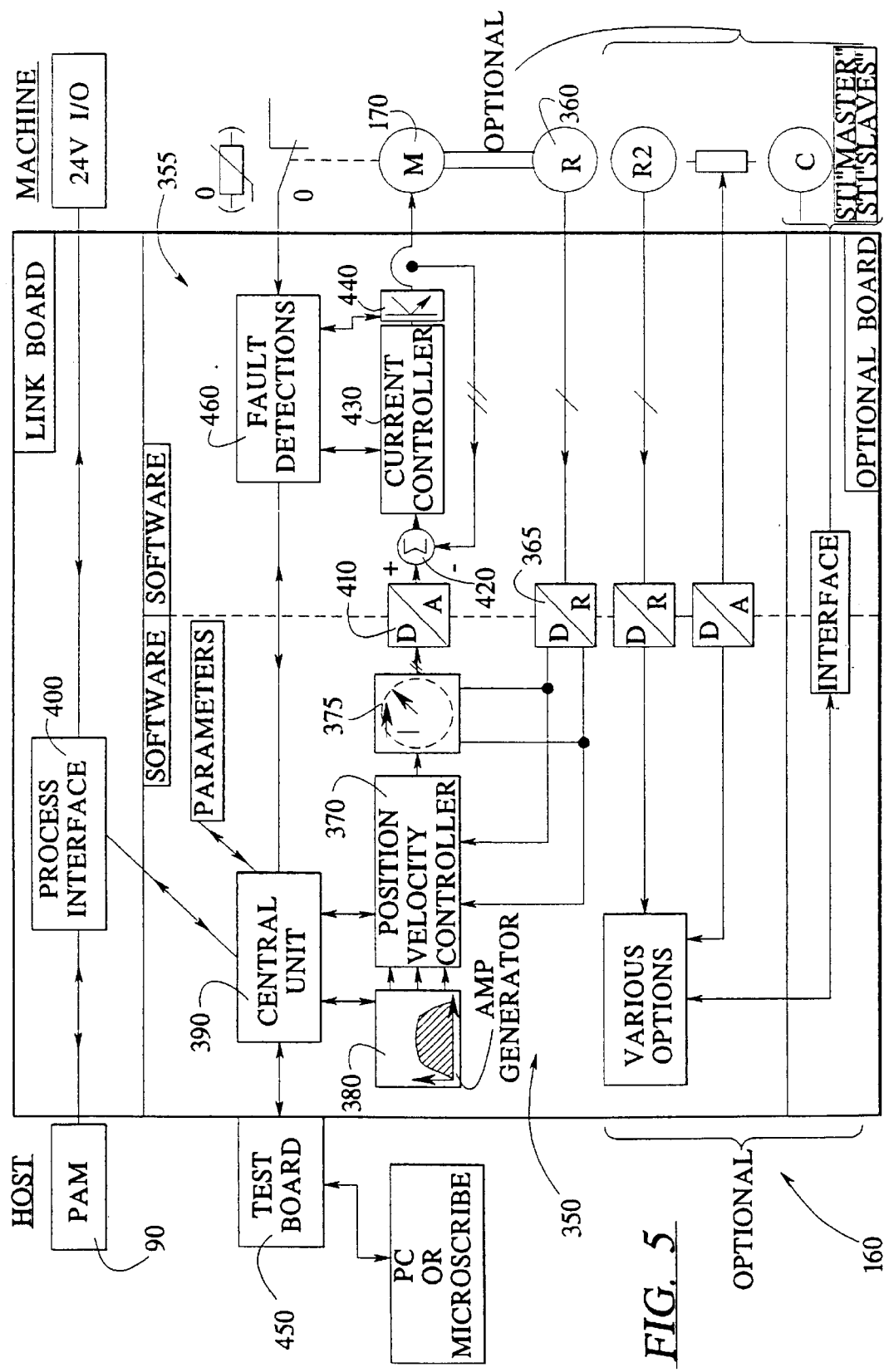
FIG. 5 is a schematic block diagram of one embodiment of the servo amplifier that may be used in the control system of FIG. 2.

FIG. 5 is schematic block diagram of one embodiment of a servo amplifier 160 that may be used with the PAM described above. In the illustrated block diagram, the servo amplifier, has been functionally divided into software functions shown on side 350 and hardware functions shown on side 355. On the hardware side 355, the position and speed of the servomotor 160 is obtained by monitoring signals sent from a resolver 360 disposed on the shaft of the servomotor 170. These signals are supplied to a resolver hardware/software interface 365 that converts the signals into position and angular speed measurements. These measurements are sent to position/velocity controller 370 and a phase controller 375 software. The position/velocity controller 370 interfaces with ramp generating software 380 and central unit software 390. The central unit software 390 receives motion profile information from the PAM 90 through a process interface 400. The central unit software 390, in turn, sends the requisite motion profile data to the ramp generating software 380 and the position/velocity controller software 370. This data is ultimately sent as digital signals to a D/A convertor 410. The output of the D/A convertor 410 is supplied through a summing circuit 420 to a current controller 430 that, in turn, drives an inverter array 440 that supplies the necessary power signals to move the servomotor 170 to the desired position in accordance with the programmed motion profile. The central unit software 390 may also interface with a test board 450 that provides the necessary connections for a personal computer thereby allowing debugging and monitoring of the servomoamplifier 160. Faults are detected by a fault detection circuit 460 and communicated to the PAM 90 through the central unit software 390 and the process interface 400. Such faults may then be communicated to the PLC 80 over the VME bus 270, for example, in the manner described below.

Figure 6:
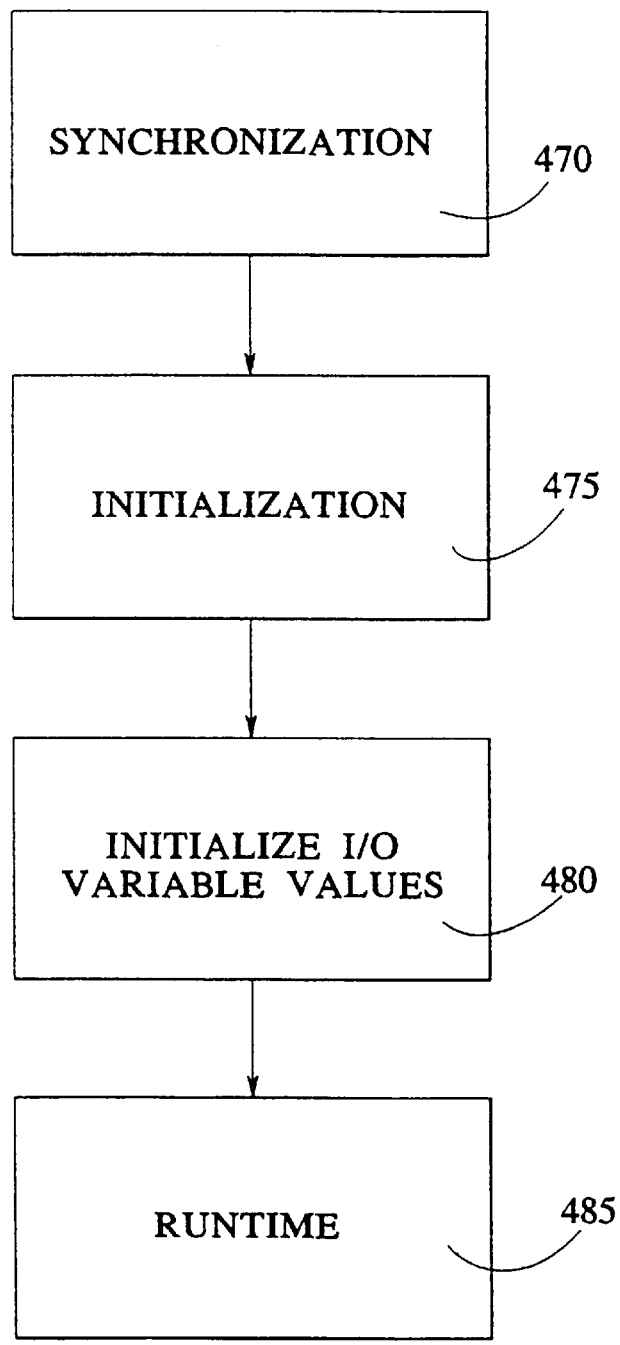
FIG. 6 is a flow diagram illustrating the execution of a plurality of tasks by the hardware and software of the PLC and PAM.

The hardware and software of the PLC 80 and the PAM 90 execute a plurality of tasks, illustrated here in FIG. 6. In accordance with this embodiment, the PLC 80 and PAM 90 advise execute a synchronization task 470. During synchronization, the PLC 80 and PAM 90 advise one another that they are active (i.e., that they each have power supplied and have completed their own internal initial checks). After synchronization, an initialization task 475 is executed in which the PLC 80 and PAM 90 exchange cyclical redundancy check values (CRC) and fingerprint values for the data variables that will be communicated between them at runtime. Once the CRC and fingerprint values have been exchanged, the fingerprint values are used to exchange initial values for the variables that will be communication between the PAM 90 and PLC 80 at runtime. This task is illustrated at block 480. After the communication fingerprint and initial variable data values have been established and exchanged, the PLC 80 enters a run mode 485 during which, for example, it executes its ladder logic processing and PLC/PAM communications program, the PAM 90 executing tasks under the direction of the PLC 80.

Figure 7:
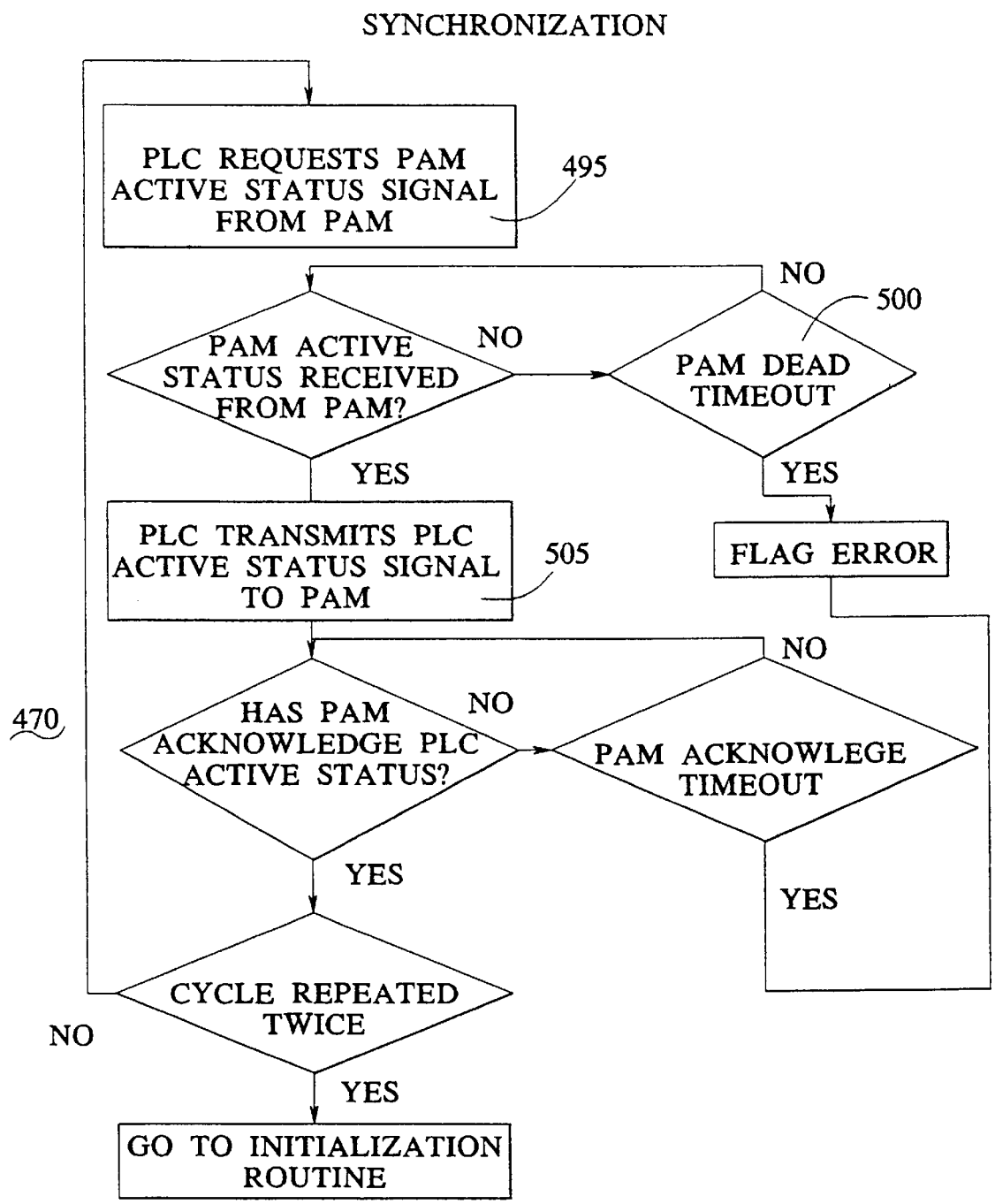
FIG. 7 illustrates one embodiment of the synchronization task of FIG. 6.

FIG. 7 illustrates one manner in which synchronization between the PLC 80 and PAM 80 may be executed. As illustrated, the PLC 80 first requests an active status signal from the PAM 90 at 495. The PLC 80 then waits a predetermined period of time for receipt of the active status signal. If the active status signal is not received within the predetermined period of time, the synchronization program flags an error to the main PLC program at 500 thereby preventing further operation of the system. If the PLC 80 receives the active status signal from the PAM within the predetermined period of time, the PLC 80 transmits its own active status signal to the PAM 90 which must be acknowledged by the PAM at 505 within a predetermined period of time. If the PAM 90 fails to acknowledge receipt of the PLC's active status signal, the synchronization program will flag an error to the system's software at 500. If the PAM 90 acknowledges receipt of the PLC active status signal within the predetermined period of time, the cycle is again repeated.

Figure 8:
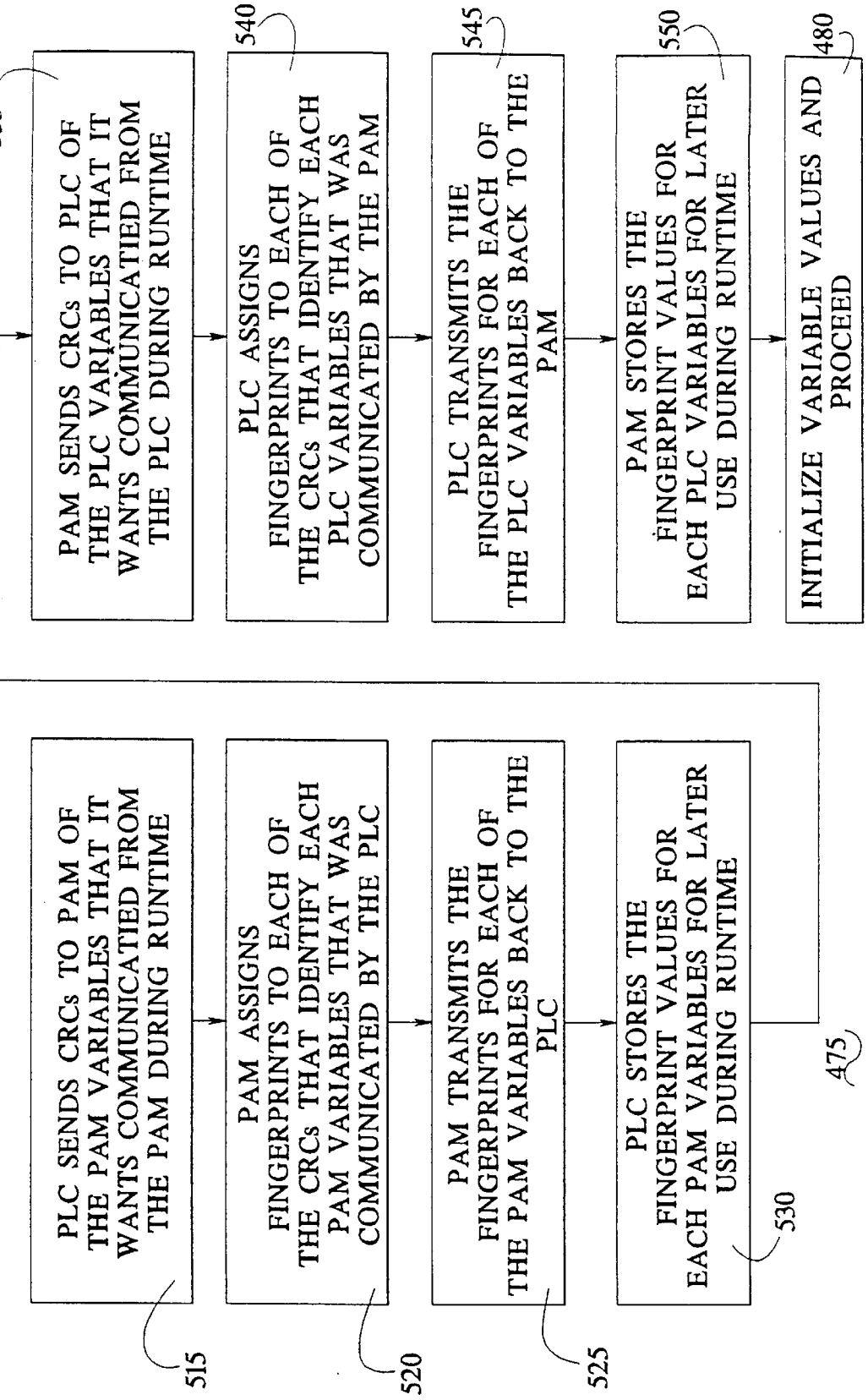
FIG. 8 illustrates one embodiment for the initialization task of FIG. 6.

Upon completion of the synchronization task 470, the initialization task 475, shown here in FIG. 8, is executed. During initialization, the PLC 80 first sends CRC values to the PAM 90 of the PAM variables that it wants communicated from the PAM 90 during runtime. This is shown at block 515. The PAM 90 receives the CRC values and compares them at 520 to a software table in the PAM's memory and, based on that comparison, assigns fingerprint values to each of the CRC values that were transmitted by the PLC 80. The PAM 90 then transmits the fingerprint values for each of the PAM variables back to the PLC 80 at 525. The PLC 80 stores these fingerprint values at 530 for later use during subsequent communication between the PLC and PAM at runtime.

After the PLC 80 has identified the PAM variables that it desires to use during runtime and has received the corresponding fingerprint values, the PAM 90 sends CRC values to the PLC 80 at 535 of the PLC variables that it wants communicated from the PLC 80 during runtime. The PLC 80 compares these CRC values to a table stored in its memory and assigns a fingerprint value to each CRC value that it received as shown at 540. The PLC 80 then transmits the fingerprint values corresponding to each of the CRC values received from the PAM back to the PAM 90 at 545. The PAM stores the fingerprint values for each PLC variable for later use during PLC/PAM communications at runtime as shown at 550. After the CRC values have been exchange and the corresponding fingerprint values have been assigned, the PLC 80 and PAM 90 exchange initial values for each of the variables that have been assigned a fingerprint.

Figure 9:
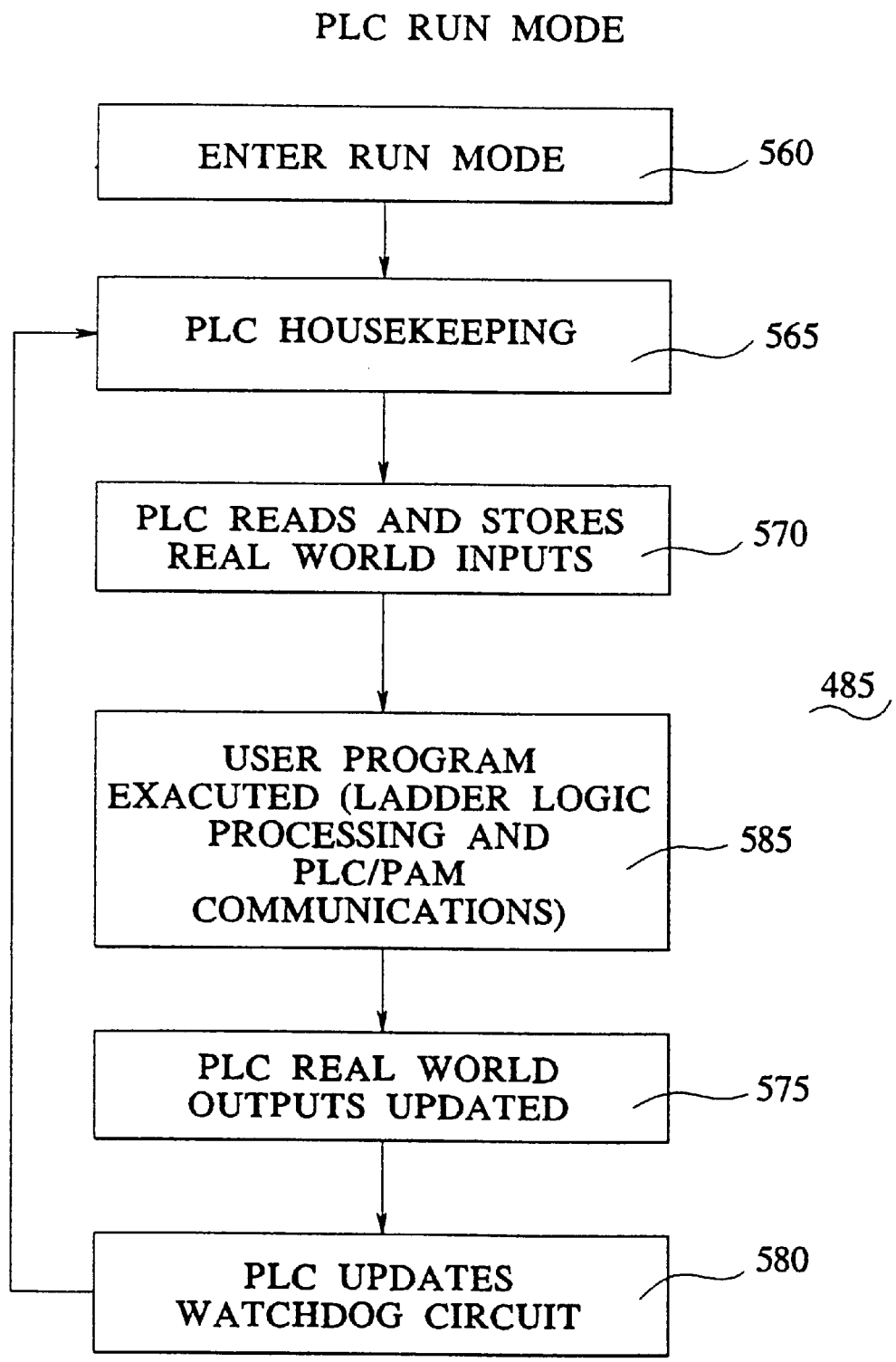
FIG. 9 is a flow diagram illustrating operation of the PLC in its run mode.

FIG. 9 illustrates PLC operation at runtime when it is placed in the run mode. In the run mode, the PLC 80 executes several non-user defined tasks 560, 565, 570 and 580, which are part of the PLC's architecture, as well as a user program, designated here at block 585. After entering run mode at 560, the PLC 80 executes a series of housekeeping tasks at 565. The PLC 80 then reads and stores the real world inputs that are detected at the input ports of the PLC 80. Once the real world inputs have been stored, the PLC 80 executes the user program at 585 which, for example, includes ladder logic processing and PLC/PAM communications. After completing its tasks, the user program returns control to the non-user defined task at 575 which updates the PLC real world outputs based on data received from the ladder logic processing of the user program at 585. A watchdog circuit is then updated at 580. A failure to update the watchdog circuit within a predetermined period of time will reset the PLC 80 and/or trigger an error signal that may be used to shut down the packaging machine.

Figure 10:
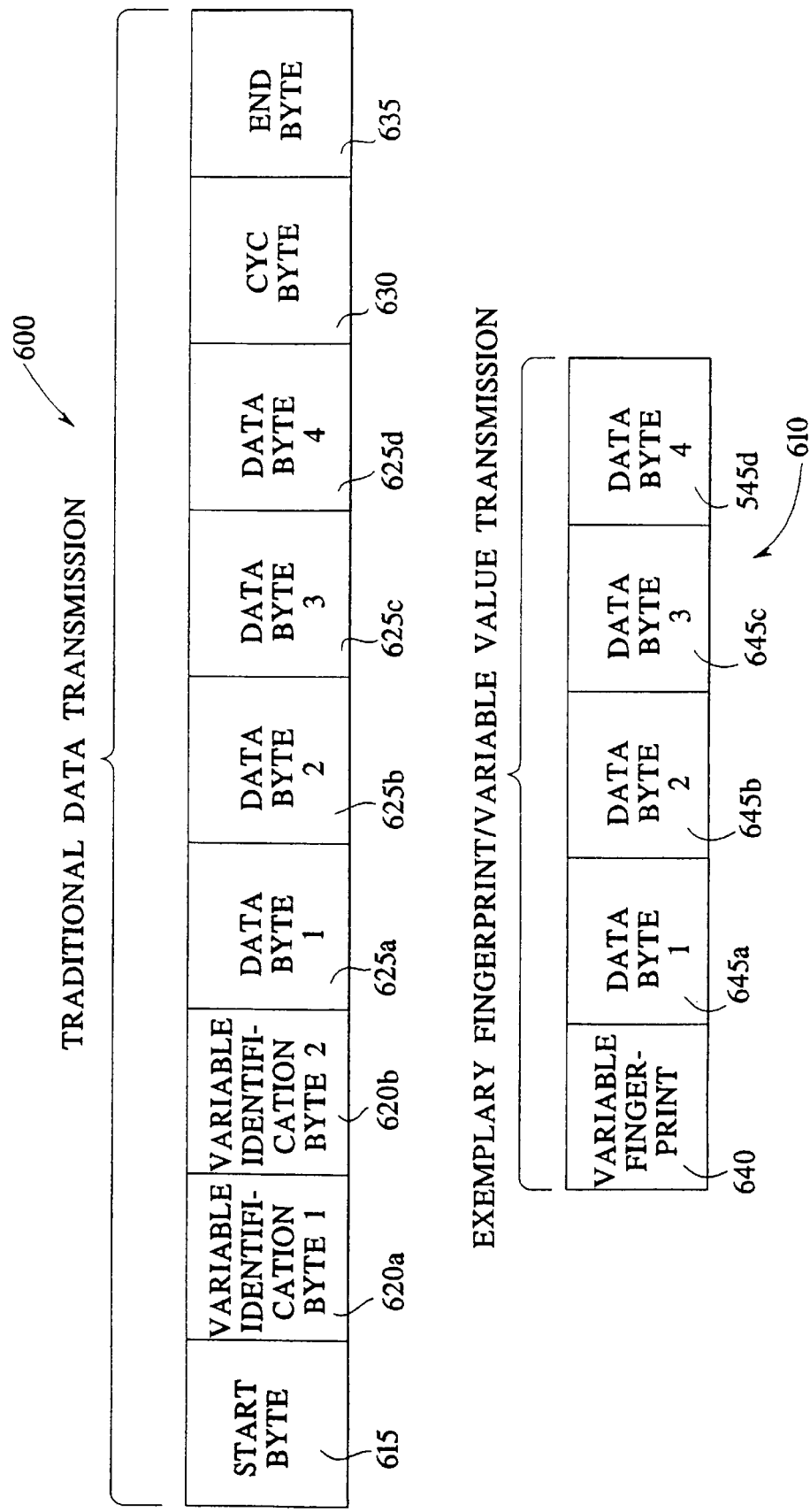
FIG. 10 is a block diagram illustrating a traditional data transmission and an exemplary fingerprint/variable value transmission.

FIG. 10 illustrates a comparison between a traditional data transmission, shown here at 600, and the transmission of variable data as implemented in the presently disclosed system shown here at 610. In accordance with traditional data transmissions, the data packet includes a start byte 615 variable, identification bytes 620, data bytes 625, a CRC byte 635, and an end byte 635. The CRC byte is, for example, a check sum of the variable identification bytes 620 and data bytes 625. The CRC byte 630 is calculated by the transmitting station immediately before the transmitting station sends the data transmission to a receiving station. The receiving station calculates its own CRC value and compares it to the CRC byte 630 that it received from the transmitting station to determine whether there have been any transmission errors. Such continuous calculation and re-calculation of the CRC byte 630, as well as the use of a start byte 615 and end byte 635, may waste valuable system time and resources. Such waste may not be tolerable in a PLC/PAM system that controls a high speed packaging machine that includes a substantial number of motion axes.

In contrast with the illustrated traditional data transmission 600, the exchange of variable data between the PLC 80 and PAM 90 of the present system ensues via a predetermined variable fingerprint 640 which is followed by the variable value that is transmitted in one or more (usually one) data bytes 654. This protocol facilitates high speed communication between the PLC 80 and the PAM 90 since it involves fewer transmitted bytes and, further, does not require continuous calculation and re-calculation of the CRC byte 630. Instead, the variable fingerprint of each variable that is to be communicated between the PLC 80 and the PAM 90 has been predetermined prior to runtime, for example, in the initialization task 475.

Figure 11:
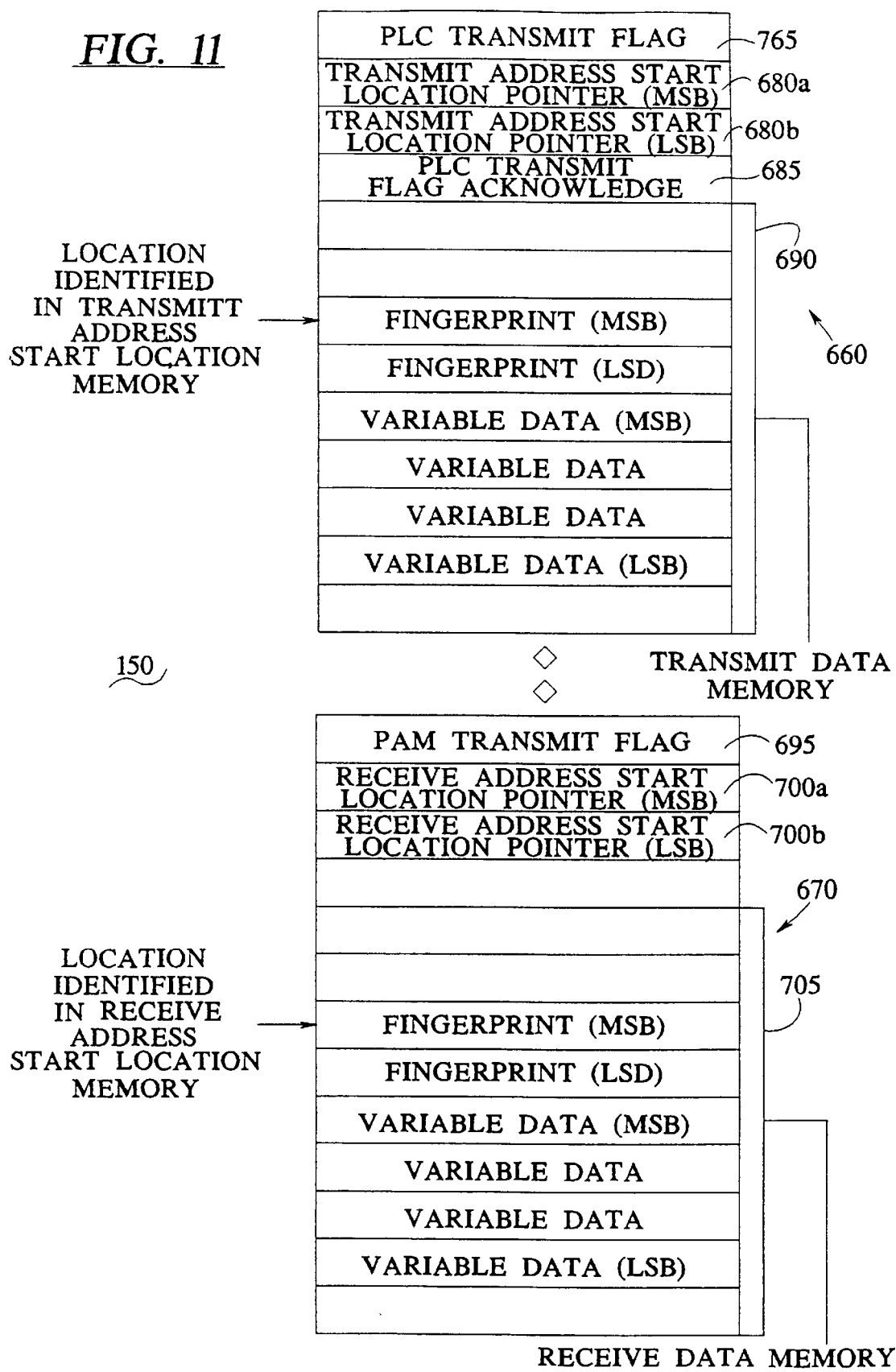
FIG. 11 illustrates one method of organizing the memory locations of the dual-port memory of the PAM.

As previously noted, data transmission between the PAM 90 and the PLC 80 takes place through the dual-port memory 150. FIG. 11 illustrates one method of organizing the memory locations of the dual-port memory 150.

In accordance with the illustrated memory organization, the dual-port memory 150 includes a transmit memory area, shown generally at 660 and a receive memory area, shown generally at 670. The transmit memory area 660 includes a PLC transmit flag 675, a transmit address start location pointer 680, a PLC transmit flag acknowledges a location 685, and transmit data memory 690. Similarly, the receive memory area 670 includes a PAM transmit flag 695, a receive address start location pointer 700, and receive data memory 705.

Figure 12:
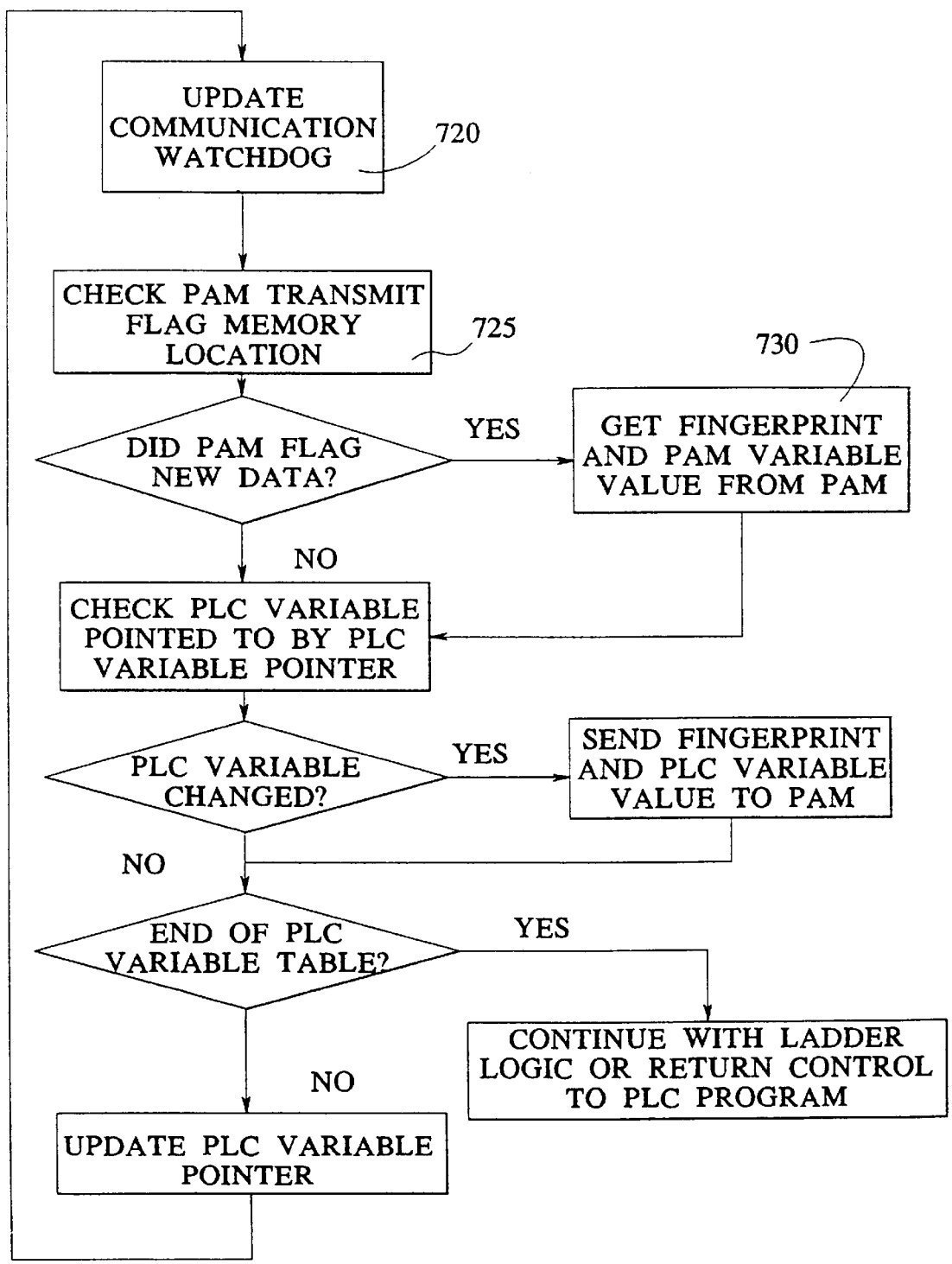
FIG. 12 is a flow diagram illustrating one embodiment of the PLC/PAM variable communications.

FIG. 12 is a functional flow diagram of one method of implementing the PLC/PAM variable communications. The variable communications task includes a periodic update of a communications watchdog at 720. If this watchdog is allowed to time-out, the variable communications program will flag a system error that may be used to shut down the packaging machine. After updating the communications watchdog, the PLC 80 checks the PAM transmit flag 695 in the receive memory area 660 of the PAM 90 at block 725 to determine whether the PAM has new data to transmit to the PLC 80. If the PAM transmit flag 695 is set, the fingerprint and PAM variable value are transferred from the PAM 90 to the PLC 80 as shown at 730.

After this transfer has occurred, the PLC 80 checks the PLC variable that is pointed to by a PLC variable pointer. If the PLC variable that is pointed to has changed, the fingerprint and the changed PLC variable value are sent to the PAM 90. A check is then made of the PLC variable pointer to determine whether the end of the PLC variable table has been reached. If the end of the table has been reached, the PLC/PAM variable communications are terminated and the PLC ladder logic program is allowed to continued, or control of the PLC processor is returned to the PLC non-user program. If the end of the table has not been reached, the PLC variable pointer is updated and the variable communications cycle is again executed.

Figure 13:
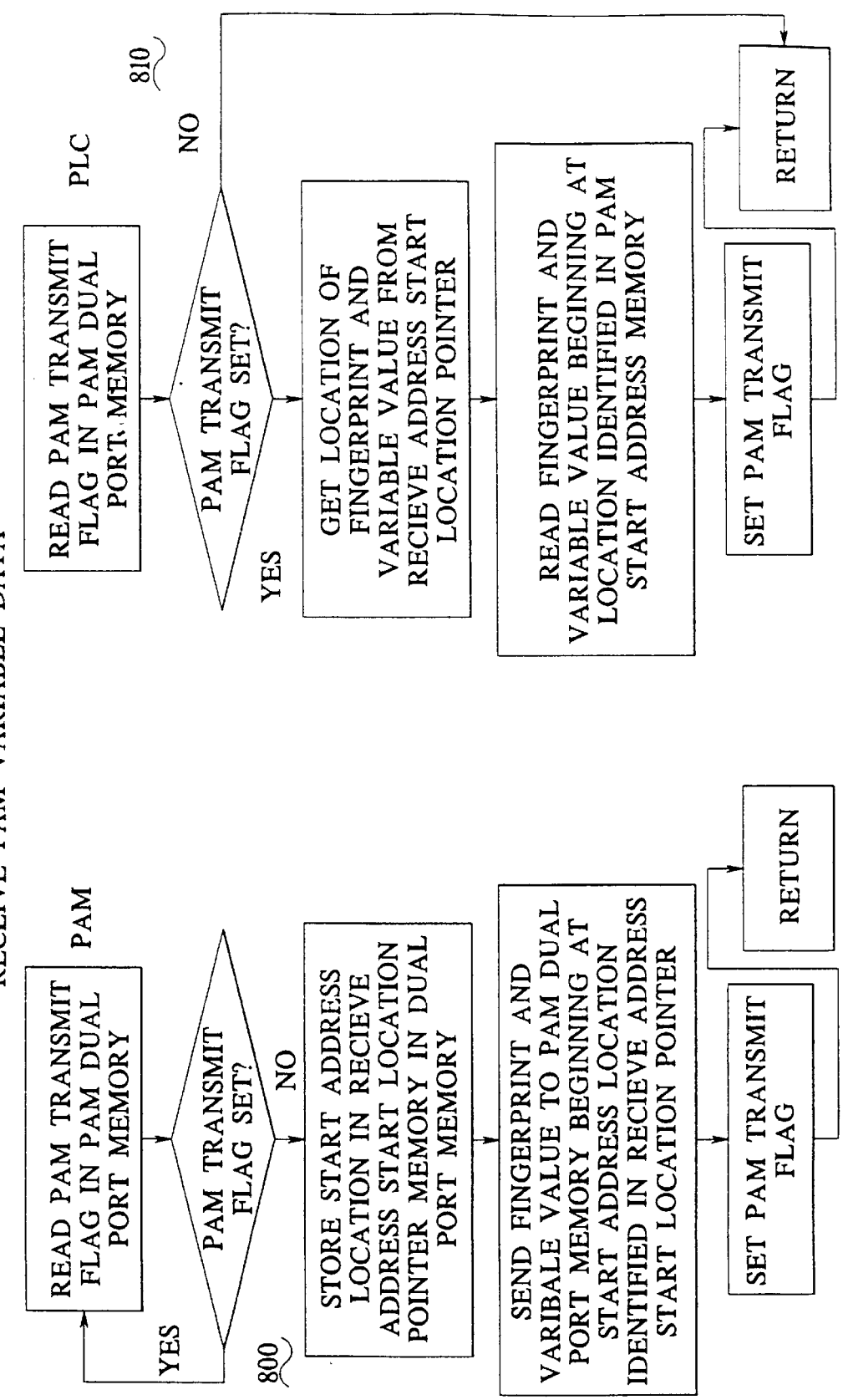
FIG. 13 is a flow diagram illustrating the tasks performed by the PAM and the PLC when the PAM transmits data to the PLC.

FIG. 13 illustrates a more detailed implementation of the data transmission of a PAM variable. The PAM tasks are illustrated generally at 800, while the PLC tasks are illustrated generally at 810. The PLC tasks 800 and PAM tasks 810 are being run concurrently by the PAM 80 and PAM 90 respectively.

With reference to the PAM tasks 800, the PAM 90 first reads the PAM transmit flag 695 in the PAM dual-port memory 150. A set PAM transmit flag 695 indicates that the PLC 80 has failed to complete reading of the immediately preceding fingerprint and variable value and, as such, the PAM 90 is not free to send a further fingerprint and variable value. Accordingly, the PAM 90 waits until the PAM transmit flag 695 is cleared. Once the PAM transmit flag 695 is cleared, the PAM 90 stores the start address location at the receive address start location pointer 700 in the transmit memory area 670 of the dual-port memory 150. The value stored in the receive address start location pointer 700 points to the address at which the PAM 90 will store the fingerprint and variable value in the receive memory area 670 of the dual-port memory 150. After storing the start address location, the PAM 90 sends the fingerprint and variable value to the receive memory area 670 of the dual-port memory 150 beginning at the start address location identified by the PAM 90 in the pointer 700. Once the fingerprint and variable value have been stored, the PAM 90 sets the PAM transmit flag 695 in the receive memory area 670 of the dual-port memory 150. The PAM 90 then returns, for example, to check for further PAM variables that must be sent by the PAM 90 to the PLC 80, or to read variables that have been transmitted from the PLC 80.

With respect to the PLC tasks 810, the PLC first reads the PAM transmit flag 695 in dual-port memory 150. If the PAM transmit flag 695 is not set, there is no PAM variable data to be read by the PLC 180. If, however, the PAM transmit 695 flag is set, the PLC 80 gets the location of the fingerprint and variable value from the location pointed to by the receive address start location pointer 700 in the receive memory area 670 of the dual-port memory 150. The PLC 80 acknowledges receipt of the fingerprint and variable value by clearing the PAM transmit flag 695. The PLC 80 then returns from the tasks 810 to, for example, transmit its own variable data values, or read further PAM variable values.

Figure 14:
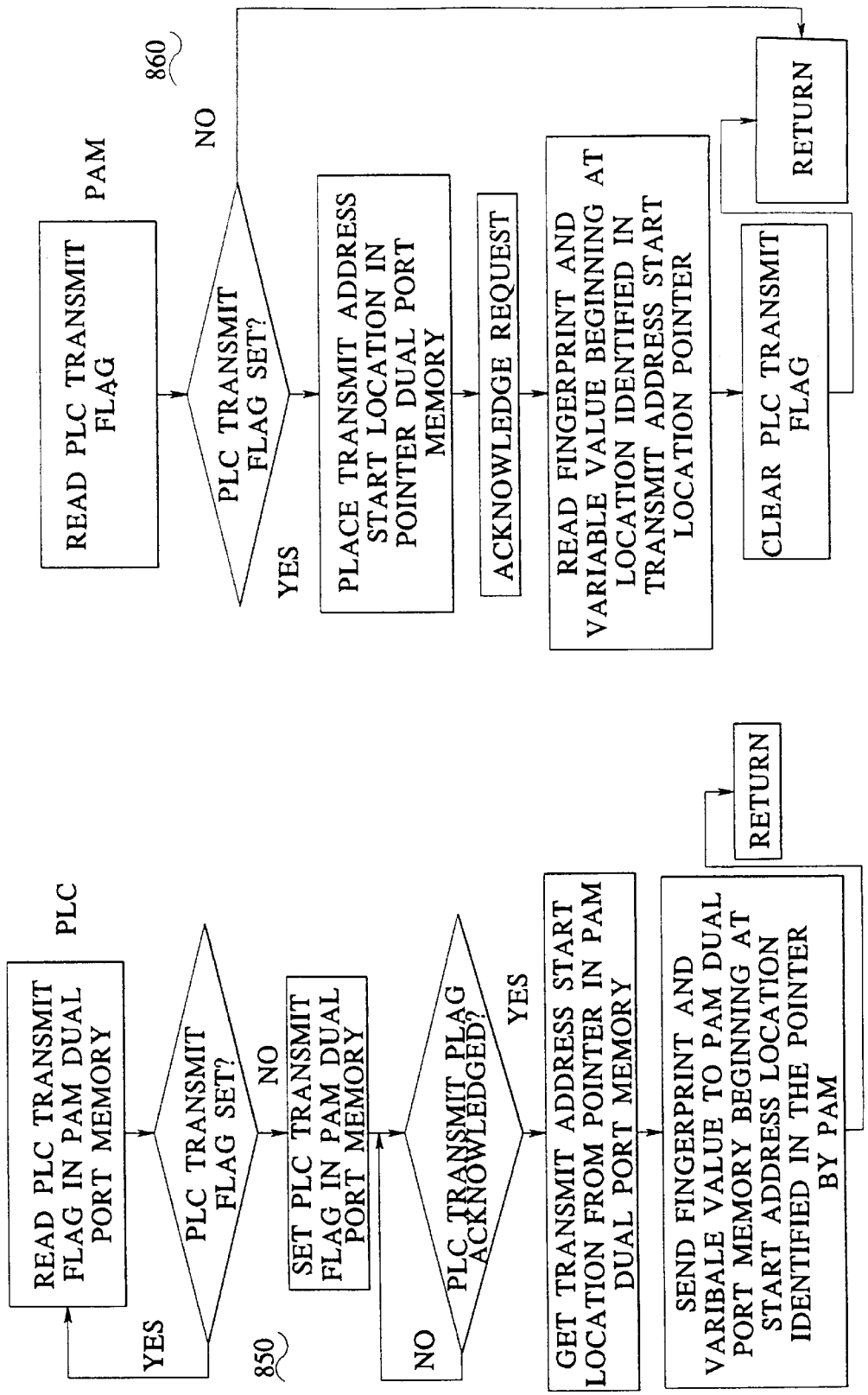
FIG. 14 is a flow diagram illustrating the tasks performed by the PLC and PAM when the PLC transmits a variable to the PAM.

FIG. 14 is a more detailed full diagram of the tasks that are executed by the PLC 80 and PAM 90 in transmitting a PLC variable from the PLC 80 to the PAM 90 PLC tasks are illustrated generally at 850 while the PAM tasks are generally illustrated at 860.

With respect to the PLC tasks 850, the PLC 80 first reads the PLC transmit flag 675 from the dual port memory 150. If the PLC transmit flag 675 is set, the PAM 90 has failed to complete reception of the immediately preceding PLC variable value that was sent. Accordingly, the PLC 80 does not attempt to send a further PLC variable.

Once the PLC transmit flag 675 has been cleared, the PLC 80 sets the PLC transmit flag 675 in the transmit memory area 660 of the dual port memory 150. A check is then made to determine whether the PAM 90 has acknowledged the receipt of the PLC transmit flag 675. Once the transmit flag has been acknowledged, as indicated by a ready of the acknowledge flag 685, the PLC gets the transmit address start location pointer 680 from the transmit memory area 660 of the dual port memory 150. The PLC 80 then stores the finger print and variable value to the dual port memory 150 beginning at the start address location identified in the transmit address start location pointer 680 identified by the PAM 90. The PLC 80 then returns from the transmit variable data tasks 850, for example, to receive PAM variable data or, to transmit further PLC variable data, execute further ladder logic processing, or exiting the user program.

With respect to the PAM tasks 860, the PAM 90 first reads the PLC transmit flag 675 to determine whether it is set. If it is in a set state, the PAM 90 identifies the location to which the PLC 80 is to store the finger print and variable data by placing the start address location in the transmit address start location pointer 680 in the transmit memory area 660 of the dual port memory 150. The PAM 90 then acknowledges the PLC transmit flag 675 by setting the PLC transmit flag acknowledge 685 thus allowing the PLC to send the finger print and variable value to the identified location. Once the request has been acknowledged, the PAM 90 reads the finger print and variable value beginning at the location identified in the transmit address start location pointer 680. The PAM 90 then clears the PLC transmit flag and returns to other tasks such as, for example, receiving further PLC variable data, transmitting PAM variable data, or executing further motion profile commands.

The data variables that are communicated between the PAM 90 and the PLC 80 may have a wide variety of functions. Exemplary data variables that are transmitted from the PLC 80 to the PAM 90 include:

(a) a system production variable that instructs the PAM 90 to begin executing a continuous production cycle upon detection of a start switch depression by the PLC 80 through the I/O interface 95;

(b) a system production stop variable, transferred upon the detection of a stop switch depression by the PLC 80 through the I/O interface 95, that instructs the PAM 90 to control the plurality of servo driven packaging stations to stop execution of a continuous production cycle;

(c) a system step production variable that instructs the PLC 80 to control the plurality of servo driven packaging stations to execute a single production cycle; and (d) a home variable that instructs the PAM 90 to place one or more of the servo driven packaging stations at a predetermined reference position. Exemplary values that may be communicated from the PAM 90 to the PLC 80 include:

(a) a power ON variable, transferred upon detection by the I/O 210 of power supplied to one or more servo driven packaging mechanism, that informs the PLC 80 that power is supplied to the particular servo driven packaging mechanism;

(b) a position error variable that informs the PLC 80 that at least one of the servo driven packaging mechanisms has failed to reach a position within an allotted period of time; and (c) a torque error variable that informs the PLC 80 that at least one of the servo motors driving the plurality of servo driven packaging stations requires an excessive amount of torque to execute a predetermined movement.

The foregoing variable data structure and its corresponding implementation provide numerous advantages over traditional inter-processor communications. For example, the present system facilitates high speed communication between the processors in a resource efficient manner.

Further, system development may be made more efficient. In this respect, it should be noted that each version of the PAM software must be re-compiled before it is implemented within the PAM while the corresponding PLC software does not require such compilation. During system debugging, it may be desirable to limit communications between the PAM 90 and PLC 80 to only several variables. With the present system, both the PAM 90 and PLC 80 may be provided with a complete list of all system variables. During debugging, the PLC software may be used to identify those variables which are to be used during debugging without the necessity of re-compiling the PAM software.

The PAM 90 may be programmed to execute any number of motion profiles to carry out the various packaging process steps implemented by the packaging machine illustrated in FIGS. 1A and 1B. The motion profiles may be stored in the PAM or may be sent using the communicators described above, from the PLC in an "on the fly" fashion. Exemplary motion profiles are set forth in FIGS. 15–41. These motion profiles are applicable to filling, for example, a 70×70 mm gable top carton using processing stations 45, 50, and 55 such as those set forth in the foregoing identified patent applications.

The use of gearboxes and cams, driven by constant velocity motors, to effect mechanism motions usually constrains the mechanism motions to constant velocity, or sinusoidal acceleration, or "modified sine" acceleration profiles. The present system is not constrained in this fashion. Rather, the present system facilitates implementation of motion profiles that enable, not just the movement of a mechanism from point a to point b in time t, but also profiles with accelerations and velocities that can be tailored to minimize the constraints that, for example, amplifier current and voltage limits or product viscosities impose.

Motion profiles to be executed by, for example, the disclosed system using Socapel products, are coded as sequences of positions $p_i$ that vary from 0 to 1. Prior to execution of any particular motion profile the PAM 90:

1) multiplies each $p_i$ by a signed (+/−) scale factor equivalent to the maximum angular distance that we want the motor to rotate during any one machine cycle; and 2) adds to each scaled $p_i$ a signed offset magnitude that shifts the initial $p_i$ (and all subsequent $p_i$) forward or backward from the motor zero position.

The PAM 90 then assumes:

1) that the sequence of positions to be achieved by the motor during runtime will be spread out over the time of one machine cycle; and 2) the time interval between two adjacent $p_i$ is the same as any other two adjacent $p_i$.

Then the PAM 90 associates:

$p_0$ with $t_0$
$p_1$ with $t_1 = t_0 + \Delta t$
$p_2$ with $t_2 = t_1 + \Delta t$
$p_f$ with $t_f - 1 + \Delta t$ where $\Delta t$ = machine cycle time/(#$p_i$ − 1).

An ideal motion profile may be defined in terms of the accelerations (sinusoidal, cosinusoidal, and constant) and positions that the motor is to achieve over the time of a machine cycle. Data points along the ideal position, velocity, and acceleration profiles may then be selected to preserve the shape of the acceleration curve. In practice, this may be between 90 and 360 samples per profile.

To ensure that the PAM 90 and the servomotors 16 are programmed with position profiles that they can execute smoothly, it is presently desirable to create position profiles that are derived from sequences of constant accelerations. To achieve this, the velocity profile that satisfies the initial acceleration and position profiles is utilized. Assuming that each velocity ($v_i$) will be achieved via a constant acceleration, each necessary acceleration ($s_i$) is calculated. The position points $p_i$ are then determined based on the following equations:

$$p_i = p_{i-1} + (v_{i-1} * \Delta t) + (\tfrac{1}{2} * s_{i-1} * \Delta t)^2.$$

The following motion profiles may be implemented using the foregoing method.

Infeed Conveyor Motion Profile

Figure 15:
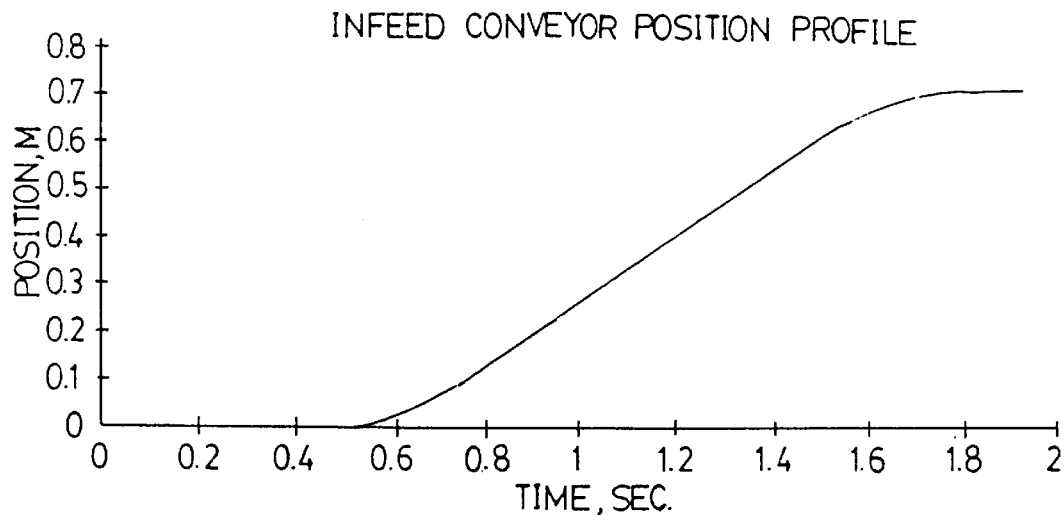
FIGS. 15–41 are exemplary motion profiles that may be executed by the mechanisms of the various package processing stations under control of the control system of FIG. 2.
Figure 16:
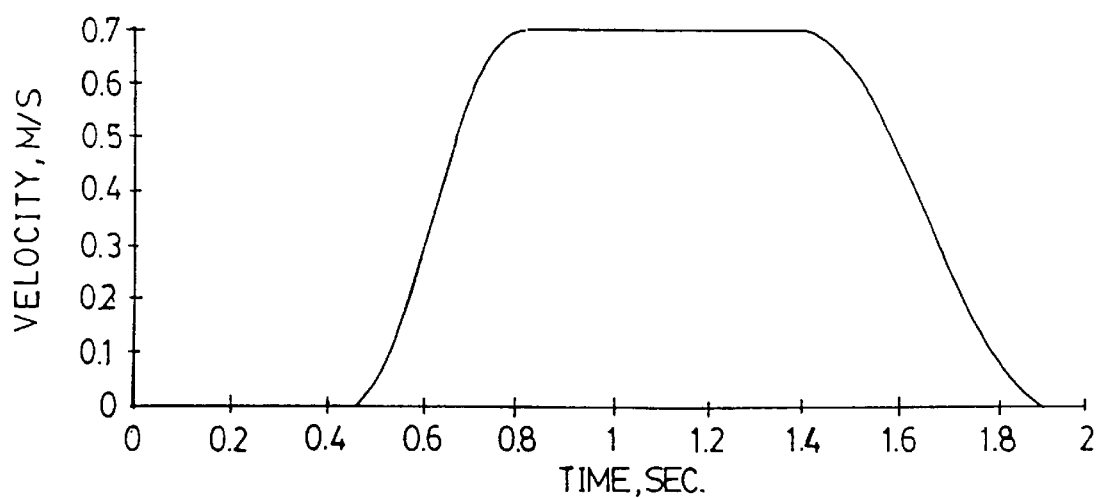
Figure 17:
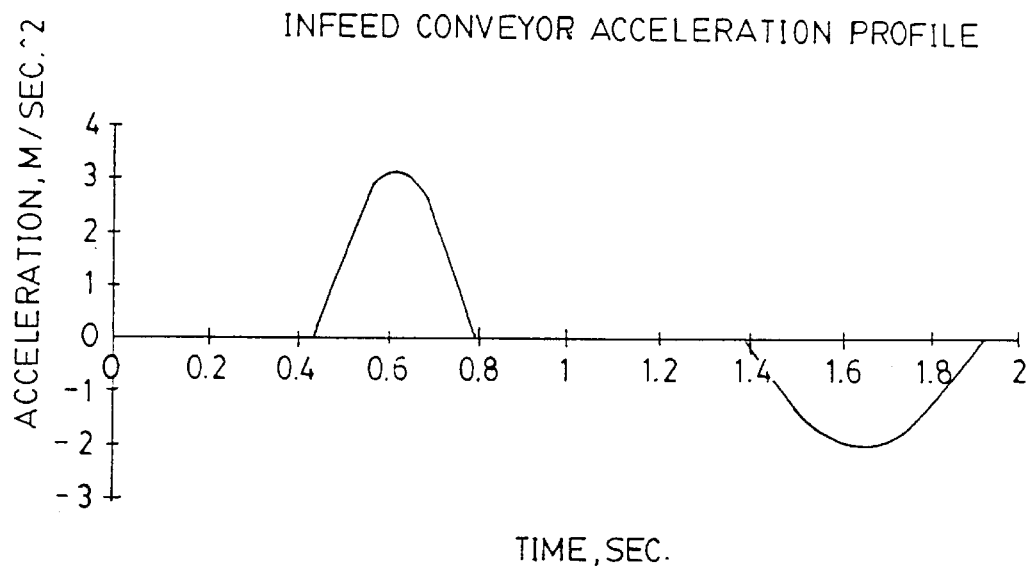

The motion profile for the infeed (or lower) conveyor 30 is set forth in FIGS. 15–17, which illustrate the position, velocity, and acceleration profiles respectively. Sinusoidal accelerations are utilized, instead of more rapidly rising accelerations, to minimize jerking of the pulleys 35, 40. The time of deceleration is made longer than the acceleration time to reduce the magnitude of deceleration. Higher pulley decelerations may cause the conveyor band to slip forward with respect to the pulley when the band is loaded with cartons thereby causing indexing errors.

Upper Conveyor Motor Profile

Figure 18:
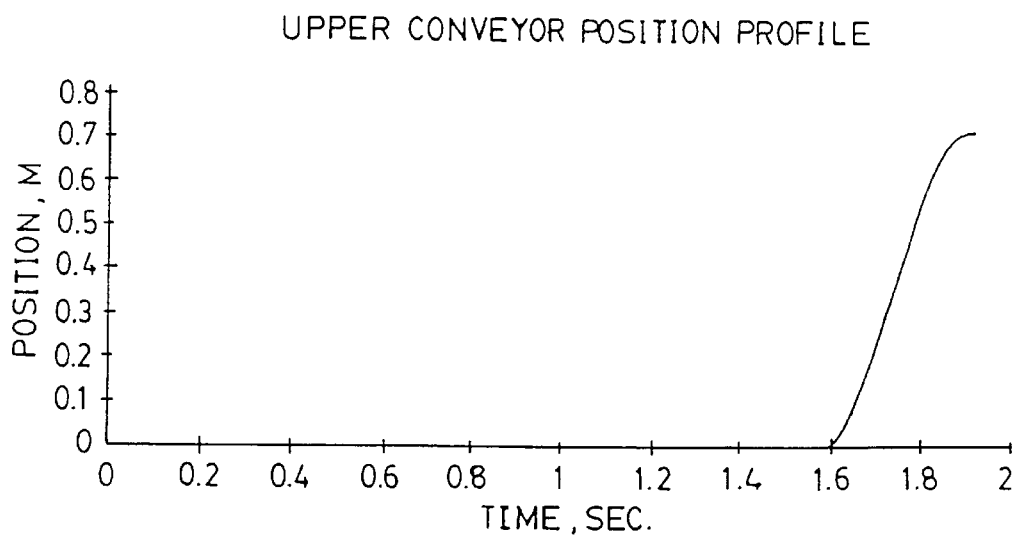
Figure 19:
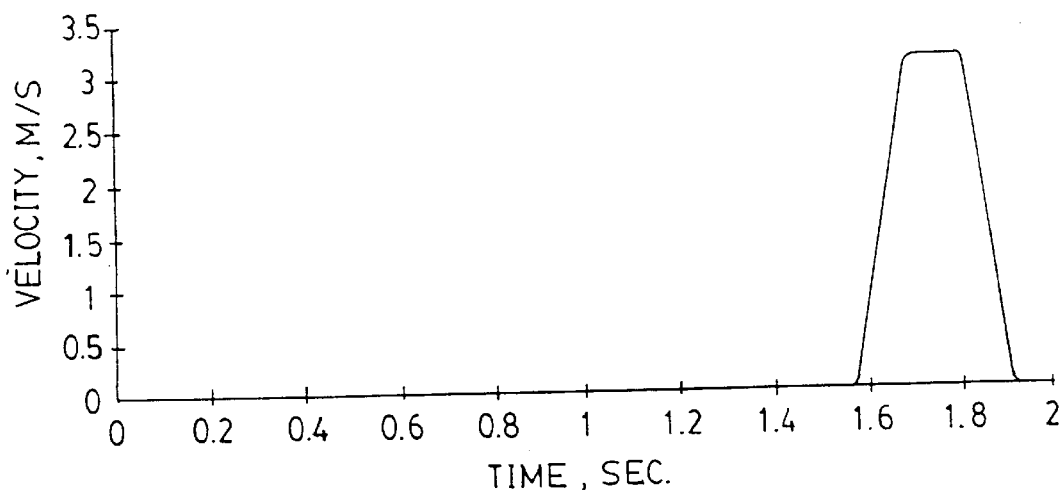
Figure 20:
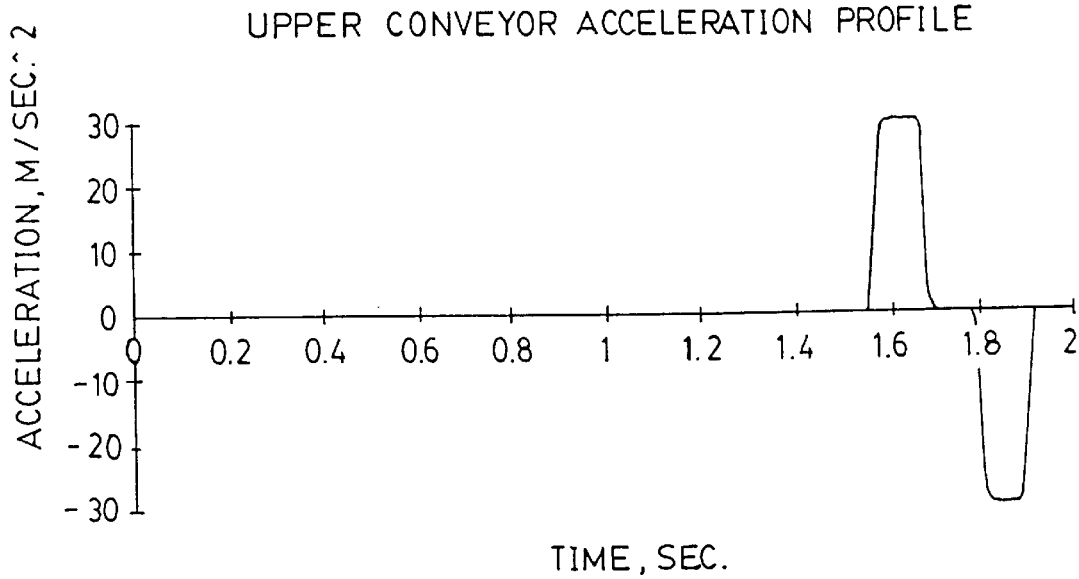

The upper conveyor 25 motion profile may proceed in accordance with the motion profile illustrated in FIGS. 18–20. This profile is basically a ⅓rd, ⅓rd, ⅓rd trapezoidal velocity profile. Higher accelerations may outstrip the ability of the servo amplifier to supply current and voltage. During the time of any acceleration (or deceleration) 20% of the time is spent ramping up to constant acceleration and 20% of the time is spent ramping down to zero acceleration. The ramping of accelerations was implemented to limit jerking of the driven mechanisms.

Lifter Motion Profile

The lifter mechanism of station 45 is constructed in accordance with the teachings of the previously noted application (Attorney Docket No. 1032US01; Corporate Docket No. TRX-0043) and includes a bottom lifter and top prefolder, each driven by a respective servomotor. The motion profiles of the lifter mechanism are set forth in FIGS. 21–26.

Figure 21:
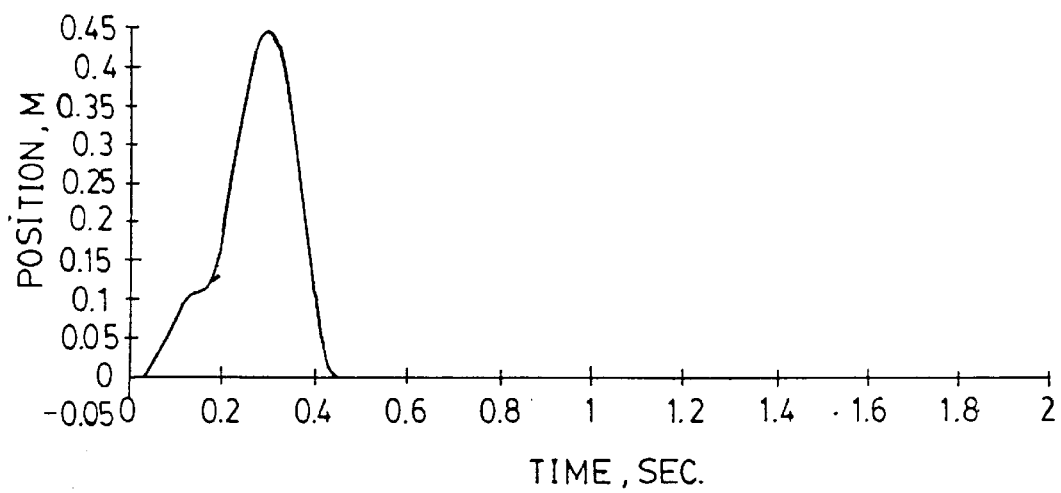
Figure 22:
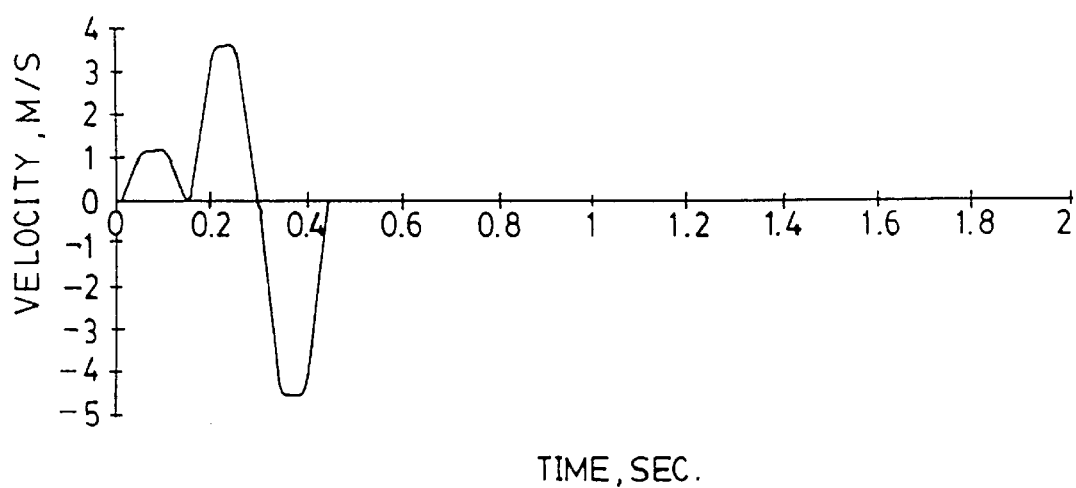
Figure 23:
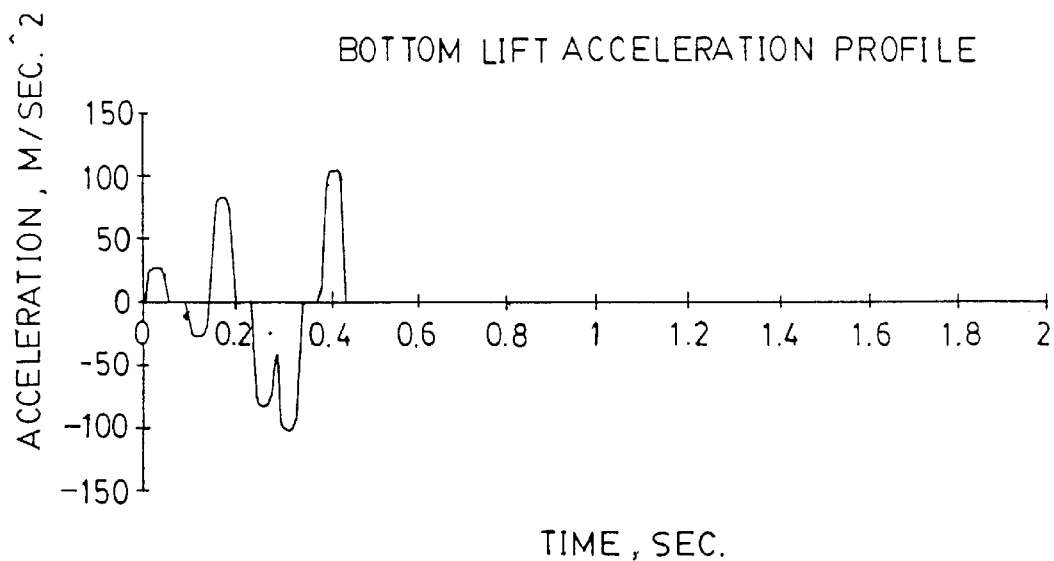

The motion profile for the bottom lifter is set forth in FIGS. 21–23 and consists of three moves. The first motor move lifts the forks up to the bottoms of the cartons in the lower conveyor band 30. The second move drives the forks up through the lower conveyor band 30 and into the upper conveyor band 25 so that the bottom sealing areas are of the cartons in the same plane as the jaws of the horn and anvil of the ultrasonic bottom sealer. The third move returns the forks down to their home position. The third move begins when the jaws of the sealer make contact with the bottom sealing areas of the cartons.

Each move of this profile is basically a ⅓rd, ⅓rd, ⅓rd trapezoidal velocity profile. However, during the time of any acceleration (or deceleration) 20% of the time is spent ramping up to constant acceleration and 20% of the time is spent ramping down to zero acceleration. The ramping of accelerations was implemented to limit jerking of driven mechanisms.

Figure 24:
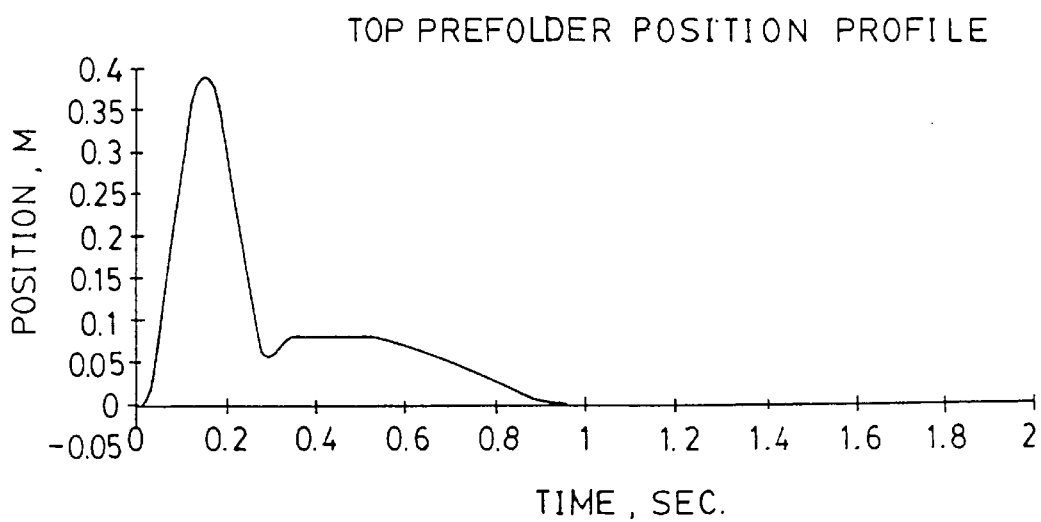
Figure 25:
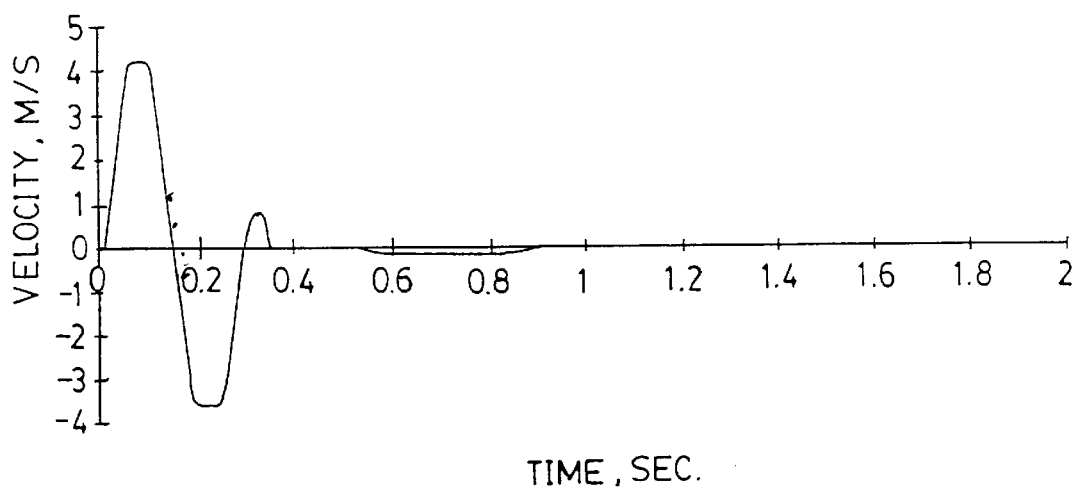
Figure 26:
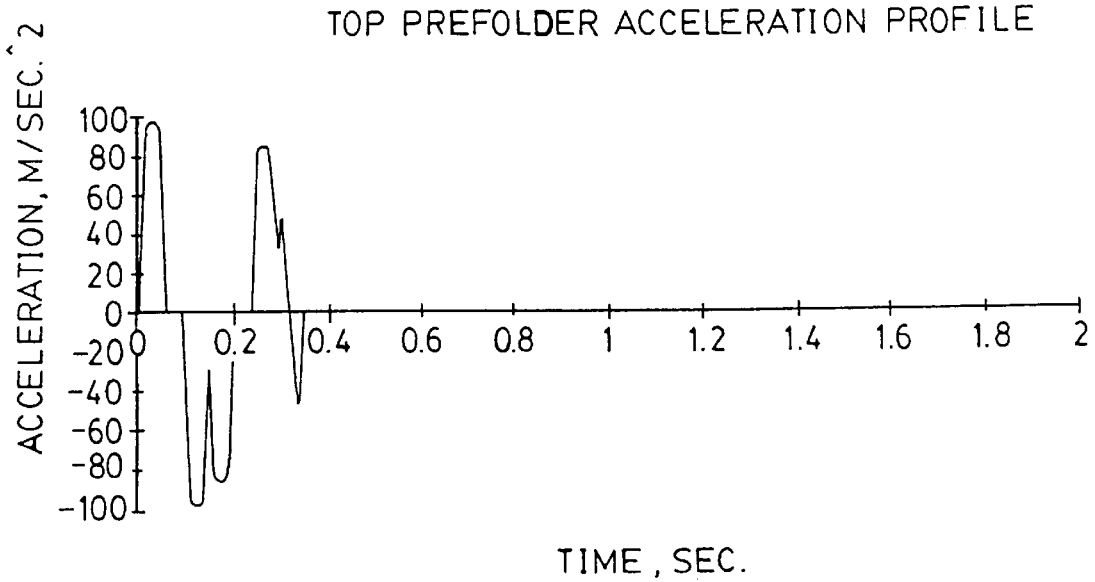

The motion profile for the top pre-folder is set forth in FIGS. 24–26 and consists of four moves. The first motor move drives the prefolder forks down through the upper conveyor band 25 into the lower conveyor band 30 to the level of the carton tops. Since the bottom lift forks arrive at the carton bottoms at the same time, the bottom lift forks and the prefolder forks secure the cartons. The second move draws the prefolder back up through the upper conveyor band 25. This second move is similar to the second move of the bottom lift but in the opposite direction so that the cartons remain secure in the grips of both sets of forks. The third move drives the prefolder down a length sufficient to keep the bottom sealing surfaces of the cartons in the same plane as that of the bottom sealer jaws during jaw closure. Without this downward move of the prefolder, the bottom sealing surfaces of the cartons would slide over the sealer jaws during their closure. The third move begins when the sealer jaws have made contact with the bottom sealing surfaces of the carton. The fourth move draws the prefolder clear of the carton tops and up to its home position sometime before the upper conveyor band 25 moves. The retraction move begins after the sealer jaws have firmly gripped the carton bottoms.

Each move of the profiles of FIGS. 21–26 is basically a ⅓rd, ⅓rd, ⅓rd trapezoidal velocity profile. However, during the time of any acceleration (or deceleration) 20% of the time is spent ramping up to constant acceleration and 20% of the time is spent ramping down to zero acceleration. The ramping of accelerations was implemented to limit jerking of the driven mechanisms.

Bottom Sealer Motion Profile

The bottom sealer of station 45 may be constructed in accordance with the teachings of the previously noted application (Attorney Docket No. 10454US01; Corporate Docket No. TRX-0082). The ultrasonic bottom sealer disclosed therein includes a cam mechanism that is driven by a servomotor.

Figure 27:
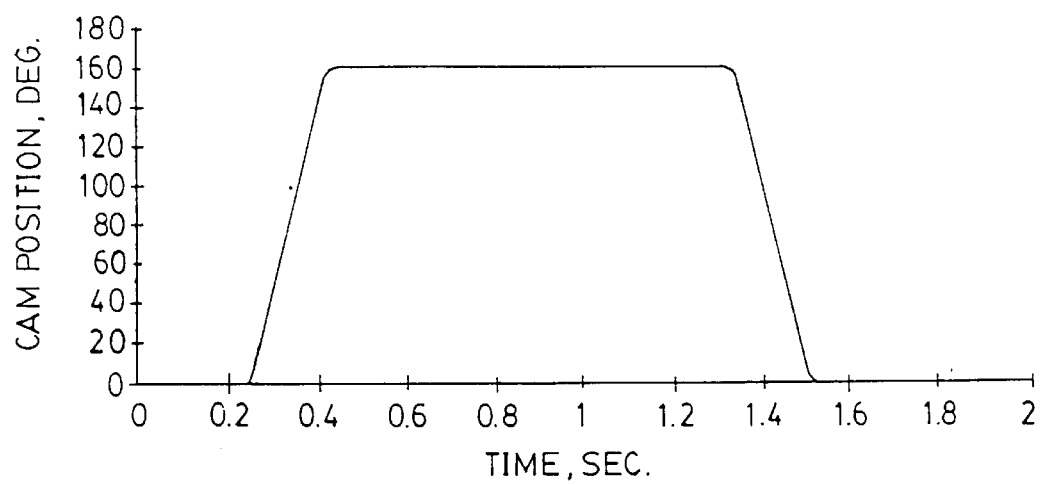
Figure 28:
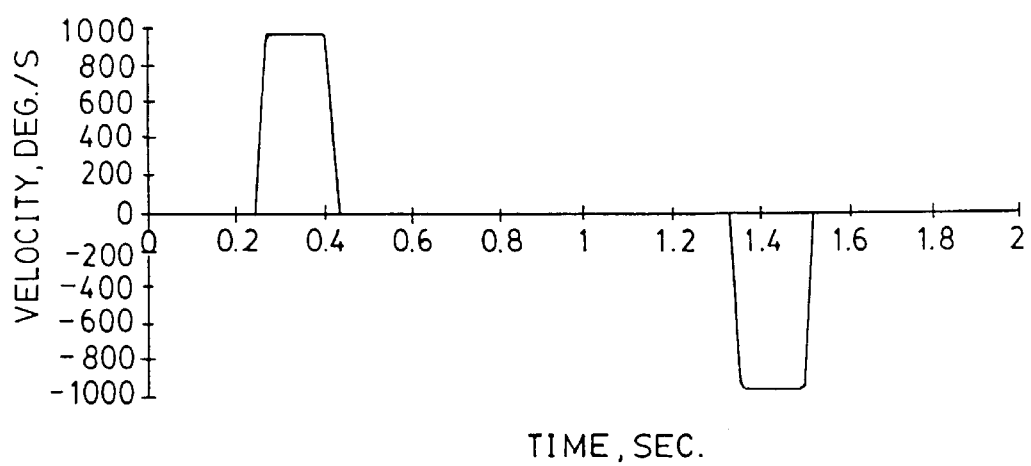
Figure 29:
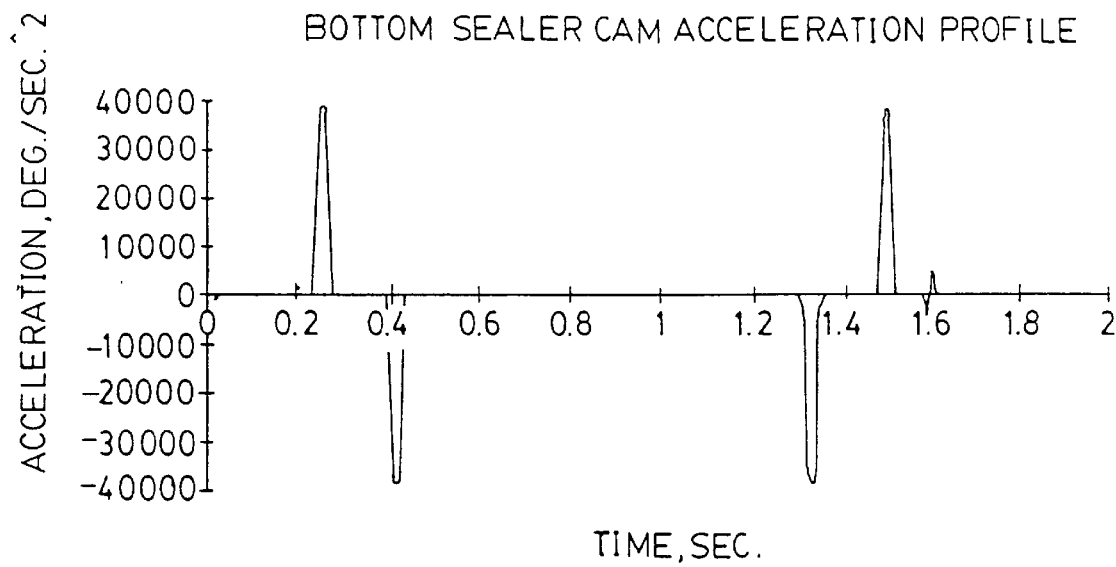

The motion profile for the bottom sealer is set forth in FIGS. 27–29 and includes two moves. The first motor move rotates the cams so that the sealer jaws close. The first motor move begins far enough in advance so that the jaws make contact with the carton bottoms just after the carton bottoms arrive in the plane of the jaws. The second motor move rotates the cams so that the sealer jaws open. Each move spends 15% of the move time accelerating, 70% of the move time at constant velocity, and 15% of the move time decelerating. The cams are shaped to move the jaws during the constant velocity portion of the move. Thus, the possibility of adding torques required to move the jaws to torques required to accelerate the cams is avoided.

Each move of this profile is basically a 15%, 70%, 15% trapezoidal velocity profile. However, during the time of any acceleration (or deceleration) 20% of the acceleration time is spent ramping up to constant acceleration and 20% of the acceleration time is spent ramping down to zero acceleration. The ramping of accelerations was implemented to prevent jerking of the driven mechanisms.

Fill Lifter Motion Profile

The fill lifter of processing station 50 may be constructed in accordance with the teachings of the application (Attorney Docket No. 10325US01 Corporate Docket No. TRX-0043) and the application (Attorney Docket No. 10602US01; Corporate Docket No. TRX-0044). Each of these applications, as previously noted, is incorporated by reference.

Figure 30:
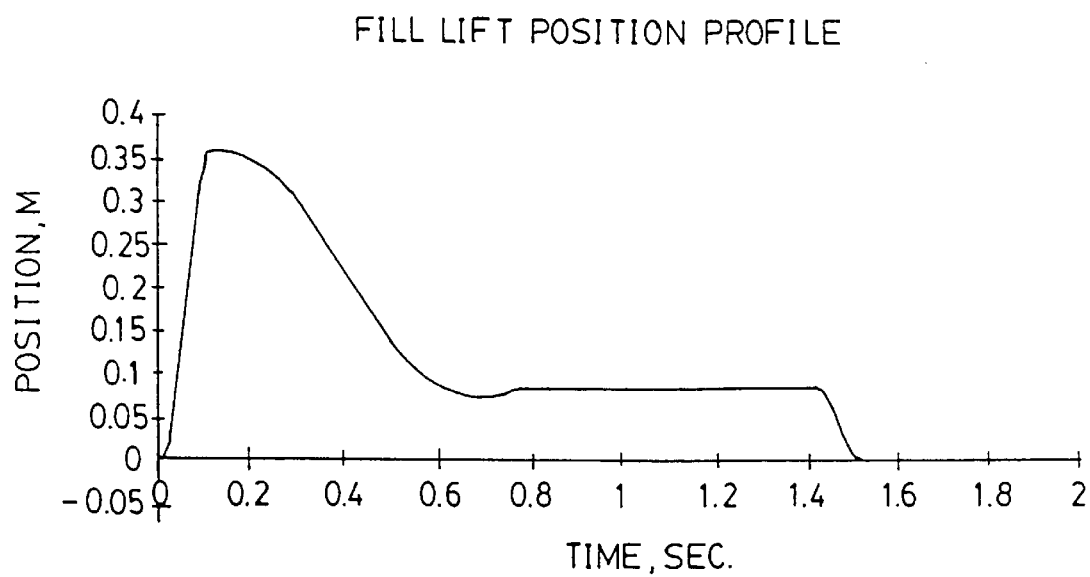
Figure 31:
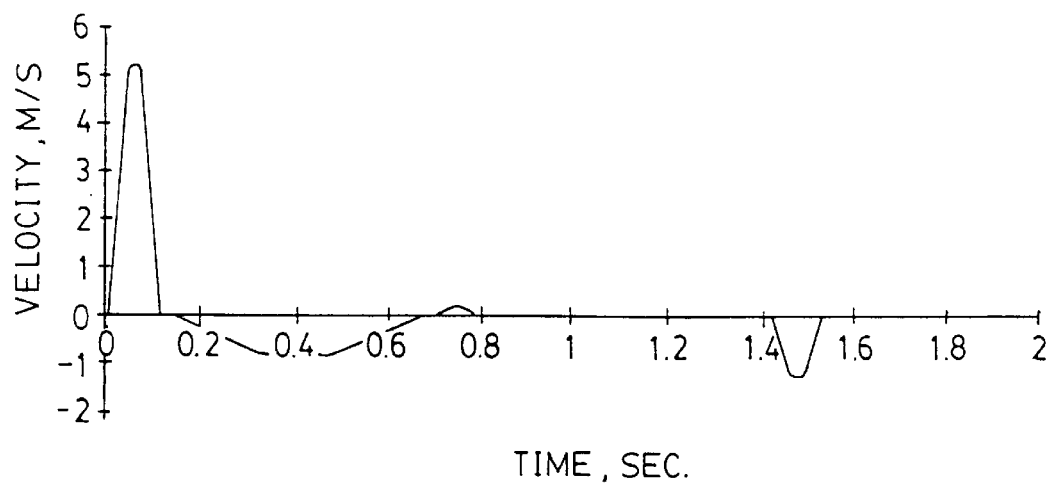
Figure 32:
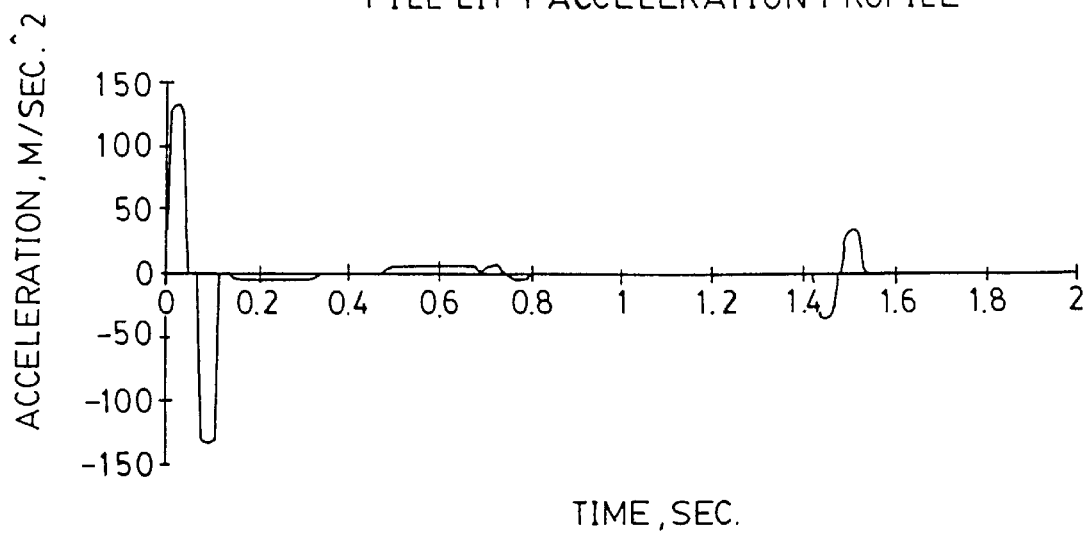

The motion profile for the lifter mechanism is set forth in FIGS. 30–32 and includes four moves. The first motor move drives the fill lift up through the upper conveyor band 25 and the cartons into the fill chambers of the filling stations proximate the fill nozzles. The distance moved is sufficient to bring the carton bottoms within a few mm of the bottom of the fill nozzles. The first move drives the lift up as quickly as possible. The accelerations have been ramped and made as small as possible to both minimize stress on the bands and couplings and to minimize demands on servo amplifier current.

The second move draws the lift down from the fill nozzle. It begins slightly after filling begins. The second move draws the lift down from the fill nozzle at velocities sufficient to keep the fill nozzle close to the level of the liquid as the liquid is dispensed. For hygienic reasons, the lifter mechanism moves down fast enough to prevent the liquid level from rising to levels that immerse the outside of the nozzles in the liquid. To minimize splashing and foam, the lift mechanism moves down slow enough to keep the liquid level close to the bottom of the nozzles. The second move ends when the top sealing areas of the cartons are in the plane of the top sealer jaws.

The third move drives the fill lift up a length sufficient to keep the top sealing surfaces of the cartons in the same plane as that of the top sealer jaws during jaw closure. Without this upward move of the fill lift, the top sealing surfaces of the carton may slide under the sealer jaws during their closure. The third move begins when the sealer jaws have made contact with the bottom sealing surfaces of the carton.

The accelerations of the third move have been limited to ~0.5 g to assist in preventing carton bulging and food spray. Food sprays are undesirable for hygiene reasons. Bulging cartons are likewise undesirable. First, they are difficult to handle without damage, because the bulging implies an internal pressure that can abet carton leaks. Further, bulging implies extra oxygen in the carton that can degrade product taste.

The fourth move draws the fill lift down to its home position sometime before the upper conveyor band 25 indexes. The retraction move begins after the sealer jaws of the top sealer have released the carton tops.

Each move of this profile is basically a 40%, 20%, 40% trapezoidal velocity profile. However, during the time of any acceleration (or deceleration) 20% of the time is spent ramping up to constant acceleration and 20% of the time is spent ramping down to zero acceleration. The ramping of accelerations was implemented to limit jerking of the driven mechanisms.

Fill Pump Motion Profile

The processing station 50 may include a fill pump that pumps liquid from a storage tank into the cartons. The fill pump includes a piston that reciprocate back and forth to alternately fill and empty a pump chamber. The piston may be driven by a screw mechanism that, in turn, is driven by a servomotor.

Figure 33:
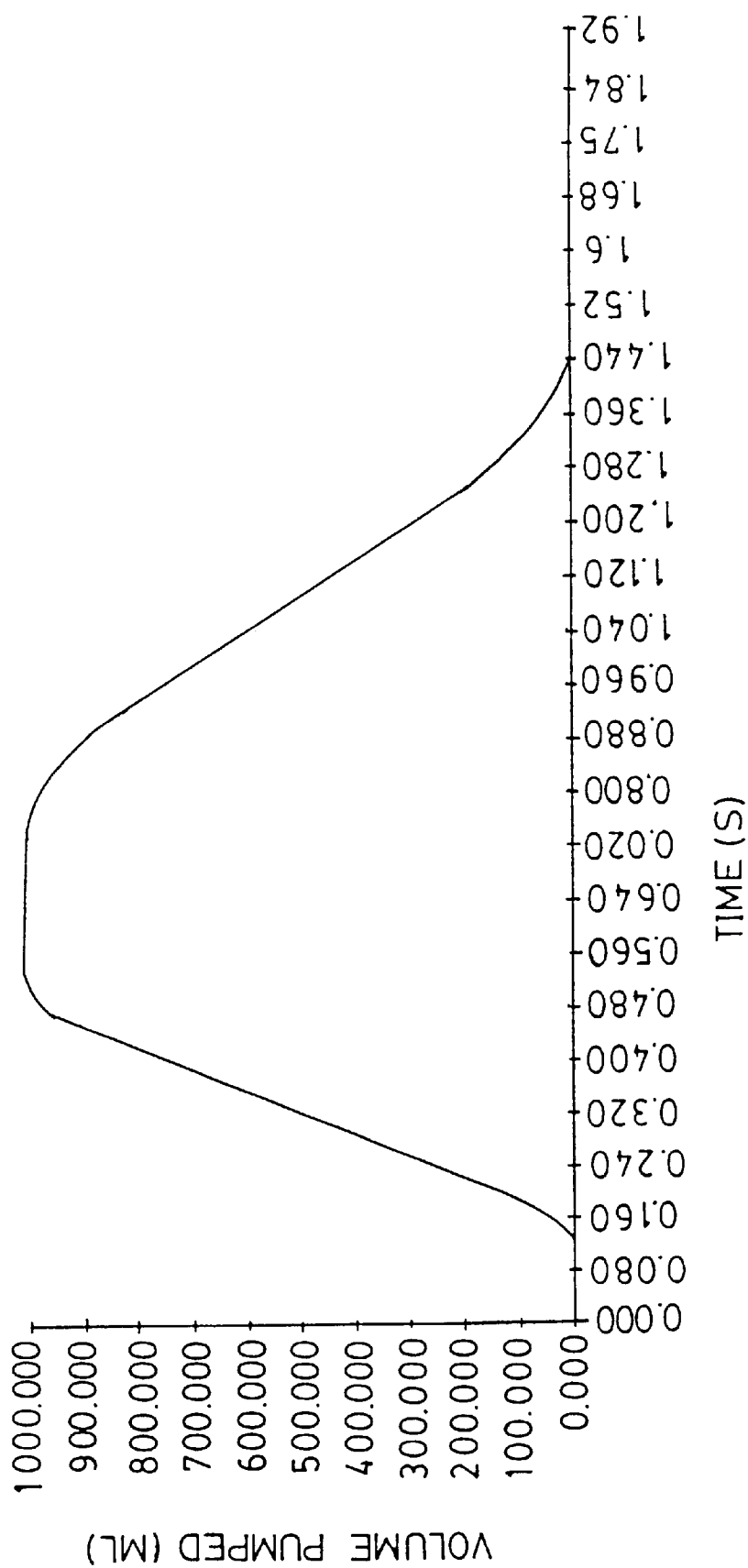
Figure 34:
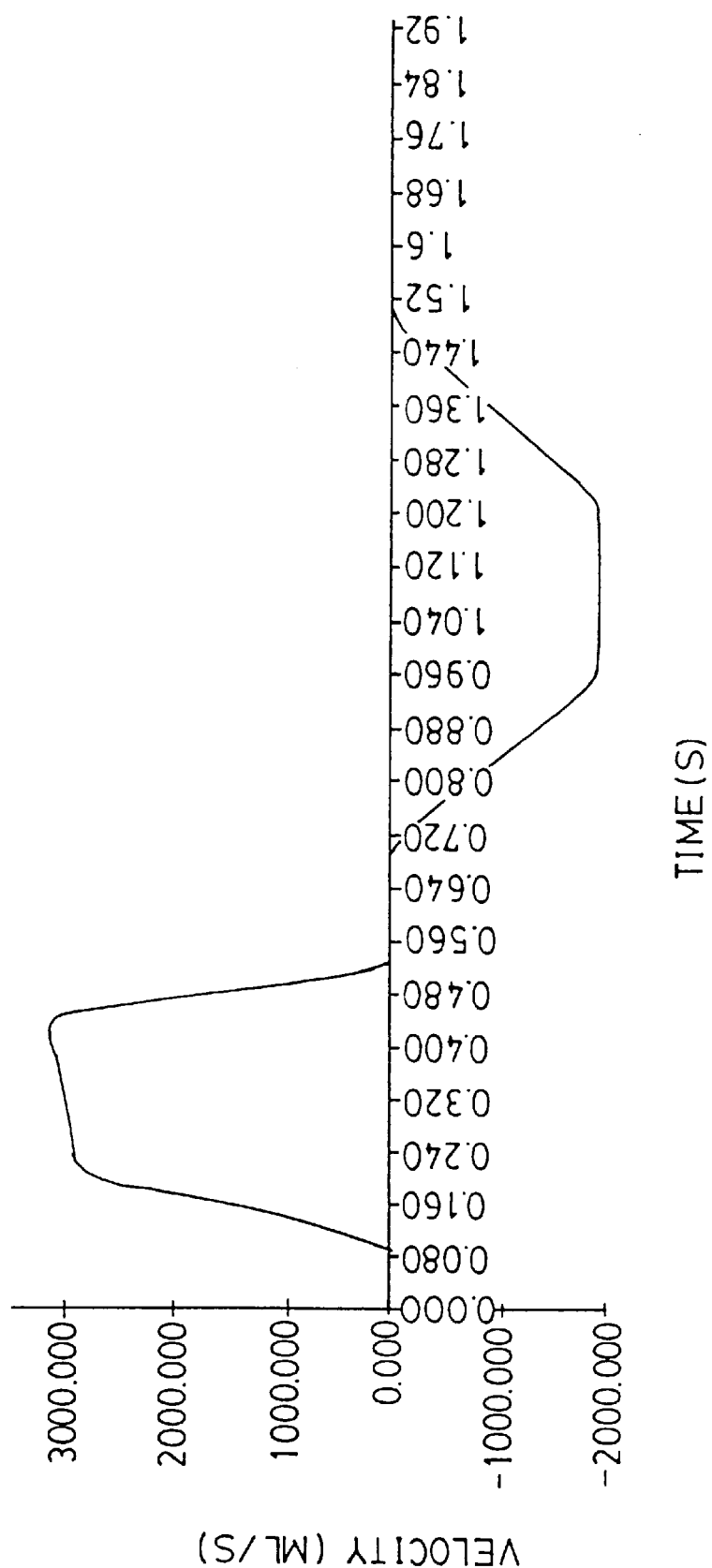
Figure 35:
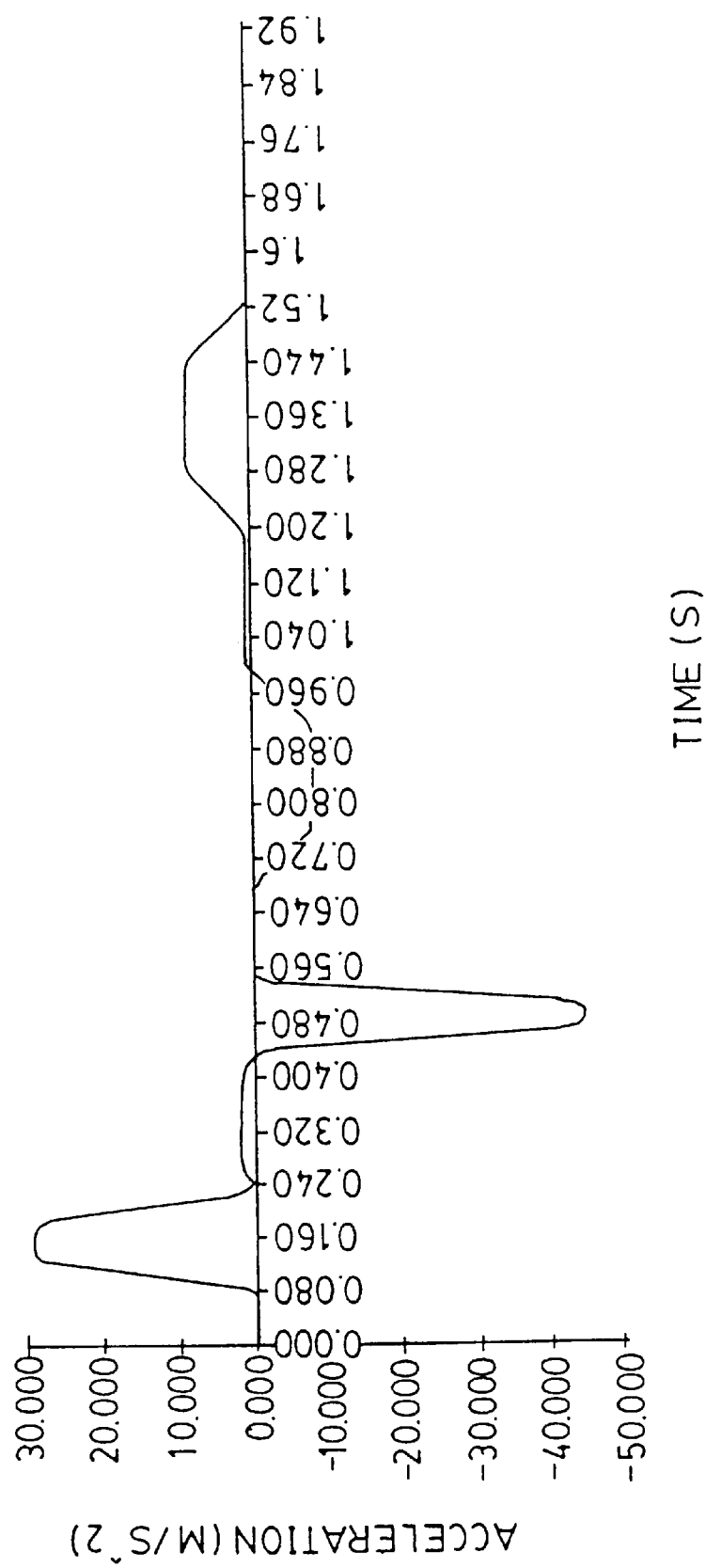
Figure 36:
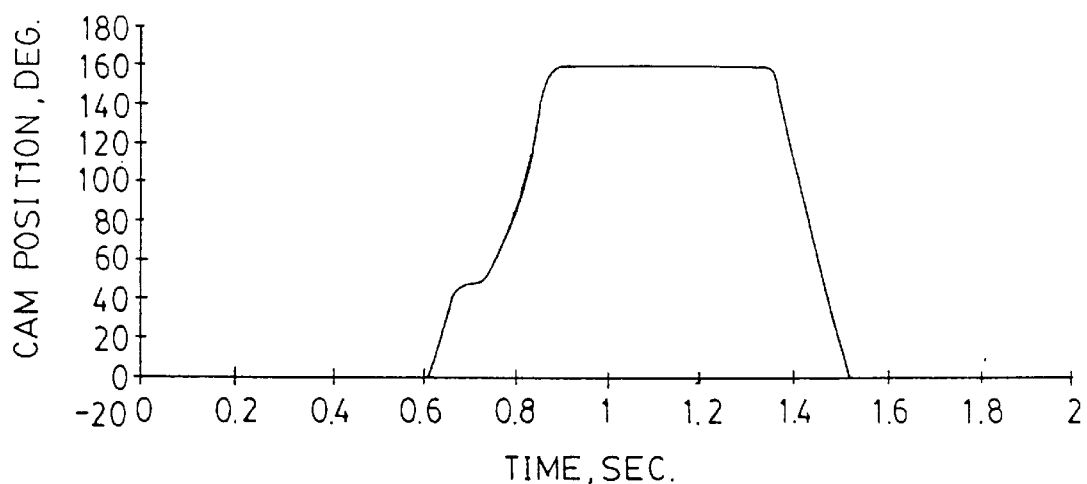

The motion profile for the fill pump is illustrated in FIGS. 33–35 and includes two moves. The first move—the fill move—drives the pump piston forward to drive liquid down through the fill nozzle and into the carton. The second move—the recharge move—drives the pump piston backward to draw liquid from the storage tank into the pump chamber.

The aim of the fill move is to get liquid into the carton as fast as possible. However, pump velocities must be kept below those velocities that cause unacceptable splash and foaming. During the first part of the fill move (the "acceleration" part of the move) the velocities can be, and are, increased dramatically as the liquid depth increases. After some characteristic depth is achieved, the rate of increase in liquid velocities must be slowed to keep splash and foaming to acceptable levels. This defines the second part (the "almost-constant-velocity" part) of the move.

During the third part of the fill move, deceleration is done as quickly as possible. The magnitude of the deceleration is related to the time required to close the outlet valve so that the liquid flow reaches zero at the same time that the outlet valve is closed. If the valve closes too early, an incorrect volume will be delivered to the package. Additionally, if the pump piston continues its stroke after the outlet valve closes, the increased fluid pressures will force a spray of liquid through the pump housing and diaphragm and out to various parts of the machine. Such an event compromises the hygiene of the machine. If the valve closes too late, then air will enter the nozzle and the pump chamber which will, again, cause an incorrect volume to be delivered to the package. The faster the deceleration, the more precise the timing of the valve closing has to be.

During the recharge move, accelerations and velocities are limited to prevent gasses from coming out of solution due to pressure reductions. Gas bubbles in the fill pump chamber may cause inaccurate liquid volumes to be delivered to the package. Pump accelerations are kept below those that keep flow accelerations below 1 g. Pump velocities are kept below those that enable flow velocities of 2 m/s or greater in the recharge pipes.

Top Sealer Motion Profile

The top sealer of station 50 is, for example, constructed in accordance with the teachings of the application (Attorney Docket No. 10454US01; Corporate Docket No. TRX-0082). That application, as noted above, is incorporated by reference.

Figure 37:
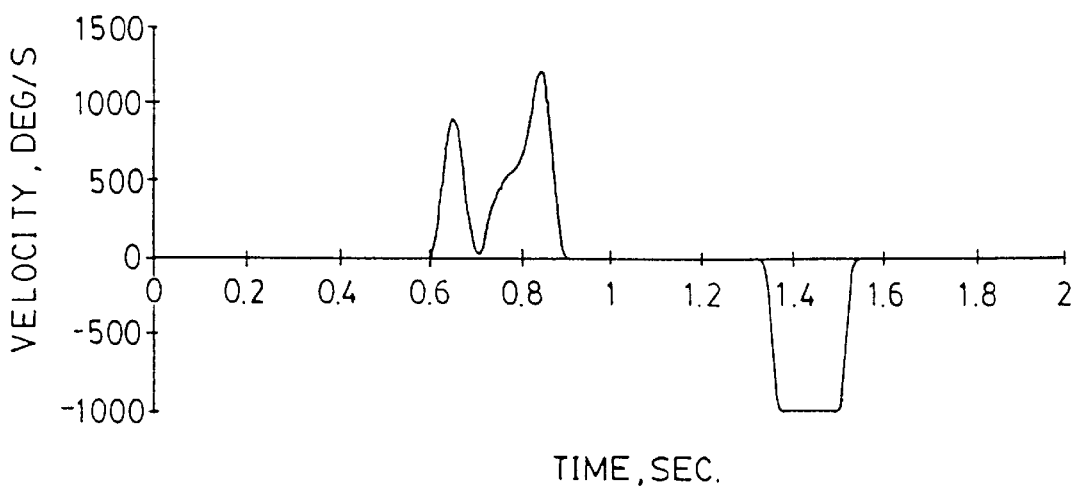
Figure 38:
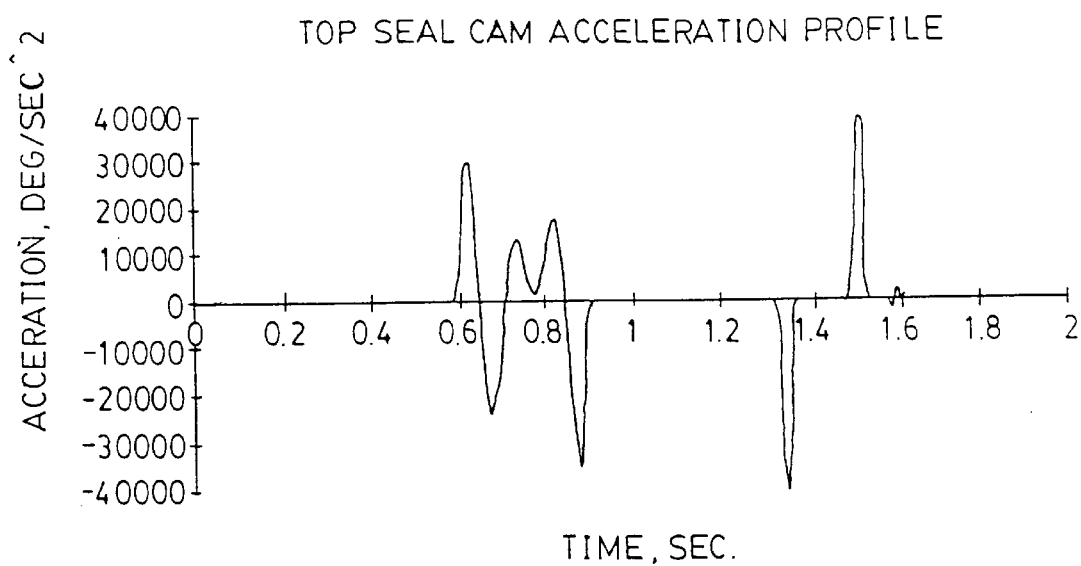
Figure 39:
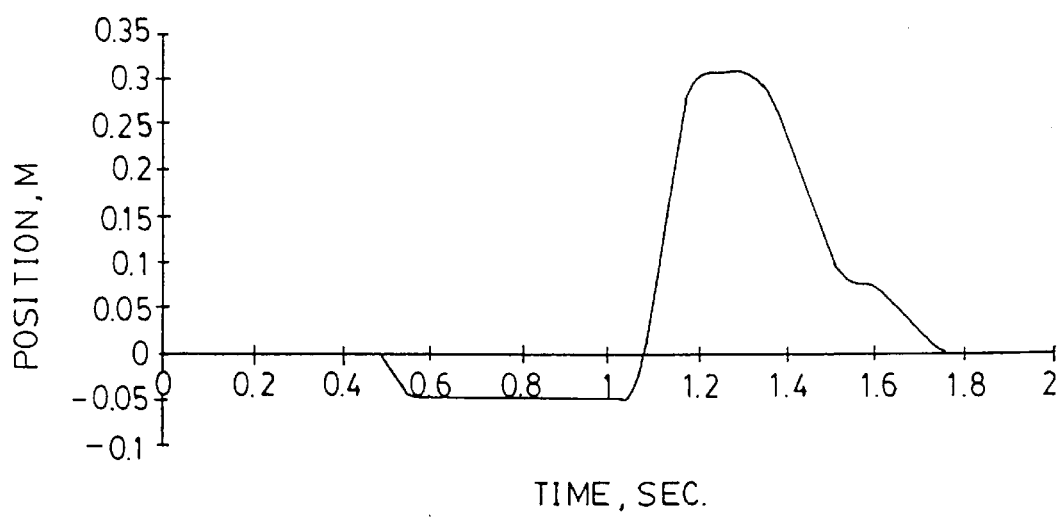

The motion profile for the top sealer is set forth in FIGS. 37–39 and includes two moves which drive the cam. The first move of this profile closes the top sealer jaws. It is an atypical move consisting of three polynomial splines. The first spline rotates the cams so that the jaws make contact with the top sealing areas of the cartons simultaneously with their arrival at the jaws. The cams arrive at that point with a very low velocity. The low cam velocity is selected so that the jaw velocities are small enough to give refold mechanisms, such as those described in (Attorney Docket No.10455US01; Corporate Docket No. TRX-0047)), entitled "Apparatus for Sealing the Fin of a Gabled Container", incorporated herein by reference, time to shape the carton tops for proper folding. At the same time it is desirable to have a velocity greater than zero so that the subsequent acceleration can be instituted without having to overcome static friction.

The second spline of the move rotates the cams until the jaws—and thus, the carton tops are about 5 mm apart. It is desired that this move last 100 ms to continue giving time to allow the refold mechanisms to fold the cartons and, further, to allow excess air to escape from the cartons. It is also desired that the velocity at the end of the second spline be as low as possible while still enabling the jaws to finish closing in the next 100 ms via the third spline. The low velocity at the end of the second spline (and, thus, at the beginning of the third spline) extends the time for air escapment into the third spline. The third spline has to decelerate as fast as possible to complete the cam rotation and jaw closing in the allotted 100 ms.

The second move opens the top sealer jaws and is the same as the move that opens the bottom sealer jaws. That is, the move spends 15% of the move time accelerating, 70% of the move time at constant velocity, and 15% of the move time decelerating. During the time of any acceleration (or deceleration) 20% of the time is spent ramping down to zero acceleration. The ramping of accelerations is implemented to reduce jerking of the driven mechanisms.

Bottom Former Lift Motion Profile

Processing station 55 includes a bottom former that forms a flattened seating area from the gabled bottom of each carton. The bottom former may be constructed in accordance with the teachings of the application (Attorney Docket No. 10599US01; Corporate Docket No. TRX-0064). The bottom former thus includes a cup array that forms the carton bottoms and, further, transfers the cartons from the upper conveyor 25 to the outfeed mechanism. The cup array is moved by a linear activator (lifter) that is driven by a servomotor.

Figure 40:
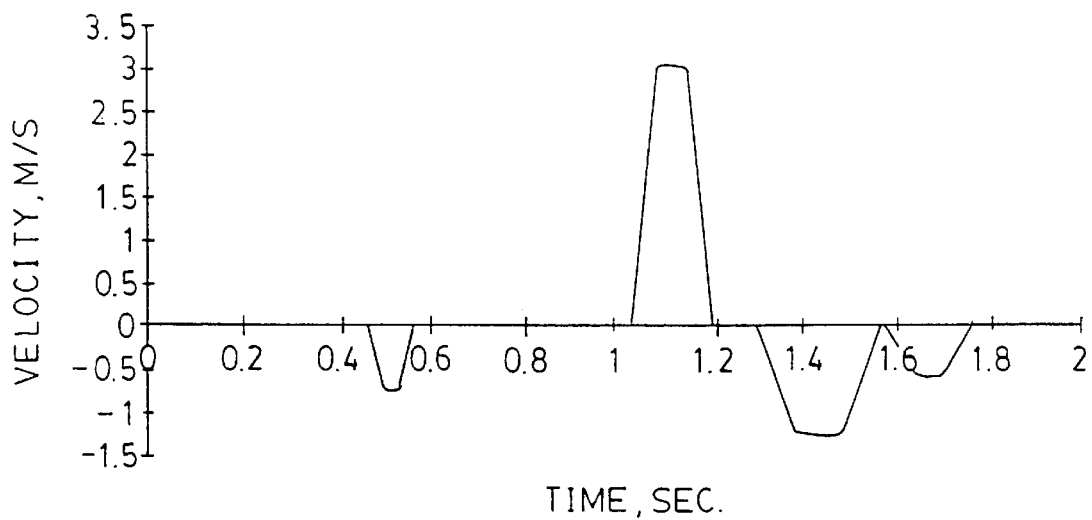
Figure 41:
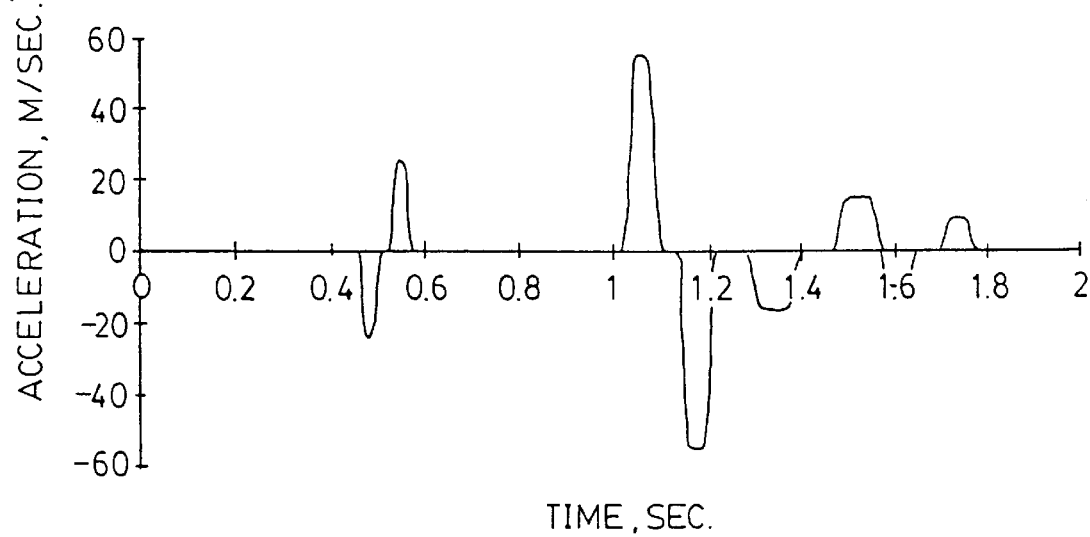

The motion profile for the lifter is set forth in FIGS. 39–41. The motion profile begins with the cartons already in the cups of the array. At this point the cups can move down whereas the cartons can not move down any further. The first motor move drives the cups down a sufficient distance to allow the ejecting mechanisms to drive the cartons from the cups and assure that the top edges of cups cannot "trip" the cartons when they are pushed horizontally out of the station. The cups have to remain at that level long enough for the pusher of the outfeed mechanism to shove the cartons out and then retract back out of the upward path of the cups.

The second move of the profile begins as soon as the pushers are clear of the upward path of the cups. The second move drives the lift up as fast as the servo amplifier can allow. Within the accelerations (or decelerations) of this move 20% of the time is spent ramping up to constant acceleration and 20% of the time is spent ramping down to zero acceleration. The ramping of accelerations is implemented to reduce jerking of the driven mechanisms. After the lift has finished the move up, it must dwell there long enough to allow the cup vacuum to drive the carton bottoms firmly into the cups.

After the dwell, the third move takes the cup array down as quickly as is necessary to reach a level at which the cartons are below any mechanism that would otherwise collide with the cartons and/or lift when the conveyor indexes. The smallest accelerations that enable the avoidance of collisions are desirable, first, to prevent the cups from leaving the cartons behind and, second, to keep the bottom folds of the carton as tight against the cup bottoms as possible.

The fourth move does not have to cope with any abnormal demands and, thus, is a leisurely drop down to the home position.

Slipping Correction

For a servo controlled packaging machine such as the one disclosed to perform properly, the machine's repeatability of motion should be within design specifications. In most cases, the specification for all motion axes to stop is ±0.5 mm of the designated stop position. For a well adjusted servo system motor operating freely, this stopping repeatability is not a problem. However, when the motors are linked via belts, chains, and gearboxes to actual physical mechanisms, the backlash and wear of gearboxes and the flex in the belts and chains may cause the final stopping position to be outside the acceptable tolerance limits.

Correction may be accomplished in the servo program through a correcting algorithm such as the one described below, which detects slippage while the motor is in operation, increases or decreases the motor speed to correct this slippage, and brings the motor to a halt at the correct position. This algorithm works in conjunction with the normal "motion profile" of the servo motor, and corrects for slippage on-the-fly during the normal operation and thus is able to complete the move in the designated time. The total machine cycle time is not altered due to this correction, and the machine is able to continually meet its production requirements. In addition, the correction algorithm also monitors the amount of slippage, and if the actual slippage exceeds a preset maximum allowance, the program may warn the operator of this excessive slippage. The operator, in turn, could check for mechanical damage or problems, and take corrective action.

Figure 42:
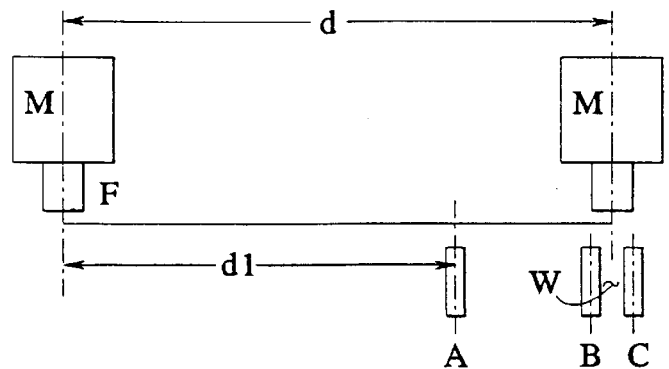
FIGS. 42 and 43 illustrate one algorithm for slip correction.

The operation of the correction algorithm is as follows and is understood with reference to FIGS. 42 and 43. Assuming that the distance the mechanism M moves is d in time t. The mechanism M contains a target flag F, which is noticed by the sensors A, B, and C positioned at certain intervals along the distance d. The width of the flag F is w, which is also the distance between the sensors B and C. Under normal operation, the mechanism M is commanded to move the distance d in time t, and when it comes to a halt, sensors B and C must be ON in order to guarantee that the mechanism did indeed move the distance d. However, if sensor B and C or both are OFF when the mechanism M completes the move, we can assume that the stop position of M is outside the acceptable limits for the next motion to continue.

This is where sensor A is used. Sensor A is placed at a distance $d_1$ from the start of the move of the mechanism M, and the flag F turns it ON briefly during its move after time $t_1$. The time $t_1$ when sensor A is turned ON is used to determine whether the motion of mechanism M is on-track as commanded or if there is some slippage. In essence, time $t_1$ is compared to a value $t_{ref}$ held in a register in the servo program, a value that is calculated from theoretical means if the mechanism M were to move as designed. However, due to slippage, $t_1$ could be different from $t_{ref}$.

If $t_1 > t_{ref}$ the mechanism M is lagging during its move $t_1 < t_{ref}$ the mechanism M is leading during its move By comparing the value of $t_1$ to $t_{ref}$, we can determine the amount and direction of slippage in the mechanism M, and correct for it.

Figure 43:
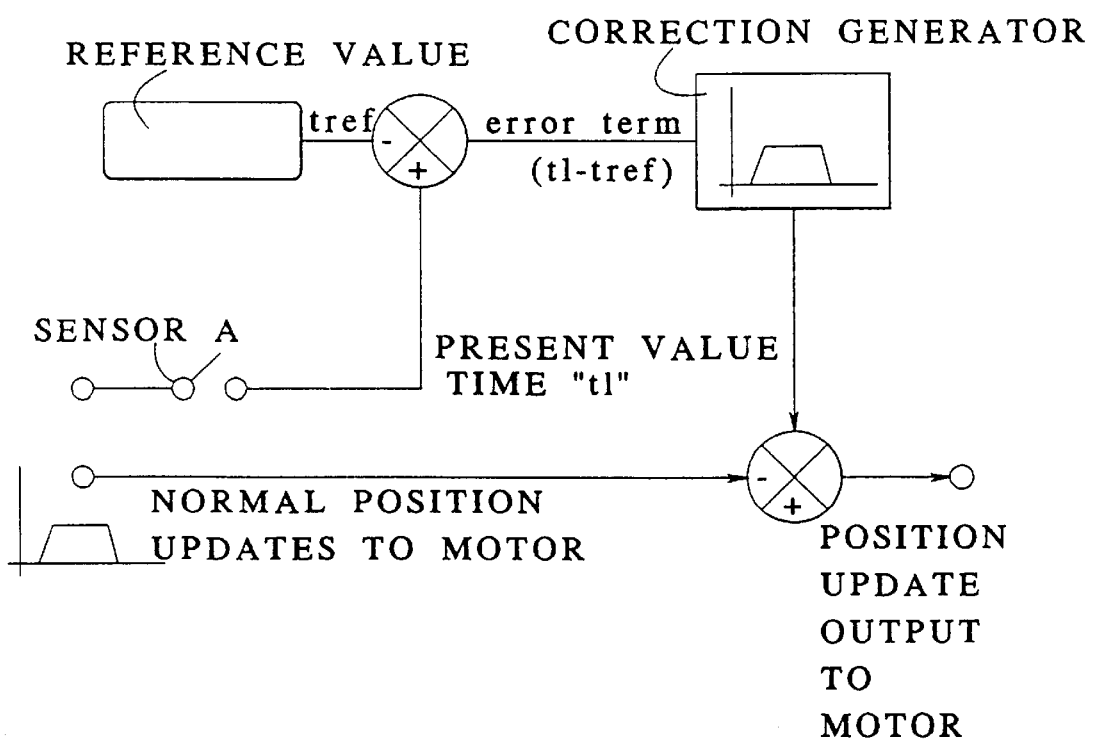

The correction is accomplished in a manner that may be understood with reference to FIG. 43. Under normal operation, position updates are provided to the motor, and the motor carries out the command. However, when the correction algorithm is engaged, an error term is calculated when the sensor A becomes ON. When sensor A is ON, the time $t_1$ value is noted and compared to the $t_{ref}$ value. The difference is then applied to a correction generator algorithm which converts the time difference to position difference, and adds the correction term to the normal input of position updates. This in turn is downloaded to the motor, which carries out this modified position update in order to reach the designated position at the right time.

Figure 44:
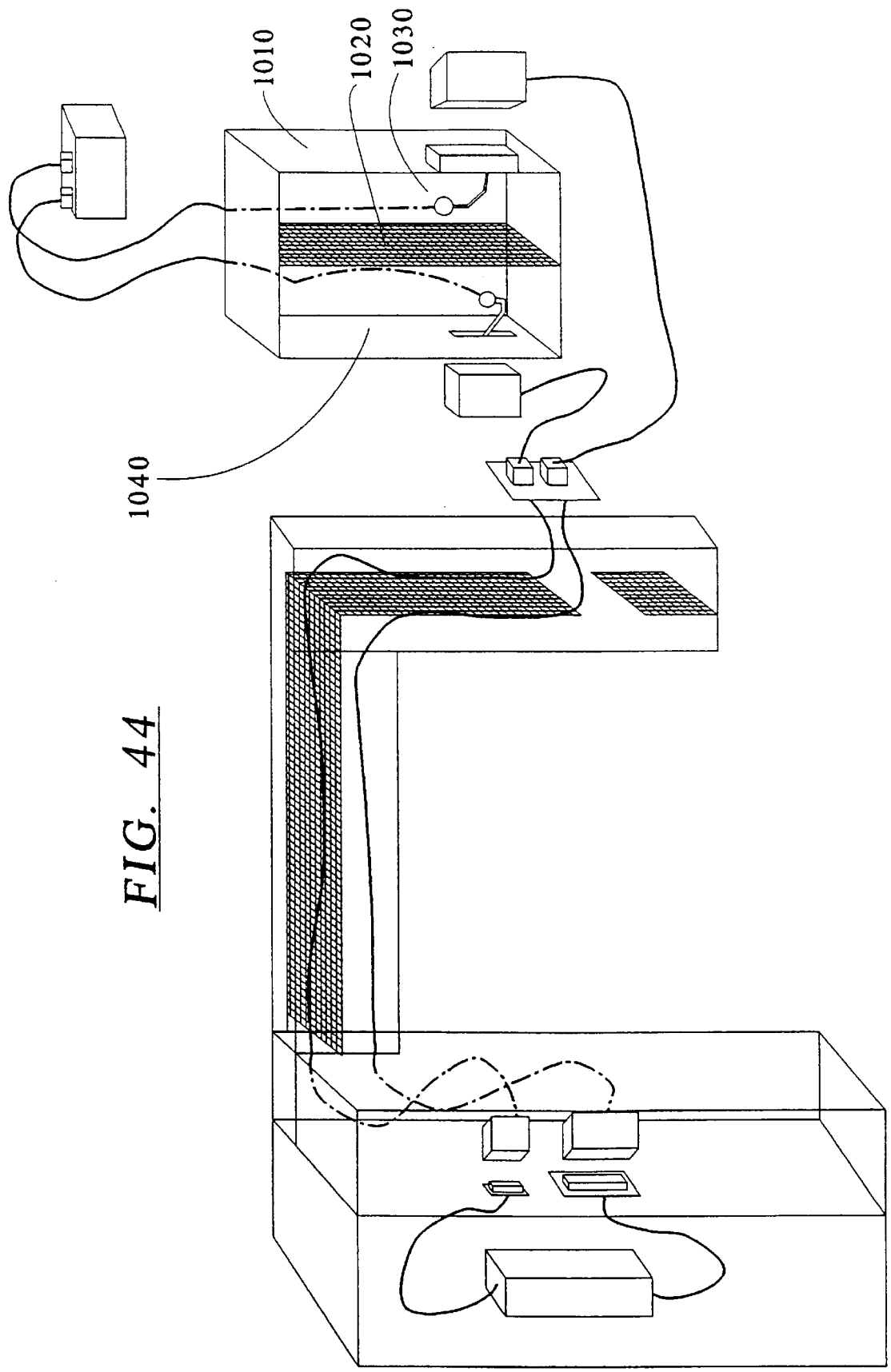
FIGS. 44 and 45 illustrate a modular circuit configuration that may be used in connection with each apparatus of each processing station.
Figure 45:
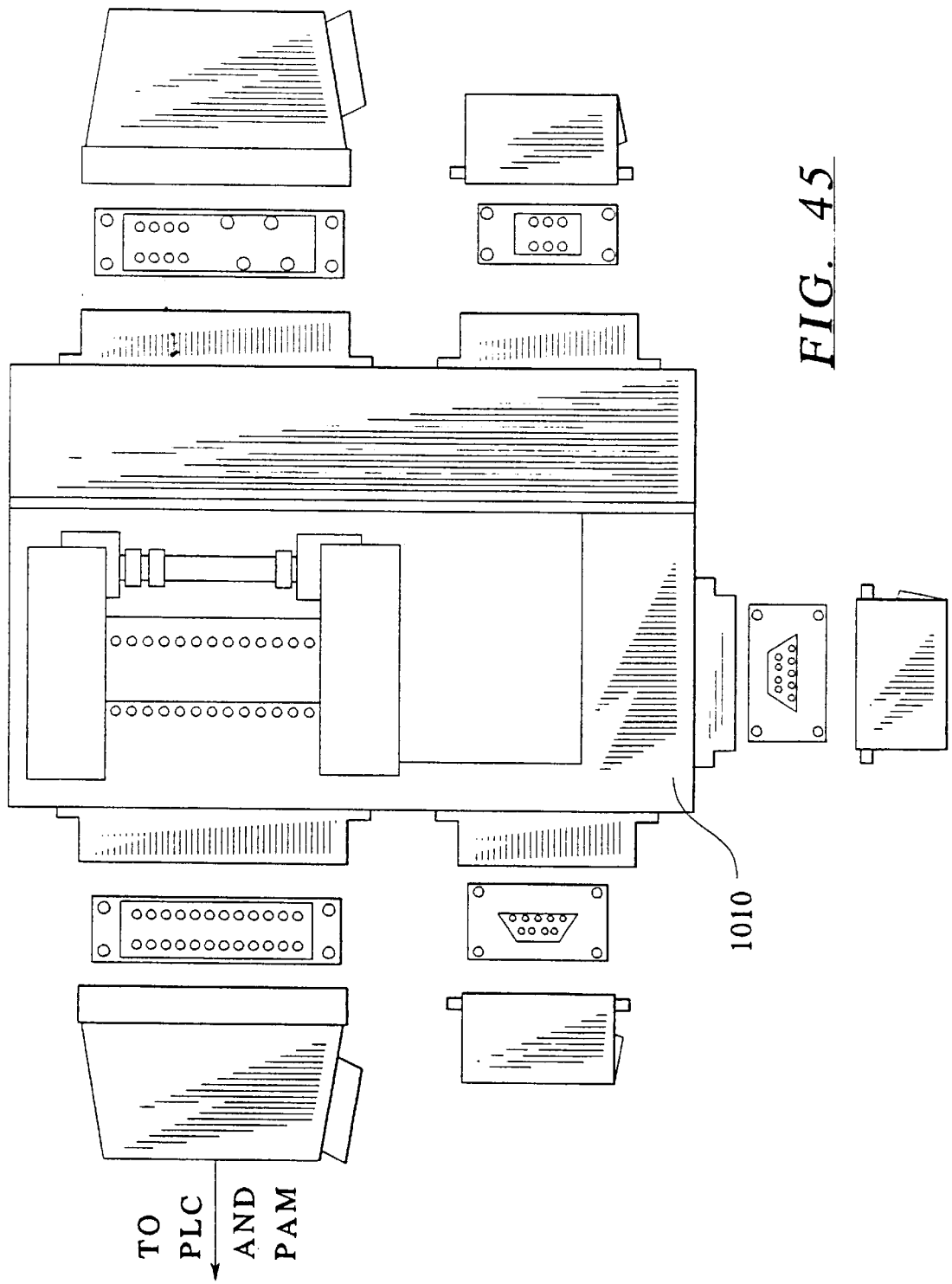

FIGS. 44 and 45 illustrate a modular-type connection box that may be associated with each apparatus of each processing station 45, 50, and 55. As illustrated, each apparatus may have a connection box 1010 that includes a plurality of signal and power connections. The box 1010 may include a noise shield 1020 disposed between the side 1030 of the box 1010 receiving power and side 1040 of the box 1010 receiving the signal and control lines.

Although the present invention has been described with reference to a specific embodiment, those of skill in the art will recognize that changes may be made thereto without departing from the scope and spirit of the invention as set forth in the appended claims.

It will be apparent from the figures how the main parts of the packaging machine are placed in a frame 1 which, is in a know manner, constructed from square tubes so as to support and positionally fix the main parts included in the machine in relation to one another. For purposes of better clarity of FIGS. 46–53, all surrounding, per se known machine parts have been removed, as well as those cladding plates and hatches which normally cover both the frame and the majority of the machine parts carried by the frame 1. In the finished state, the packaging machine comprises not only the parts visible in FIGS. 46–53, but also per se known electric and pneumatic equipment, connection conduits therefor, drive means, guiding devices and an outer casing in the form of covering plates, hoods, hatches and doors. However, these details do not necessitate illustration or detailed presentation, since they are not germane to the present invention as such, nor do they influence the construction or operating principle of the machine proper.

Figure 46:
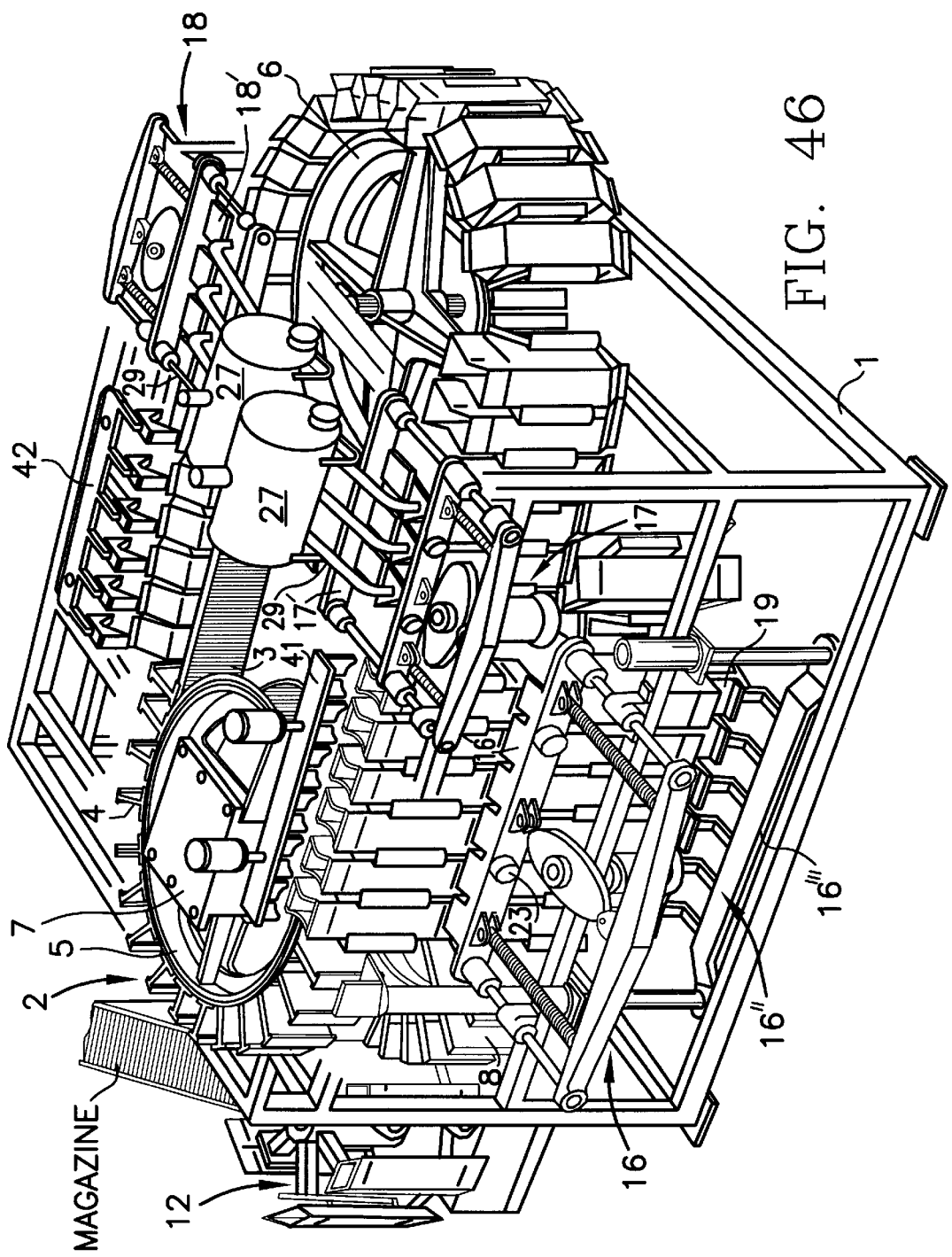
FIG. 46 is a perspective view of the major parts of the packaging machine with protective cladding and other obstructive elements of the machine having been removed.
Figure 47:
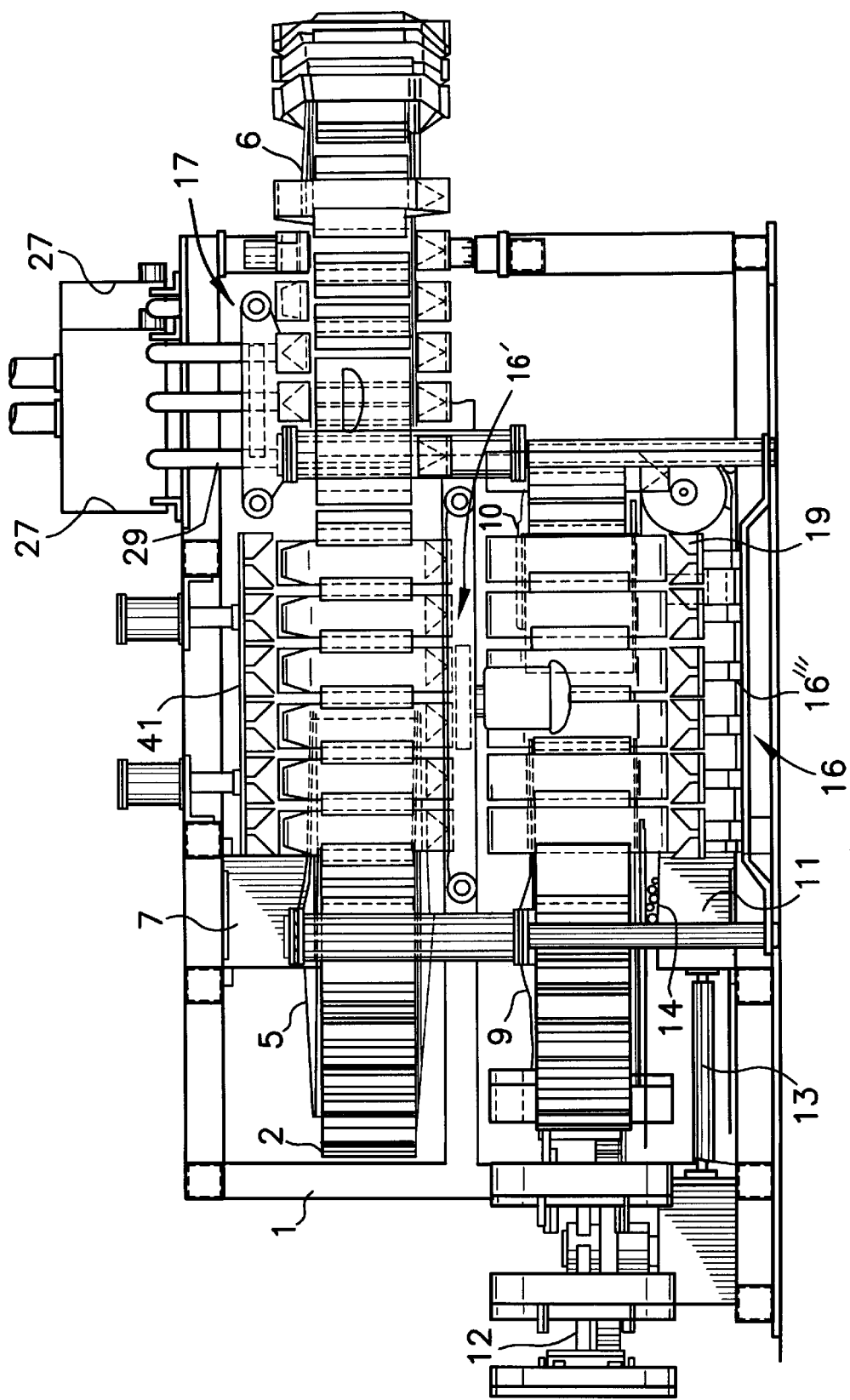
FIG. 47 is a side elevation of the skeletal structure of the machine of FIG. 46.

The frame 1 illustrated in FIG. 46 carries a main conveyor 2 extending in the longitudinal direction of the machine and comprising an endless conveyor belt 3 which is provided with uniformly spaced projecting, T-shaped carriers 4 forming compartments therebetween for accommodating the packaging container blanks, whose quadratic cross section substantially corresponds to the equivalent dimensions of the compartments. The conveyor belt 3 runs horizontally between two wheels 5 and 6, of which the one is driven by an electric motor 7 which is placed above the wheel 5 and fixedly secured in the frame 1.

Immediately beneath the main conveyor 2, there is an infeed conveyor 8 which is likewise extends horizontally between two wheels 9 and 10, one of which is disposed substantially at the central region of the machine, and so the infeed conveyor 8 is of a length which only amounts to roughly half of the length of the main conveyor 2. The infeed conveyor 8 is also provided with carriers and is thus divided into compartments for accommodating the individual packaging containers, as is apparent from FIGS. 48 and 50.

Immediately adjacent the one end of the infeed conveyor, an infeed wheel 12 is disposed at the infeed end of the machine, this wheel being drivably connected via a gearbox and a shaft 13 with the drive shaft 14 of the motor 11. The infeed wheel 12 displays a number of devices being disposed, during simultaneous reforming of the packaging container blanks, to transfer them from a magazine to the infeed conveyor 8. This part of the packaging machine is shown and described in detail in European Patent Application Number 90311570.7, to which reference is now made, and will not, therefore, be described in greater detail in this context.

Figure 48:
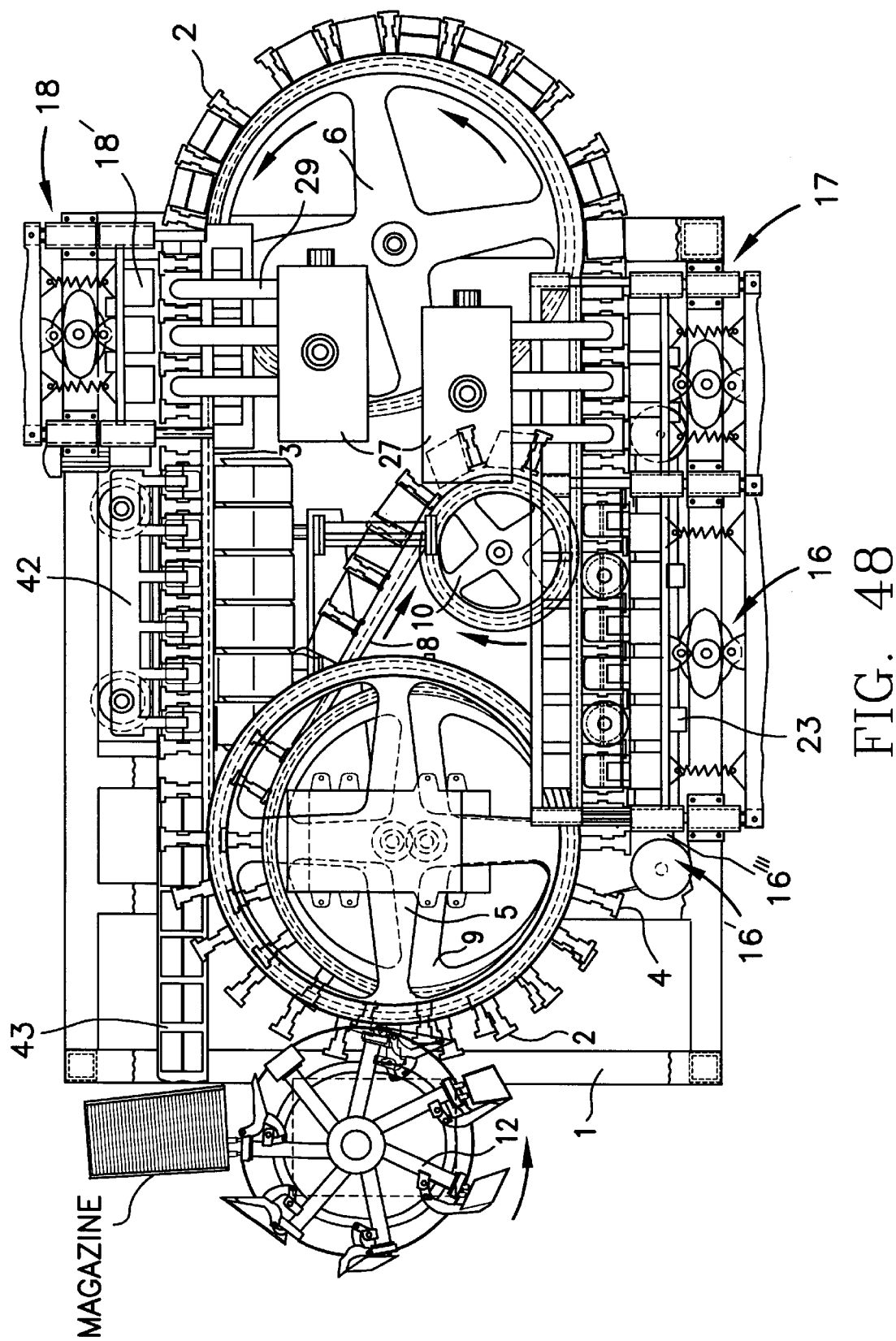
FIG. 48 is a top plan view of the skeletal structure of the machine of FIG. 46.
Figure 49:
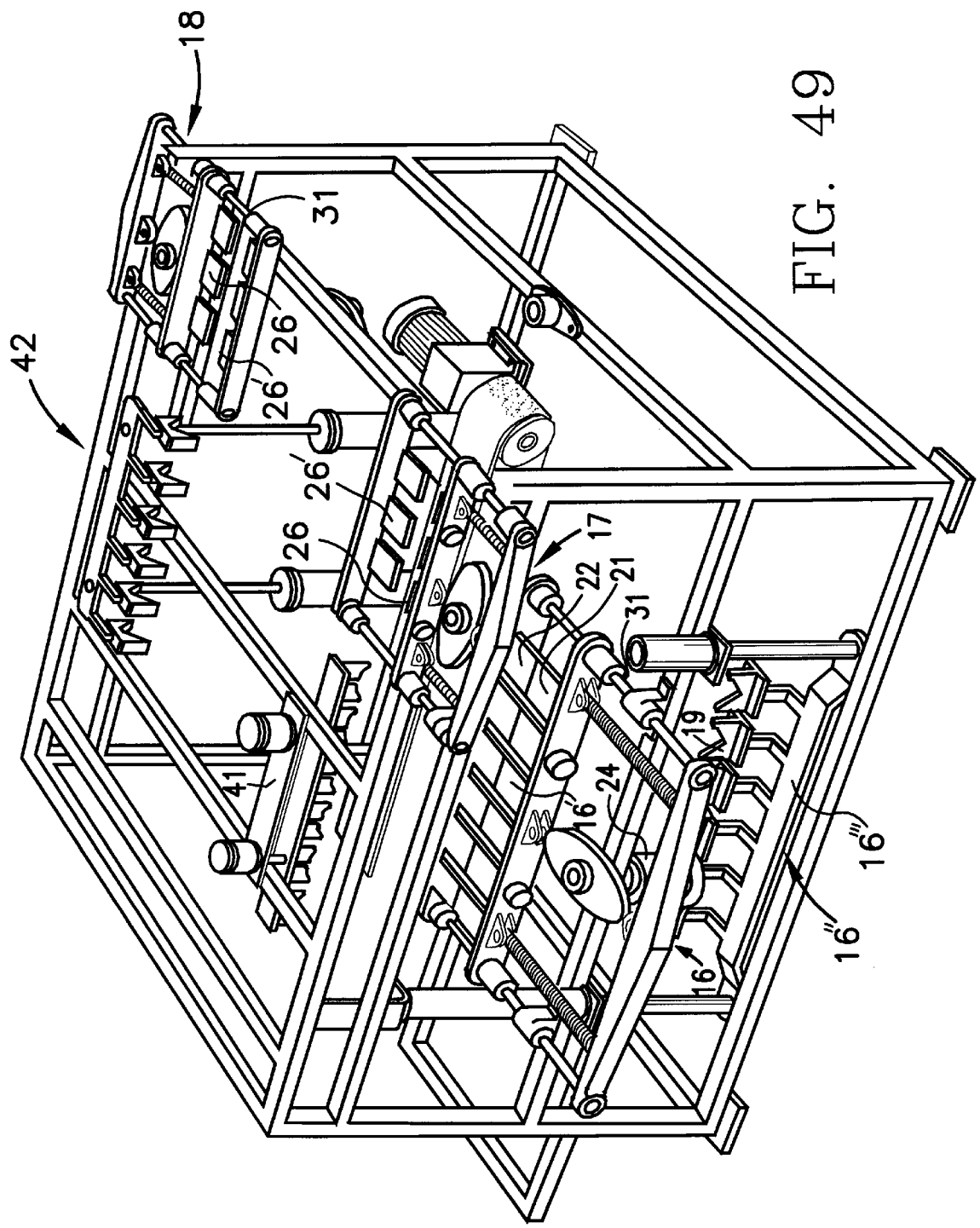
FIG. 49 is a perspective view similar to that of FIG. 46 but with further details removed so as clearly to illustrate the design and placement of the package processing parts of the machine.
Figure 50:
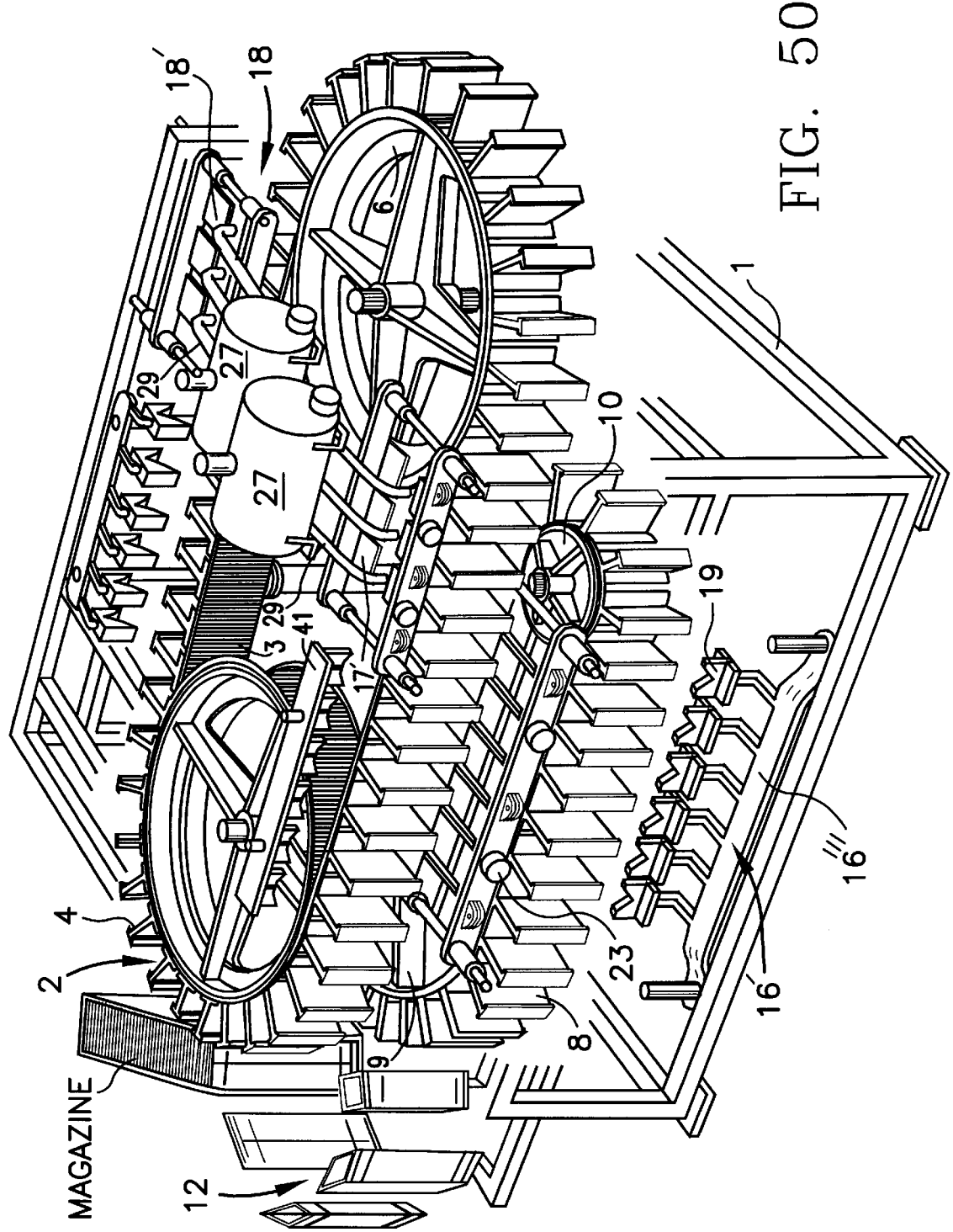
FIG. 50 is a perspective view similar to that of FIG. 46 and illustrates the transport and processing of packaging containers.

While in operation, the conveyor belt 3 of the main conveyor 2 is disposed to move in a counterclockwise direction (FIG. 48). Seen in the direction of movement, there is first disposed along the first part of the conveyor belt 3 a workstation 16 with a bottom sealing portion 16' which is mounted in the frame 1 at a level slightly beneath the lower edge of the conveyor belt 3, and is disposed to process the bottom, i.e. that momentarily lower end of a group of packaging container blanks disposed in the compartments of the conveyor belt 3.

A slight distance after the workstation 16, there is a second workstation 17 disposed along the first part of the conveyor belt 3, this station including a top-sealing portion 17' which is located slightly higher than workstation 16 and, more precisely, somewhat above the upper edge of the conveyor belt 3. The top sealing portion 17' is intended to process the upper of the packaging container blanks located in the compartments of the conveyor 2. After the wheel 6, seen in the direction of the movement of the conveyor belt 3, there is an additional workstation 18 along the return part of the conveyor belt, this station being substantially identical with the workstation 17 and, like this latter, having its top-sealing portion 18' located at the upper edge of the conveyor belt 3. In the illustrated, preferred embodiment of the packaging machine, the work station 16 is intended simultaneously to process a group of packaging containers, while each one of the workstations 17 and 18 is intended to process a sub-group each containing three of the packaging containers included in the previously mentioned group. This implies that the return part of the conveyor belt 3 is also utilized in an optimum manner, with the result that the machine may be made more compact. In addition to the operating principle of the machine as a whole, this will be described in greater detail hereinbelow.

The first workstation 16 also comprises, in addition to the bottom sealing portion 16', a transfer portion 16" which is intended on the one hand to transfer six packaging container blanks at a time from the lower conveyor or infeed conveyor 8 vertically upwards to the compartments of the conveyor belt 3 formed by the carriers 4. When the packaging containers have been placed in the compartments, their momentarily lower ends are subject, in the first bottom sealing portion 16', to a forming and sealing operation, these lower ends being hereafter designated the bottom ends of the packaging containers for the sake of simplicity. The vertical transfer of the packaging container blanks is effected in the transfer portion 16" with the aid of a transfer bridge 16''' which comprises a group of V-shaped lifting devices 19 which are fixedly connected to one another in a row extending along the underside of the infeed conveyor 8. The transfer portion 16" also includes drive means (not shown) in the form of a pneumatic cylinder or an electric motor, making it possible to displace the transfer bridge 16''' vertically in a reciprocal motion between the lower position illustrated in FIG. 50 and an upper position in which the row of lifting devices 19 is located immediately beneath the lower edge of the conveyor belt 3. The lifting devices 19 are placed such that, when the conveyor 8 is idling, they can be displaced upwards between the carriers in the infeed conveyor 8 and shift the blanks to the registering compartments between the carriers 4 on the upper conveyor belt 13. Each individual lifting device 19 consists of a relatively thin plate whose upper edge is provided with a V-shaped recess which, during the transfer of the packaging container blanks, is disposed to cooperate with and cater for a certain performing of the bottom panel of the packaging container blanks, as will be described in greater detail hereinbelow.

As was previously mentioned, the first workstation 16 also includes, in addition to the transfer portion, a bottom sealing portion which is placed slightly beneath the lower edge of the upper conveyor belt 3, i.e. in a space between the front parts (FIG. 51) of both of the conveyors 2 and 8. More precisely, the workstation 16 comprises mutually subsequent sealing jaws 21 and opposing jaws 22, counter jaws being movable in a direction towards and away from the sealing jaws 21 in a substantially horizontal plane. The sealing jaws are of the ultrasonic type and, thus, are connected to one or more ultrasonic generators 23 (schematically illustrated). Like the counterjaws 22, the sealing jaws 21 are suspended in a movable parallel arrangement, which makes it possible, using a single drive motor 24, simultaneously to displace the jaws 21 and 22 in a direction towards one another so that the mutually facing work surfaces of the jaws meet in a centered position straight beneath a common, longitudinal center line for the compartments which are intended to accommodate the packaging container blanks and which are formed by the carriers 4 included in the active part of the conveyor belt 3. Hence, by means of the drive motor 24, the jaws 21 and 22 are groupwise displaceable between the above-mentioned position in which the work surfaces of the jaws are located in contact with one another via interjacent layers of the material of the packaging container blank, and the opposite end position which is illustrated in FIG. 48 where both groups of jaws 21 and 22 are located at maximum distance from one another so as to permit displacement of the conveyor belt 3 and the packaging container blanks located in its compartments.

As has been mentioned earlier, the second and third workstations, 17 and 18, are fundamentally identical to one another and are constructed in a manner similar to that of the workstation 16, apart from the fact that each one of the workstations 17 and 18 is only half as long as the workstation 16 seen in the direction of movement of the conveyor belt 3. Each one of the workstations 17 and 18 thus includes three sealing jaws 26 which are disposed on a common bridge, and one associated ultrasonic generator (not shown). Counter jaws 26' in each workstation 17, 18 are parallel-suspended in relation to the sealing jaws 26 so that the jaws 26, 26' are reciprocally displaceable towards and away from one another between the previously described active and passive end positions with the aid of drive motors 28.

Above each of the workstations 17 and 18, there are disposed three filler pipes for the supply of liquid contents to the packaging container blanks located in the workstations and supported by the carriers 4 of the conveyor belt 3. At their upper ends, the filler pipes 29 each connect to their metering pump 27 which, by the intermediary of conduits (not shown), is connected to a source of final contents, such as a tank.

Figure 51:
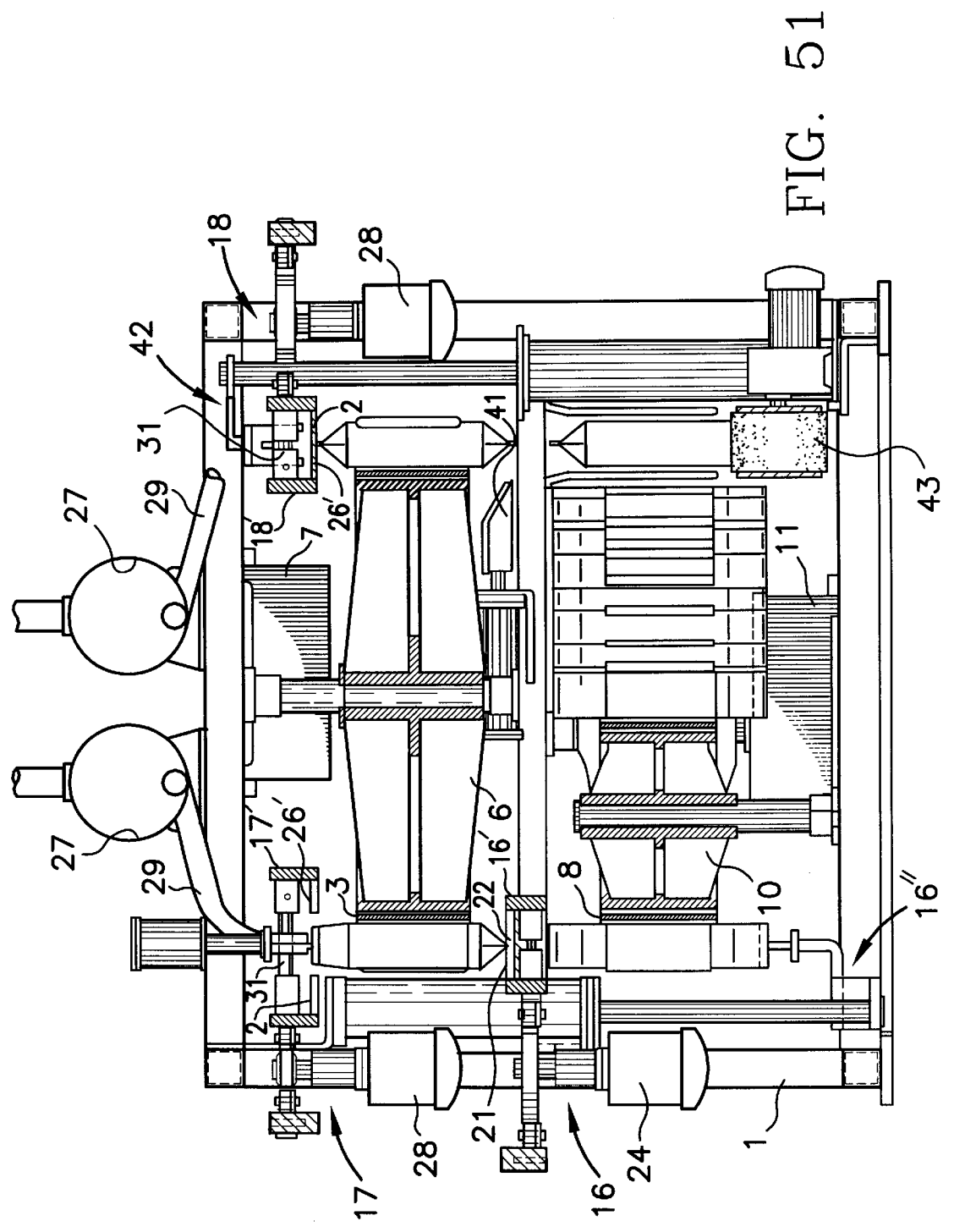

The suspension and driving of the sealing and counter jaws 21, 26, 22, 26' of the different workstations is clearly apparent from FIG. 51 which is an end elevation of the packaging machine, all frame parts and other superfluous details having been removed. On either side of the centrally located wheel 6 can be seen the conveyor belt 3 provided with carriers, above which conveyor belt both of the metering pumps 27 with filler pipes 29 are located. At the bottom to the left in FIG. 51 is shown the sealing portion 16' of the first workstation, and above this is located the sealing portion 17' of the second workstation. The sealing portion 18' of the mirror-reversed but identical workstation is disposed in register herewith but on the right-hand side of the wheel 6. It will be apparent from the Drawing figure how the sealing and counter jaws included in the sealing stations are located in register with one another, the mutually slidingly accommodating frame portions 31 (which are designed so as to make possible rectilinear displacement of the sealing jaw and associated ultrasonic generator and also to make possible the mutual parallel displacement) being illustrated only in part. It will be apparent from the above disclosures how all of the workstations, i.e. the closing and sealing stations as well as the filler stations, constitute separate machine modules provided with their own power and material supply, which can be replaced by other types of modules. Thus, for example the forming and sealing stations can be replaced by modules which make possible the manufacture of packaging containers displaying a different top or bottom design and construction or alternatively displaying other dimensions. The synchronization of the different mutually cooperating stations is ensured by means of a common control unit. However, this is a per se well known technique which will not be dealt with in any detail in this context.

The placement of the processing stations at both parts or runs of the main conveyor is a space-saver and ensures a compact overall design and construction, like the employment of two mutually superposed conveyors. A further contribution in space efficiency is also made by the combined function, provided by the workstation 16, of transfer, forming and sealing station, as well as the combined filling and top-sealing stations 17, 18.

Figure 52:
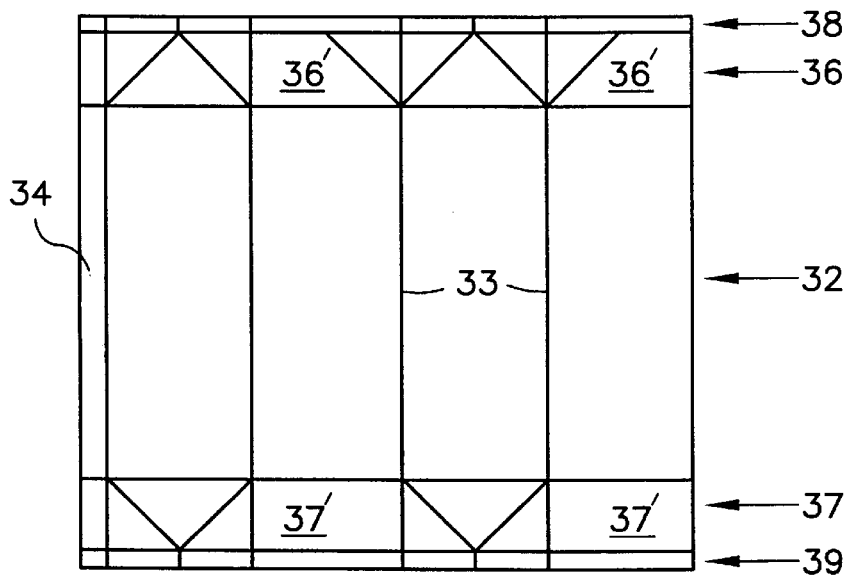
FIG. 52 is a plan view of one blank for a type of packaging container which may be produced using the packaging machine according to the present invention.

Those packaging containers which are intended for production using the packaging machine according to the present invention are essentially of conventional type and are illustrated in FIGS. 52 and 53. The packaging containers are fed to the packaging machine in the form of packaging container blanks of tubular, quadratic cross section which are manufactured from individual blanks of the type shown in FIG. 52. Each blank consists of a packaging material with at least one external layer of thermoplastic and comprises four mutually lateral located side wall panels 32 which are separated by means of mutually parallel vertical crease lines 33. At the one end of the blank, there is an additional, relatively narrow sealing panel 34 which, after tubular forming of the blank, is connected by means of heat-sealing to the free edge of the side wall panel 32 located at the opposite end of the blank. At the upper and lower ends of the side panels, there are provided a number of fundamentally identical top and bottom panels 36 and 37, respectively, which alternatingly include quadratic and triangular narrow panels for forming, in a known manner, a so-called gable top end seal which, at its free end, may be sealed together in a liquid tight manner with the aid of top and bottom sealing panels 38 and 39, respectively. In such instance, two sealing fins 46 and 47 are formed at both ends of the packaging container. The lowermost of these fins is downwardly folded under simultaneous compression of the gable top forming bottom panels 37 so that the packaging container obtains a substantially planar bottom. The packaging container blanks are reformed stepwise with the aid of the packaging machine according to the present invention, which will now be described in greater detail.

Figure 53A:
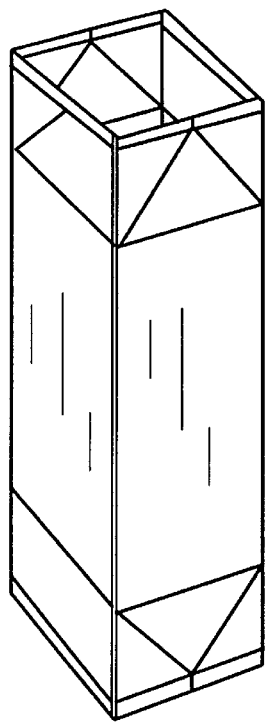
FIG. 53 A, B and C show, in perspective views, the stepwise reforming of a packaging container blank according to FIG. 52 into finished, filled packaging containers using the packaging machine of FIG. 46.
Figure 53B:
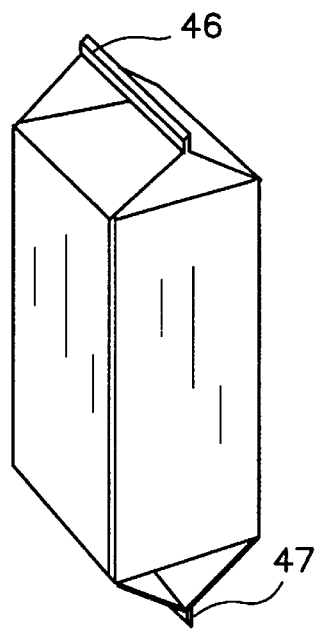
Figure 53C:
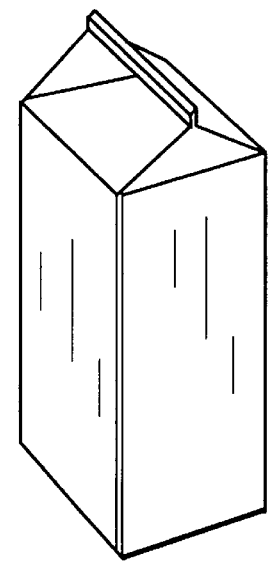

When the machine is in operation for manufacturing, from prefabricated packaging container blanks of the type illustrated in FIG. 53A, filled and sealed packaging containers of the type illustrated in FIG. 53C, the flat laid packaging containers are supplied at the left end of the machine (FIGS. 48 and 50), where the blanks are placed in the previously mentioned magazine whose outlet end discharges immediately adjacent the infeed wheel 12. As is described in greater detail in the above mentioned European Patent Application No. 90311570.7, the infeed wheel 12 is provided with a number of gripping arms which, when the infeed wheel 12 is rotated counter-clockwise, grip one flat-laid packaging container blank at a time and take it from the magazine. With the aid of the arms of the infeed wheel 12, folding and raising of each individual packaging container blank take place at the same time so that the blank, after substantially half of a revolution of the infeed wheel 12 in the raised state, reaches the initial end of the infeed conveyor 8 where each packaging container blank is placed between two of the carriers of the infeed conveyor 8 which runs about the wheel 9, the carriers of the infeed conveyor 8 are in a diverging or "open" state, which greatly facilitates placing of each individual packaging container blank between the carriers, as is clearly illustrated in FIG. 48. In order to prevent the packaging container blanks placed in the infeed conveyor 8 from falling out of the compartments between the carriers located in the open state, there are a number of guides which, in a conventional manner, extend along the path of movement of the infeed conveyor.

In the illustrated embodiment of the packaging machine according to the present invention, the infeed wheel 12 has six carriers which are located at the periphery of the wheel within an angle of approximately 250 degrees. This entails that the infeed wheel 12 will, on continuous rotation, intermittently transfer groups of six packaging container blanks to six mutually subsequently located compartments between the carriers of the infeed conveyor 8. During operation, the infeed conveyor 8 is also displaced intermittently in a clockwise direction, in which event the movement of the infeed conveyor 8 is synchronized with the movement of the infeed wheel 12 so that the infeed conveyor moves simultaneously as the packaging container blanks are transferred thereto. The infeed conveyor 8 thereafter stops in order, when the infeed wheel 12 has rotated to the next infeed phase, once again to be accelerated so as to receive the subsequent group of six packaging container blanks. Since the infeed conveyor must be permitted a certain acceleration and retardation travel distance, the different groups will be located with one empty compartment between each group.

The intermittent clockwise movement of the infeed conveyor 8 will duly transfer an infeed group of packaging container blanks to that part of the path of the infeed conveyor which runs parallel with and immediately beneath the right-hand end, or first part, (FIG. 48, FIG. 50) of the main conveyor 2. The main conveyor also moves intermittently, each displacement corresponding to the length of one group of packaging container blanks plus interjacent empty compartments for acceleration and retardation. As will be described later, the compartments of the conveyor will, in the position of rest of the main conveyor 2, coincide with the work position of the rest of the infeed conveyor 8, so that the compartments of the conveyor for one group of packaging containers will arrive in register (above) with one another, whereby it is possible when conveyors are idling, unimpeded to transfer packaging container blanks by being displaced upwards vertically from the infeed conveyor 8 to the main conveyor 2. This takes place in workstation 16.

When the infeed conveyor has displaced one group of packaging container blanks to workstation 16, the transfer portion 16''' is first activated with the transfer bridge 16''', whose V-shaped lifting devices 19 are displaced vertically upwards each in their compartment in the infeed conveyor 8. In such instance, the lifting devices 19 come into contact with the lower end of the tubular packaging container blanks, whereupon the V-shaped edges of each lifting device 19 come into contact with the bottom panels 37 which are divided into triangular refold panels, as well as the bottom sealing panel 39 which is provided with weakening vertical crease lines and is disposed at the edge of the packaging container blank. As a result of this arrangement, a certain prefolding will take place, on vertical displacement of the packaging container blanks from the infeed conveyor 8 to the main conveyor 2, of the bottom panel 37 of the packaging container blanks so that the triangular refold panels are displaced towards one another at the same time as the unbroken bottom main panels 37' are collapsed in a direction towards one another which, however, is a known forming procedure employed in this type of packaging container and, consequently, is unlikely to need any detailed description here.

When the vertical displacement of the packaging container blanks approaches its end, the top panel 36 of the packaging container blanks is acted on by means of vertically movable prefolding devices 41 whose parts coming into contact with the packaging container blanks are of similar design to the lifting devices 19 with V-shaped but downwardly facing recesses which act on the triangular top panels so that the top of the packaging container blank is also subjected to a prefolding with mutually sloping top main panels 36'. After prefolding of both bottom and top panels, the lifting devices 19 (as well as the prefolding devices 41) are returned to their inactive position spaced apart from the upper region of the main conveyor 2 and the lower region of the infeed conveyor 8, respectively, in which event the conveyors and the packaging container blanks located therein may freely be displaced.

When the group of packaging container blanks in workstation 16 has been completely displaced from the infeed conveyor 8 to corresponding compartments between the carriers 4 on the main conveyor, all will be located in the same vertical position, in which the lower, horizontal bottom sealing panels 39 of the packaging container blanks will be located outside the end edges of the carriers and substantially in register with the work surfaces of the sealing jaws 21 and the counter jaws 22. The bottom sealing portion 16' is now acted on so that the sealing jaws 21 and the counter jaws 22 are displaced in parallel in a direction towards one another, in which event their work surfaces come into contact with the sealing panels 39 of the packaging container blanks and urge them towards one another during simultaneous ultrasonic sealing. The triangular bottom panels (which were inwardly folded in the previously described preforming) are presealed in inwardly folded mutually facing positions between the mutually inclining bottom main panels 37' so that the packaging container blank will have a bottom configuration of the "gable top-like" type, as is illustrated at the lower end of the packaging container blank illustrated in FIG. 53B. After completed sealing, the sealing jaws 21 and counter jaws 22 are returned to the inactive position illustrated in FIG. 48. The main conveyor 2 may now displace the packaging container blanks which have been provided with liquid-tight bottom seal to the next workstation.

The subsequent workstations seen in the direction of movement of the main conveyor are the two filling and top-sealing stations 17 and 18 which, as has been mentioned earlier, are mutually identical. Each one of the two workstations 17 and 18 is intended to handle half of that group of packaging containers which departed from the workstation 16 i.e. in the illustrated embodiment, the six packaging containers included in the group will be divided into two subgroups so that the first three packaging containers seen in the direction of movement will be allocated to filling and top-sealing station 18, while the three rear packaging containers will be allocated to filling and top-sealing station 17. Of course, this does not take place on the same movement of the main conveyor 2, but a plurality of groups infeed in sequence will always be intermittently displaced round the path of the main conveyor 2-this, however, being taken for granted and not described in any detail in this context. The three packaging containers which, with the aid of the main conveyor 2, reach the filling and top-sealing station 17 (or alternatively station 18) arrive, when the conveyor 2 has stopped straight beneath the filler pipes 29 of the metering pump 27 and, with the aid of lifting devices (not shown), the three packaging containers are moved vertically upwards until their upper open ends surround the filler pipes, whereafter filling is commenced so that a metered quantity of contents flows out via the lower ends of the filler pipes 29 and down into the packaging containers, at the same time as these are once again lowered at the same rate as the filling cycle, such that unnecessary splashing or frothing is avoided. The method of placing the packaging container around the filler pipe and thereafter lowering it at the same rate as the filling cycle is well known per se and is employed in many types of packaging machines.

When the filling cycle has been completed, the three packaging containers will once again be located in the recesses of the main conveyor 2 defined by the T-shaped carriers 4 and, more precisely, in such a vertical position that the upper top panel 36 of the packaging containers extends above the upper edge of the conveyor 2. In this position, folding together of the top panels 36 takes place, together with sealing of the upper end of the packaging containers filled to the desired level. This sealing is effected in that the sealing and counter jaws 26, 26' located at the filling and top-sealing station are, by means of the associated drive motor 28, displaced in parallel towards one another so that the two top main panels 36' are collapsed towards one another on either side of the triangular infold panels, whereafter the work surface of the sealing jaw 26 is brought into contact with the top sealing panel 38 of the top panel 36 in order, together with the counter jaw 26', to ultrasonically seal this panel for the formation of a liquid-tight top seal. The sealing jaw 26 and the counter jaw 26' are thereafter displaced in parallel away from one another to the position of rest illustrated, for example, in FIG. 49.

Subsequent intermittent displacements of the main conveyor 2 will duly move the entirely sealed packaging containers filled with the desired quantity of contents to the region after the second filling and top-sealing station 18. In order to cater for a final folding of the bottom sealing fin 47 projecting at the bottom end of the packaging container so that the bottom configuration of the package is changed from that illustrated in FIG. 53B to the wholly planar bottom which is illustrated in FIG. 53C, the sealing fin 47 of the packaging container is, on displacement of the main conveyor 2, brought into contact with a guide running at an angle to the longitudinal direction of the main conveyor, the guide being located immediately beneath the main conveyor and progressively acting on the sealing fin 47 so that this is folded to the side. With the aid of additional guides or a reciprocating pressure and sealing device 41, the gable top-shaped bottom is thereafter reformed into a substantially planar bottom whose different parts are held together in the desired planar state by heat-sealing. Hereafter, the finished packaging containers are removed from the compartments of the main conveyor by means of a discharge device 42 which, for example by means of a pneumatically or electrically driven tool acting on the tops of the packaging containers, displaces the packaging containers axially downwards so that they may be transported further upright on an endless conveyor belt 43, or employing some other known method.

Sine each work and processing station (together with its associated electric or pneumatic power source) forms a separate module, both the number and function thereof may be varied within broad limits. This makes for a compact machine in which both parts of the conveyor may be efficiently utilized. Naturally, the division into an infeed and a main conveyor placed on different planes also contributes in the degree of compactness. The design and construction of the two workstations 17 and 18 as combined filler and sealing stations also contributes in increasing the workrate of the machine, since the upper parts of the packaging container are sealed in a liquid-tight manner immediately after the filling operation. In prior art machines, filling and sealing take place in separate stations with a horizontal transport distance between the stations, and the packaging containers must cover this distance at slow and uniform speed in order to avoid spillage.

The illustrated packaging container type is suitable for forming and sealing in the pertinent packaging machine, but naturally other container types may also be manufactured. As a result of the modular system of the machine, top or bottom sealing can, for example, readily be put into effect in different ways. For example, the one or both ends of the blank may lack the integrated top and bottom panels, respectively, and instead be provided with separately applied bottoms and tops of any optional configuration, for example a prefabricated top portion with pouring spout and reclosure arrangement.

We claim as our invention:

1. A packaging machine comprising:
   (a) a plurality of packaging stations, each of the packaging stations executing one or more processes to fill and seal a plurality of carbon blanks;
   (b) at least one conveyor accepting the plurality of carton blanks and transporting the carton blanks between the plurality of packaging stations along a predetermined path;
   (c) the plurality of packaging stations comprising
      i. a bottom sealing apparatus disposed at a first location along the predetermined path for sealing bottoms of the plurality of carton blanks to form a plurality of tubular containers each having a bottom fin;
      ii. a bottom folding apparatus disposed at a second location along the predetermined path differing from the first location for folding the bottom fin of each of the plurality of tubular containers to a generally flattened state.

2. A packaging machine as claimed in claim 1 wherein the plurality of packaging stations further comprises a filling apparatus for filling the plurality of tubular containers with product.

3. A packaging machine as claimed in claim 2 wherein the filling apparatus is disposed at a third location along the predetermined path between the first location and the second location to fill the plurality of tubular containers prior to introduction of the plurality of tubular containers to the bottom folding apparatus.

4. A packaging machine as claimed in claim 1 and further comprising a top sealing apparatus for sealing tops of the plurality of cartons.

5. A packaging machine as claimed in claim 4 wherein the top sealing apparatus seals the tops of the plurality of cartons into respective gable top formations.

6. A packaging machine as claimed in claim 4 and wherein the top sealing apparatus is disposed at the third location.

7. A packaging machine comprising:
   (a) a plurality of packaging stations, each of the packaging stations executing one or more processes to fill and seal a plurality of carton blanks;
   (b) at least one conveyor accepting the plurality of carton blanks and transporting the carton blanks in indexed movements between the plurality of packaging stations along a predetermined path for batch processing of the plurality of carton blanks;
   (c) the plurality of packaging stations comprising
      I. a bottom sealing apparatus disposed at a first location along the predetermined path for concurrently sealing bottoms of the plurality of carton blanks in batches to form a plurality of tubular containers each having a bottom fin,
      ii. a filling apparatus disposed at a second location along the predetermined path, the second location being after the first location along the predetermined path, the filling apparatus concurrently filling the plurality of tubular containers in batches, and
      iii. a top sealing apparatus for concurrently sealing tops of the plurality of cartons in batches,
      iv. a bottom folding apparatus disposed at a third location along the predetermined path after the second location for concurrently folding the bottom fins of the plurality of tubular containers in batches to a generally flattened state.

8. A packaging machine as claimed in claim 7 wherein the top sealing apparatus is disposed at the second location with the filling apparatus.

9. A packaging machine comprising:
   (a) an infeed conveyor;
   (b) a main conveyor;
   (c) a plurality of packaging stations, each of the packaging stations including devices for executing one or more processes to fill and seal carton blanks;
   (d) the infeed conveyor accepting the carton blanks and transporting the carton blanks to a first packaging station, the first packaging station including a sealing device for sealing an end of the carton blanks and a reciprocating displacement device for transporting the carton blanks from the infeed conveyor to the main conveyor.

10. A packaging machine as claimed in claim 9 wherein the plurality of packaging stations comprises:
    (a) a filling apparatus disposed at a first location along the main conveyor, the filling apparatus filling the plurality of tubular containers; and
    (b) a top sealing apparatus disposed along the main conveyor for sealing tops of the plurality of cartons.

11. A packaging machine as claimed in claim 10 and wherein the sealing device of the first packaging station is a bottom sealing device for sealing bottoms of the carton blanks to form a plurality of tubular containers each having a bottom fin.

12. A packaging machine as claimed in claim 11 and further comprising a bottom folding apparatus disposed at a third location along the main conveyor after the second location for folding the bottom fins of the plurality of tubular containers to a generally flattened state.

* * * * *